(12) United States Patent
Haimovitch et al.

(10) Patent No.: US 6,960,999 B2
(45) Date of Patent: Nov. 1, 2005

(54) APPARATUS AND METHODS FOR CELLULAR COMMUNICATION

(75) Inventors: Yosef Haimovitch, Rishon LeZion (IL); Roni Cohen, Zoran (IL); Alexander Ayzenberg, Rishon LeZion (IL)

(73) Assignee: Hi-C-Tek Ltd., Yehuda (IL)

( * ) Notice: Subject to any disclaimer, the term of this patent is extended or adjusted under 35 U.S.C. 154(b) by 646 days.

(21) Appl. No.: 09/842,749

(22) Filed: Apr. 25, 2001

(65) Prior Publication Data

US 2003/0164752 A1 Sep. 4, 2003

Related U.S. Application Data

(60) Provisional application No. 60/200,646, filed on Apr. 28, 2000.

(51) Int. Cl.[7] .......................... B08B 13/14; H04L 7/00; H04B 1/38; H04M 1/00; G08C 17/00
(52) U.S. Cl. ................. 340/572.1; 340/572.8; 340/825.2; 455/574; 370/311
(58) Field of Search .......................... 340/572.1, 572.4, 340/572.7, 572.8, 825.24, 5.2, 5.21, 10.34; 455/76, 77, 33, 53, 54, 17, 9, 458, 574, 343.1, 343.2, 343.4; 370/95.1, 311, 342, 441, 328

(56) References Cited

U.S. PATENT DOCUMENTS

| | | | |
|---|---|---|---|
| 4,222,115 A | 9/1980 | Cooper et al. ................. 375/1 |
| 4,347,625 A | 8/1982 | Williams ...................... 455/17 |
| 4,399,555 A | 8/1983 | MacDonald .................. 455/33 |
| 4,750,197 A | 6/1988 | Denekamp et al. ........... 379/58 |
| 4,759,051 A | 7/1988 | Han ............................. 379/59 |
| 4,799,252 A | 1/1989 | Eizenhoffer .................. 379/59 |
| 4,802,235 A | 1/1989 | Treatch ........................ 455/76 |
| 4,852,048 A | 7/1989 | Morton ....................... 364/200 |
| 4,866,710 A | 9/1989 | Schaeffer ................... 370/95.1 |
| 4,866,788 A | 9/1989 | Mouly et al. ................... 455/9 |
| 4,914,651 A | 4/1990 | Lusignan .................... 370/69.1 |
| 5,119,104 A | 6/1992 | Heller |
| 5,166,929 A * | 11/1992 | Lo .............................. 370/448 |
| 5,396,227 A * | 3/1995 | Carroll et al. .......... 340/825.36 |
| 5,434,572 A | 7/1995 | Smith |
| 5,471,212 A * | 11/1995 | Sharpe et al. ................. 342/51 |
| 5,525,992 A * | 6/1996 | Froschermeier ............ 340/10.2 |
| 5,537,105 A | 7/1996 | Marsh et al. |
| 5,565,858 A | 10/1996 | Guthrie .................. 340/825.35 |
| 5,574,977 A * | 11/1996 | Joseph et al. ................ 455/450 |
| 5,594,738 A * | 1/1997 | Crisler et al. ................ 370/347 |
| 5,615,247 A | 3/1997 | Mills |
| 5,615,249 A * | 3/1997 | Solondz ....................... 455/450 |
| 5,630,209 A * | 5/1997 | Wizgall et al. .............. 455/521 |
| 5,642,355 A * | 6/1997 | Smith .......................... 370/337 |
| 5,656,996 A | 8/1997 | Houser ........................ 340/541 |
| 5,686,902 A | 11/1997 | Reis et al. |
| 5,691,980 A | 11/1997 | Welles, II et al. |
| 5,751,570 A | 5/1998 | Stobbe et al. |
| 5,890,520 A | 4/1999 | Johnson, Jr. .................. 141/94 |
| 5,910,776 A | 6/1999 | Black ..................... 340/825.35 |
| 5,910,944 A * | 6/1999 | Callicotte et al. ............ 370/311 |

(Continued)

Primary Examiner—Michael Horabik
Assistant Examiner—Nam Nguyen
(74) Attorney, Agent, or Firm—Abelman, Frayne & Schwab

(57) ABSTRACT

A tag interrogation system including at least one base station and a plurality of tags, each having an awake mode and a sleeping mode, wherein each base station is operative to broadcast messages which are received by the plurality of tags and has a receiving window during which it is operative to receive messages sent by individual tags from among the plurality of tags, and wherein at least some of the messages broadcast by at least some of the base stations include an indication of the time at which a future receiving window is due to open, thereby to allow tags to conserve power by remaining in the sleeping mode until the future receiving window opens.

31 Claims, 67 Drawing Sheets

U.S. PATENT DOCUMENTS

| | | | |
|---|---|---|---|
| 5,929,779 A | 7/1999 | MacLellan | 340/825 |
| 5,940,006 A * | 8/1999 | MacLellan | 340/10.1 |
| 5,955,951 A | 9/1999 | Wischerop | 340/572.8 |
| 5,963,134 A | 10/1999 | Bowers | 340/572.1 |
| 5,963,144 A | 10/1999 | Kruest | 340/825.54 |
| 5,986,569 A | 11/1999 | Mish et al. | 340/825 |
| 5,986,570 A | 11/1999 | Black et al. | 340/825 |
| 5,995,006 A | 11/1999 | Walsh | 340/572.7 |
| 5,999,099 A | 12/1999 | Stobbe | 340/572.8 |
| 6,002,343 A | 12/1999 | Auerbach | 340/825 |
| 6,002,344 A | 12/1999 | Bandy et al. | 340/825 |
| 6,008,727 A | 12/1999 | Want et al. | 340/572.1 |
| 6,055,426 A | 4/2000 | Beasley | |
| 6,154,139 A * | 11/2000 | Heller | 340/573.4 |
| 6,166,627 A | 12/2000 | Reeley | 340/426 |
| 6,216,003 B1 * | 4/2001 | Hamajima et al. | 455/437 |
| 6,256,493 B1 * | 7/2001 | Dorenbosch et al. | 455/419 |
| 6,288,629 B1 * | 9/2001 | Cofino et al. | 340/10.1 |
| 6,300,903 B1 * | 10/2001 | Richards et al. | 342/450 |
| 6,366,779 B1 * | 4/2002 | Bender et al. | 455/450 |
| 6,369,710 B1 * | 4/2002 | Poticny et al. | 340/572.1 |
| 6,420,971 B1 | 7/2002 | Leck et al. | |
| 6,421,540 B1 * | 7/2002 | Gilhousen et al. | 455/458 |
| 6,466,558 B1 * | 10/2002 | Ling | 370/334 |
| 6,507,567 B1 * | 1/2003 | Willars | 370/321 |
| 6,590,886 B1 * | 7/2003 | Easton et al. | 370/342 |
| 6,593,845 B1 * | 7/2003 | Friedman et al. | 340/10.33 |

* cited by examiner

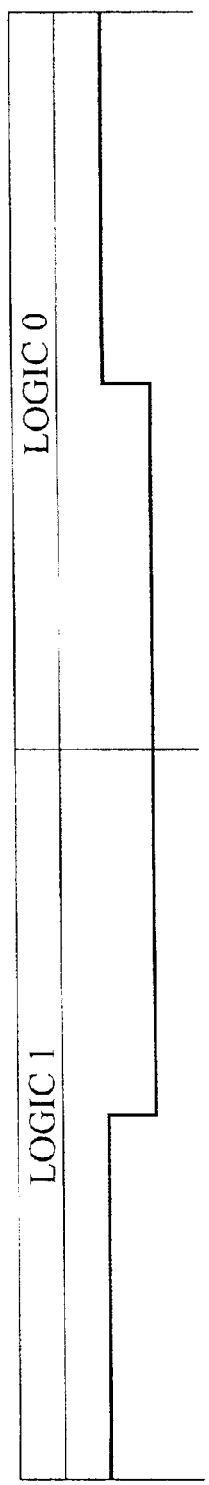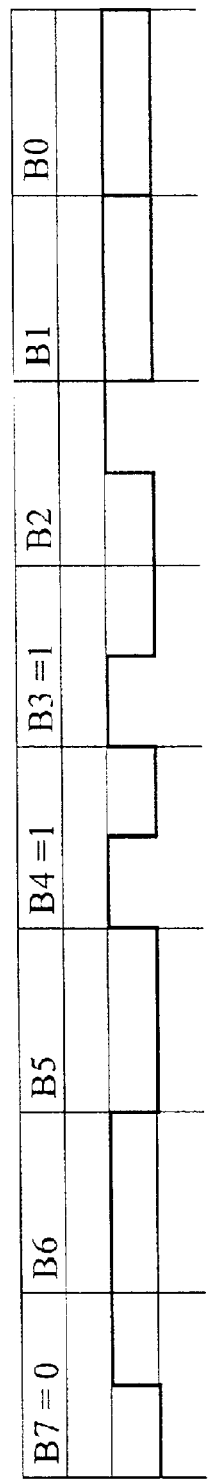

FIG. 4

| B7 = 0 | B6 | B5 | B4 = 1 | B3 = 1 | B2 | B1 | B0 |
|---|---|---|---|---|---|---|---|

FIG. 5

| SYNTAX | DESCRIPTION | B6&B5 | B1 | B0 |
|---|---|---|---|---|
| FSH | READER HEADER SYNCS | LOW | 0 | 0 |
| FSEH | READER END HEADER SYNC | LOW | 0 | 1 |
| FSBMM | READER BROADCAST MESSAGE SYNC | LOW | 1 | 0 |
| FSAMM | READER ADDRESSED MESSAGE SYNC | LOW | 1 | 1 |
| FSSM | TAG RESPONSE SYNC | HIGH | 0 | 0 |

FIG. 14

| FPH | FS$_{BMM}$ | #B | CMND | k | K | CRC | EM |
|---|---|---|---|---|---|---|---|
| | | 1 | 1 | 1 | 1 | 2 | # OF BYTES |

CRC spans #B

FIG. 15

| FPH | FS$_{AMM}$ | #B | TF | TID | CMND | DATA | CRC | EM |
|---|---|---|---|---|---|---|---|---|
| | | 1 | 2 | 4 | 1 | N | 2 | # OF BYTES |

CRC spans #B

FIG. 16

| FPH | FS$_{SM}$ | #B | TF | TID | MT | DATA | CRC | EM |
|---|---|---|---|---|---|---|---|---|
| | | 1 | 2 | 4 | 1 | N | 2 | # OF BYTES |

CRC spans #B

FIG. 18A

| | COMMANDS SET | CODE | COMMENTS |
|---|---|---|---|
| 1 | VERIFY | 10H | NORMAL INTERROGATION CYCLE FOR READING SHORT STATUS INFORMATION FROM SEALS AND TAGS. |
| 2 | TAMPER | 11H | TAMPER INTERROGATION CYCLE FOR READING SHORT STATUS INFORMATION FROM SEALS AND TAGS. ONLY TAMPERED DEVICES WILL RESPOND TO THIS COMMAND. |
| 3 | SET | 18H | COMMUNICATION CYCLE TO SET SPECIFIC SEALS AND TAGS. |
| 6 | READ DATA | 33H | COMMUNICATION CYCLE TO READ A BLOCK OF DATA FROM SEALS AND TAGS MEMORY. |
| 7 | WRITE DATA | 40H | COMMUNICATION CYCLE TO WRITE A BLOCK OF DATA TO A SEAL OR A TAG. |
| 8 | ASSIGN SLOTS | 50H | INTERROGATION CYCLE FOR ASSIGNING COMMUNICATION SLOTS FOR SEALS AND TAGS. VALID ONLY FOR WAKEUPS COMMANDS. |
| 9 | CLEAR ASSIGNMENT. | 51H | STOPS FIXED ASSIGNED MODE. |
| 10 | DEEP SLEEP | 60H | COMMUNICATION CYCLE TO SET SPECIFIC SEALS AND TAGS INTO A DEEP SLEEP MODE NOT TO INTERFERE. |

FIG. 18B

| | COMMANDS SET | CODE | COMMENTS |
|---|---|---|---|
| 11 | HARD WAKEUP | 61H | COMMUNICATION CYCLE TO RESET SPECIFIC SEALS AND TAGS FROM A DEEP SLEEP MODE TO FUNCTION NORMALLY. |
| 12 | RESET DATA BLOCK | 2AH | COMMUNICATION CYCLE TO RESET THE DATA BLOCK IN SPECIFIC SEALS AND TAGS. |
| 13 | START ALERT BURST MODE | 70H | COMMAND THAT ACTIVATES TAGS AND SEALS TO BURST INTO THE ALERT RECEIVING WINDOW IN CASE OF AN ALERT DETECTION. |
| 14 | STOP ALERT BURST MODE | 72H | COMMAND THAT DEACTIVATES TAGS AND SEALS TO BURST INTO THE ALERT RECEIVING WINDOW. THIS COMMAND CAN BE A GENERAL ONE FOR ALL TAGS. THIS CAN BE AS ACKNOWLEDGE TO SPECIFIC TAGS. |
| 15 | ACKNOWLEDGE - ALERT MESSSAGE | 73 H | THIS IS TO ACKNOWLEDGE SPECIFIC TAG OR TAGS THAT THEIR ALERT MESSAGE WAS RECEIVED, AND THEY MAY STOP BURSTING UNTIL A NEW ALERT IS DETECTED. |

FIG. 18C

| | COMMANDS SET | CODE | COMMENTS |
|---|---|---|---|
| 16 | START ALERT BURST MODE UNSYNCHRONIZED | 38 H | COMMAND THAT ACTIVATES TAGS AND SEALS TO BURST IN CASE OF AN ALERT DETECTION. BURSTING IN INDEPENDENT OF SYSTEM TIMING. |
| 17 | STOP ALERT BURST MODE UNSYNCHRONIZED | 39 H | COMMAND THAT DEACTIVATES TAGS AND SEALS TO BURST. THIS COMMAND CAN BE A GENERAL ONE FOR ALL TAGS. THIS CAN BE AS ACKNOWLEDGE TO SPECIFIC TAGS. |
| 18 | ACKNOWLEDGE – UNSYNCHRONIZED ALERT MESSAGE | 76 H | THIS IS TO ACKNOWLEDGE A SPECIFIC TAG THAT ITS ALERT MESSAGE WAS RECEIVED, AND IT CAN STOP BURSTING UNTIL A NEW ALERT IS DETECTED. |
| 19 | REST STATUS | 43H | COMMUNICATION CYCLE TO RESET THE STATUS FLAGS OF A SPECIFIC SEAL OR TAG. NOT ALL THE FLAGS CAN BE RESET. |
| 20 | LONG VERIFY | 12H | INTERROGATION CYCLE WITH VERY LONG $T_{RW}$. SYSTEM RESPONDS LIKE IN WAKEUP 1. |

FIG. 18D

|    | COMMANDS SET     | CODE | COMMENTS                                                                                                                                  |
|----|------------------|------|-------------------------------------------------------------------------------------------------------------------------------------------|
| 21 | SYNC VERIFY      | 13H  | INTERROGATION CYCLE FOR READING SHORT STATUS INFORMATION FROM ASSIGNED SEALS. THIS COMMAND USES THE PREVIOUS SETTINGS OF SYSTEM TIMINGS. |
| 22 | FILTER           | 14H  | INTERROGATION CYCLE WITH FEEDBACK FROM THE READER FOR THE RANDOM ACCESS WINDOW. THIS IS TO REDUCE NUMBER OF TAGS IN THIS WINDOW FROM CYCLE TO CYCLE. |
| 23 | START BURST MODE | 15H  | THIS IS A COMMAND TO INSTRUCT TAGS AND SEAL TO REPORT FREQUENTLY ON THEIR CURRENT STATUS INDEPENDENTLY. THIS IS NOT A MASTER SLAVE MODE. |
| 24 | HARD VERIFY      | 16H  | THIS IS A COMMAND TO INSTRUCT TAGS THAT ARE IN THE DEEP SLEEP MODE TO RESPOND. THIS COMMAND IS EXACTLY LIKE THE WAKEUP 1 BUT WITH A DIFFERENT OPCODE. |

FIG. 18E

| | COMMANDS SET | CODE | COMMENTS |
|---|---|---|---|
| 25 | TRACK | 1FH | THIS IS A COMMAND IDENTICAL TO WAKEUP 1 FOR TRACKING APPLICATIONS WHERE WE NEED THE TRACKING MESSAGES TMM ON TOP OF THE BMM. |
| 26 | WRITE PARAMETER | 41H | THIS COMMAND IS TO MODIFY SYSTEM PARAMETERS. THE READER RECONFIGURES THE TAGS DEFAULT VALUES. PARAMETERS LIKE: ADI, $T_{HW}$, ETC. THIS COMMAND SUPORTS THE TABLE IN PARA 5.2 |
| 27 | READ PARAMETER | 24H | THIS COMMAND IS TO READ SYSTEM PARAMETERS. THIS COMMAND SUPORTS THE TABLE IN PARA 5.2 |
| 28 | SYNC | 80H | NO OPERATION. THIS COMMAND IS TO KEEP TAGS SYNCHRONIZE WITH THE READER FOR LONG TIME. IN THIS COMMAND, TAGS DO NOT RESPOND, THEY ONLY WAKEUP AND GO BACK TO SLEEP. |
| 29 | LOCK | 85H | THIS COMMAND WILL LOCK ACCESS TO MODIFY PARAMETERS AFTER PRODUCTION. |

FIG. 18F

| | COMMANDS SET | CODE | COMMENTS |
|---|---|---|---|
| 30 | SUSPENDED SET | 21H | THIS COMMAND IS A DELAYED SET. IT WILL BE EXECUTED AUTOMATICALY BY THE SEAL AFTER THE SEAL WIRE IS CLOSED. |
| 31 | ADDRESED WAKEUP1N | 17H | THIS COMMAND WILL GENERATE A WAKEUP1N TO SPECIFIC SEALS. |
| 32 | ADDRESED READ EVENTS | 33H | THIS COMMAND WILL READ EVENTS FROM A SPECIFIC SEAL. |
| 33 | SOFT SET | 1AH | SOFT SET IS THE COMMAND THAT LEAVES SET FOOT PRINT AS AN EVENT BUT DON'T RESET SEAL'S MEMORY. |

FIG. 19A

| ROW # | PARAMETER NAME | PARAMETER CODE | PARAMETER SYNTAX | READ/ WRITE ACCESS | DEFAULT VALUE | PROTECTED BY LOCK | WAKEUP BIT ACCESS ORDER | PARAMETER LENGTH |
|---|---|---|---|---|---|---|---|---|
| 1 | TAG/SEAL SHORT STATUS | 00 HEX | TS | R | | | 15 | 1 BYTE |
| 2 | DATE & TIME | 01 HEX | D&T | R/W | | | 14 | 4 BYTES |
| 3 | RESISTANCE | 02 HEX | RES | R | | | 13 | 1 BYTE |
| 4 | # OF EVENTS | 03 HEX | #EV | R | | | 12 | 1 BYTE |
| 5 | LIFE COUNTER | 04 HEX | LFC | R | | + | 11 | 2 BYTES |
| 6 | RANDOM VALUE | 05 HEX | RND | R | | | 10 | 1 BYTE |
| 7 | VERSION OF FIRMWARE | 06 HEX | VER | R | | + | 9 | 1 BYTE |
| 8 | LONG STATUS | 07 HEX | LTS | R | | | 8 | 2 BYTES |
| 9 | RSSI | 08 HEX | RSSI | R | | | 7 | 1 BYTE |
| 10 | $T_W$ | 31 HEX | TW | R/W | 1000 | | 6 | 2 BYTES |
| 11 | RID | 20 HEX | RID | R/W | 00000000 | | 5 | 4 BYTES |

FIG. 19B

| ROW # | PARAMETER NAME | PARAMETER CODE | PARAMETER SYNTAX | READ/ WRITE ACCESS | DEFAULT VALUE | PROTECTED BY LOCK | WAKEUP BIT ACCESS ORDER | PARAMETER LENGTH |
|---|---|---|---|---|---|---|---|---|
| 12 | ADI | 13 HEX | ADI | R/W | 00000000 | | 4 | 4 BYTES |
| 13 | ORGID | 12 HEX | ORGID | R/W | 000000 | | 3 | 3 BYTES |
| 14 | TA | 33 HEX | TA | R/W | 10 | | 2 | 1 BYTE |
| 15 | TP | 32 HEX | TP | R/W | | | 1 | |
| | | | | | | | | |

FIG. 20A

| INTERVAL NAME | INTERVAL SYNTAX | COMMENTS | DEFAULT VALUE |
|---|---|---|---|
| READER INTERROGATION HEADER | $T_{HW}$ | INTERROGATION HEADER TIME DURATION. NOT INCLUDING THE XMM. RESOLUTION IS 1.024 MSEC. | 3000 |
| READER RECEIVING WINDOW | $T_{RW}$ | TIME DURATION FROM THE END OF THE RECEIVED IH TO THE BEGINNING OF THE NEXT IH. RESOLUTION IS 1.024 MSEC. DEFINED IN THE IH. | 1000 |
| READERS INTERLACE WINDOW | $T_{IW}$ | TIME DURATION OF THE WINDOW ALLOWING OTHER READERS TO BURST IN. RESOLUTION IS 1.024 MSEC. DEFINED IN THE BMM, TMM. | 0 |
| FIXED ASSIGNMENT WINDOW | $T_{DW}$ | RESOLUTION IS 1.024 MSEC. | 0 |
| RANDOM ACCESS RECEIVING WINDOW | $T_{CW}$ | RESOLUTION IS 1.024 MSEC. | - |
| ALERT RECEIVING WINDOW | $T_{AW}$ | RESOLUTION IS 1.024 MSEC. | - |
| TAG RESPONSE TIME SLOT. | $T_S$ | DEFINED IN THE BMM, TMM. | |

FIG. 20B

| INTERVAL NAME | INTERVAL SYNTAX | COMMENTS | DEFAULT VALUE |
|---|---|---|---|
| HEADER TIMER | $T_{TI}$ | THIS TIMER IS TO INDICATE THE TAG, HOW MUCH IS LEFT TO THE END OF THE IH. RESOLUTION IS 1.024 MSEC. DEFINED IN THE IH | |
| ASSIGN MODE TIME OUT | $T_A$ | A TIME OUT ALGORITHM IS USED IN THE ASSIGNED MODE IN ORDER NOT TO HAVE DEADLOCKS. RESOLUTION IS 1 SEC. | 20 SEC |
| TAG TIME SLOT POSITION | $T_D$ | THIS IS THE POSITION OF A TAG'S SLOT IN THE $T_{RW}$. RESOLUTION IS 1.024 MSEC. DEFINED IN THE BMM, TMM. | 0 |
| UNSYNCHRONIZED TAG WAKEUP CYCLE | $T_{UNSYNC}$ | CYCLE DURATION FOR WAKEUP 5 COMMAND. RESOLUTION IS 0.1 SEC. DEFINED IN THE BMM, TMM. | 0 |
| DEEP SLEEP WAKEUP CYCLE. | $T_P$ | TO SAVE POWER IN DEEP SLEEP, THE WAKEUP CYCLE IS LONGER THEN USUSAL. RESOLUTION IS 1 SEC | 4 SEC. |
| SEAL WAKEUP FREQUENCY | $T_W$ | WAKEUP FREQUENCY OF THE SEAL. THIS VALUE SHOULD BE LESS THEN $T_{IIW}$ | 300 MS |
| ALERT UNSYNC REPETITION RATE | $T_{BRS}$ | THIS PARAMETER DETERMINES THE REPETION RATE OF THE ALERT BURSTS. RESOLUTION IS 1 SEC. | 5 SEC. |
| SESSION CYCLE TIME | $T_C$ | THIS IS THE CYCLE TIME OF CONSECUTIVE SESSIONS IN A REPETITIVE MODE OF OPERATION. | 0 |

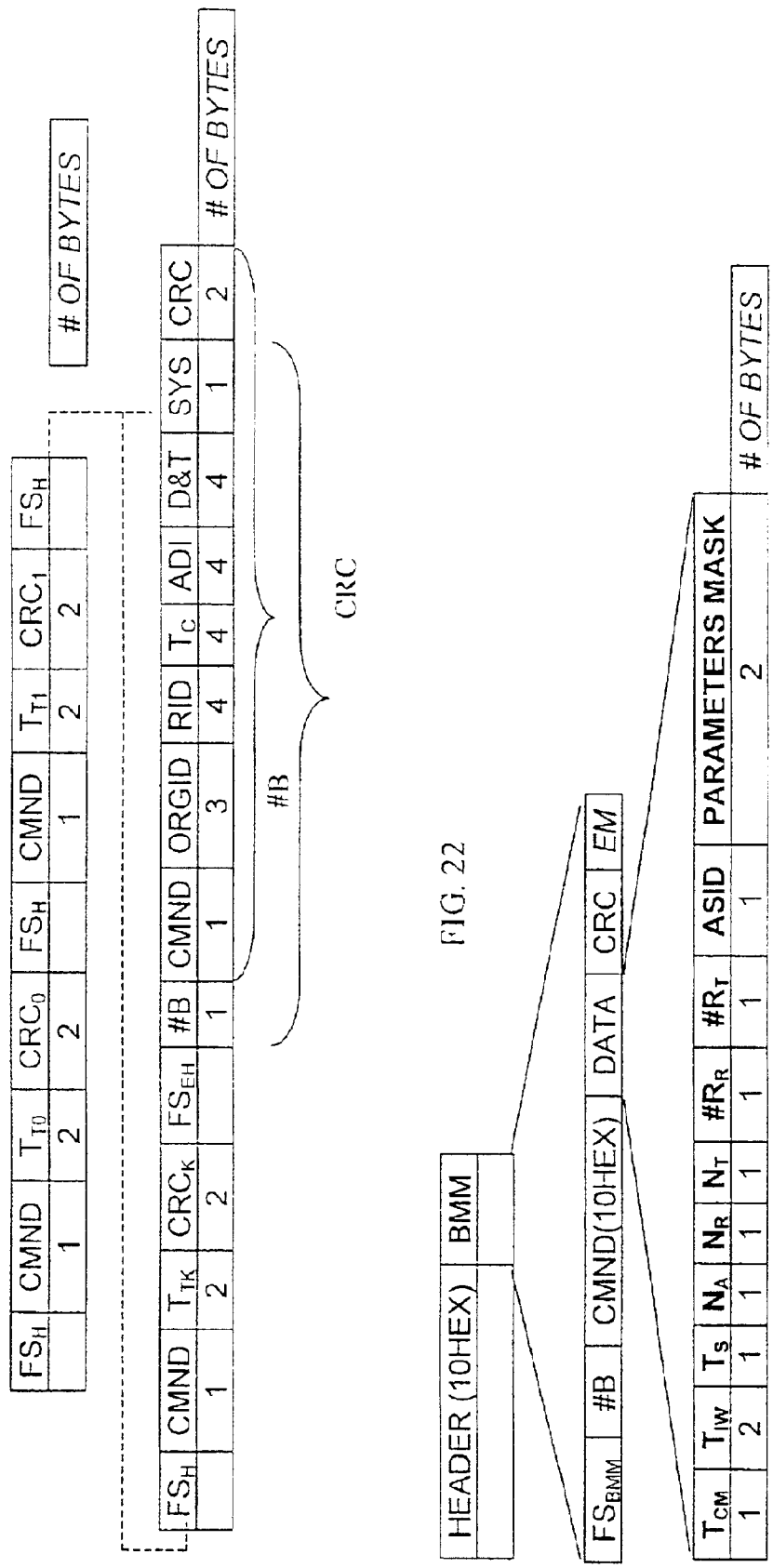

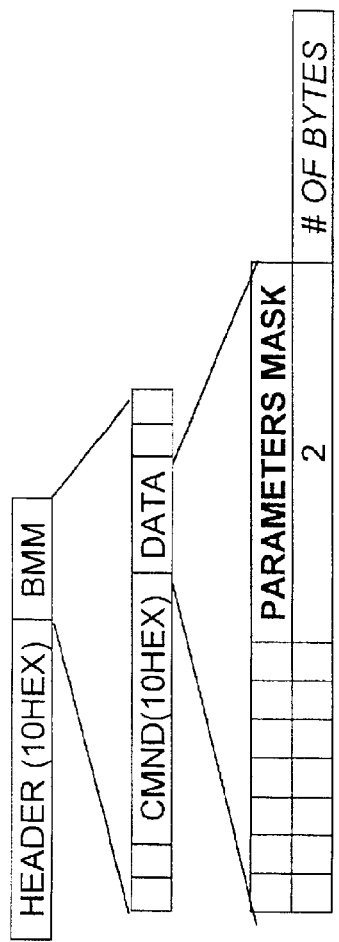
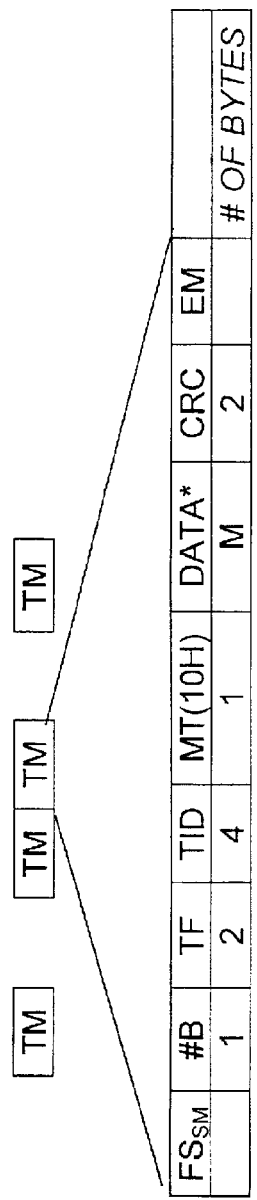
FIG. 24A
FIG. 24B

FIG. 25

| HIGH BYTE | | | | LOW BYTE | | | |
|---|---|---|---|---|---|---|---|
| BIT 7 | BIT 6 | BIT 5 | BIT 4 | BIT 3 | BIT 2 | BIT 1 | BIT 0 |
| PAR #1 | PAR #2 | P #3 | P #4 | P #5 | ... | P #13 | P #14 | P #15 | PAR #16 |

FIG. 26A

| HIGH BYTE | | | | | | | | LOW BYTE | | | | | | | | BYTE |
|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | BIT # |
| 1 | 1 | 1 | 1 | 1 | 1 | 1 | 0 | 0 | 0 | 0 | 0 | 0 | 0 | 0 | 0 | MASK |

FIG. 26B

DATA* RESPONSE

| TS | D&T | RES | #EV | LFC | RND | VER | # OF BYTES |
|---|---|---|---|---|---|---|---|
| 1 | 4 | 1 | 1 | 2 | 1 | 2 | |

FIG. 27A

| HIGH BYTE | | | | | | | | LOW BYTE | | | | | | | | BYTE |
|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | BIT # |
| 1 | 0 | 0 | 0 | 0 | 0 | 0 | 1 | 0 | 0 | 0 | 0 | 0 | 0 | 0 | 0 | MASK |

FIG. 27B

DATA* RESPONSE

| TS | D&T | VER | # OF BYTES |
|---|---|---|---|
| 1 | 4 | 2 | 2 |

FIG. 28A

| HIGH BYTE | | | | | | | | LOW BYTE | | | | | | | | BYTE |
|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | BIT # |
| 1 | 0 | 0 | 0 | 0 | 0 | 1 | 1 | 0 | 0 | 1 | 0 | 0 | 0 | 0 | 0 | MASK |

FIG. 28B

DATA* RESPONSE

| TS | VER | D&T | ORGID | # OF BYTES |
|---|---|---|---|---|
| 1 | 2 | 4 | 3 | |

FIG. 41

| HEADER (38HEX) | BMM |
|---|---|

| FS$_{BMM}$ | #B | CMND(38HEX) | CRC | EM |
|---|---|---|---|---|
| | 1 | 1 | 2 | # OF BYTES |

FIG. 42A

| HEADER (39HEX) | BMM |
|---|---|

| FS$_{BMM}$ | #B | CMND(39HEX) | CRC | EM |
|---|---|---|---|---|
| | 1 | 1 | 2 | # OF BYTES |

FIG. 44

| HEADER (43HEX) | AMM |
|---|---|

| FS_BMM | #B | TF | TID | CMND (43HEX) | BIT MASK | CRC | EM | # OF BYTES |
|---|---|---|---|---|---|---|---|---|
| | 1 | 2 | 4 | 1 | 1 | 2 | | |

FIG. 45

| HEADER (12HEX) | BMM |
|---|---|

| FS_BMM | #B | CMND(12HEX) | DATA | CRC | EM |
|---|---|---|---|---|---|

| T_IW | T_S | N_A | N_R | N_T | #R_S | #R_R | #R_A | ASID | PARAMETERS MASK | # OF BYTES |
|---|---|---|---|---|---|---|---|---|---|---|
| 2 | 1 | 1 | 1 | 1 | 1 | 1 | 1 | 1 | 2 | |

FIG. 52

| HEADER (85HEX) | AMM |
|---|---|

| $FS_{BMM}$ | #B | TF | TID | CMND(85HEX) | CRC | EM | # OF BYTES |
|---|---|---|---|---|---|---|---|
| | 1 | 2 | 4 | 1 | 2 | | |

FIG. 53

| HEADER (17HEX) | BMM |
|---|---|

| $FS_{BMM}$ | #B | TF | ID | CMND(17HEX) | DATA | CRC | EM | # OF BYTES |
|---|---|---|---|---|---|---|---|---|
| | 1 | 2 | | 1 | | | | |

| $T_{IW}$ | $T_S$ | $N_A$ | $N_R$ | $N_T$ | $\#R_R$ | $\#R_T$ | ASID | PARAMETERS MASK | # OF BYTES |
|---|---|---|---|---|---|---|---|---|---|
| 2 | 1 | 1 | 1 | 1 | 1 | 1 | 1 | 2 | |

| $T_{CM}$ |
|---|
| 1 |

FIG. 55A

| # | MESSAGE TYPE MSGT | CODE |
|---|---|---|
| 1 | VERIFY RESPONSE | 10H |
| 2 | TAMPER RESPONSE | 11H |
| 3 | SET RESPONSE | 18H |
| 3A | SUSPENDED SET | 19H |
| 3B | SOFT SET | 1AH |
| 4 | READ DATA RESPONSE | 32H |
| 5 | WRITE DATA RESPONSE | 40H |
| 6 | ASSIGN SLOTS RESPONSE | 50H |
| 7 | CLEAR ASSIGNMENT RESPONSE | 51H |
| 8 | DEEP SLEEP RESPONSE | 60H |
| 9 | HARD WAKEUP RESPONSE | 61H |
| 10 | AUTO SET & WAKEUP RESPONSE | 21H |
| 11 | RESET DATA BLOCK RESPONSE | 2AH |
| 12 | START ALERT RESPONSE | 70H |
| 13 | STOP ALERT RESPONSE | 72H |
| 13A | ACKNOWLEDGE ALERT RESPONSE | 73H |
| 14 | START ALERT UNSYNCHRONIZED RESPONSE | 38H |
| 15 | STOP ALERT UNSYNCHRONIZED RESPONSE | 39H |
| 15A | ACK ALERT UNSYNCHRONIZED RESPONSE | 76H |

FIG. 55B

| # | MESSAGE TYPE MSGT | CODE | COMMENTS |
|---|---|---|---|
| 16 | UNSYNC. ALERT MESSAGE | 77H | THIS MESSAGE IS GENERATED ONCE THE TAG DETECTS AN ALERT AND IS IN ALERT UNSYNCHRONIZED MODE. |
| 17 | LONG VERIFY RESPONSE | 12H | |
| 18 | SYNC VERIFY RESPONSE | 13H | |
| 19 | FILTER RESPONSE | 14H | |
| 20 | START BURST MODE RESPONSE | 15H | |
| 21 | HARD VERIFY RESPONSE | 16H | |
| 21A | TRACK RESPONSE | 1DH | |
| 22 | ACKNOWLEDGE RESPONSE | 74H | |
| 23 | ADDRESSED VERIFY RESPONSE | 17H | |
| 24 | ADDRESSED READ EVENTS RESPONSE | 33H | |
| 25 | READ PARAMETERS RESPONSE | 24H | |
| 26 | WRITE PARAMETERS RESPONSE | 41H | |
| 27 | RESET STATUS RESPONSE | 43H | |
| 28 | LOCK RESPONSE | 85H | |

FIG. 56

| EVENTS | EVENT CODE |
|---|---|
| SET | 01H |
| SEAL TAMPERED/ RESISTANCE CHANGED | 02H |
| LOW BATTERY WARNING | 03H |
| SEAL OPEN OR CUT | 04H |
| SEAL CLOSE | 05H |
| SOFT SET | 07H |
| RTC STOPPED | 08H |
| DATABASE CORRUPTED | 09H |
| READ | 0AH |
| TIME CHANGED | 0BH |
| LIFE COUNTER IS EQUAL TO 0 | 0CH |

FIG. 57

| 7 | 6 | 5 | 4 | 3-2 | 1-0 |
|---|---|---|---|---|---|
| SET/ TAMPER | LOW BATTERY | INPUT$_0$ | SUS_SET | MODE | MODE CODE |

FIG. 58

| BYTE#/BIT# | 7 | 6 | 5 | 4 | 3 | 2 | 1 | 0 |
|---|---|---|---|---|---|---|---|---|
| 0 | 0 | MINUTES / 10 | | | MINUTES % 10 | | | |
| 1 | MONTH %4 | | HOURS / 10 | | HOURS % 10 | | | |
| 2 | MONTH / 4 | | DAYS / 10 | | DAYS % 10 | | | |
| 3 | YEARS / 10 | | | | YEARS % 10 | | | |

FIG. 59

| 7 | 6 | 5 | 4 | 3-2 | 1-0 |
|---|---|---|---|---|---|
| SET/TAMPER | LOW BATTERY | INPUT $T_0$ | SUS_SET | MODE | MODE CODE |

| 7 | 6 | 5 | 4 | 3 | 2 | 1 | 0 |
|---|---|---|---|---|---|---|---|
| HARDWARE ERR | DB ERROR | RTC ERR | EVENT COUNTER 0 | SLEEP MODE | BURST MODE | BUFFER FULL | COMMAND ERR |

FIG. 60B

| FS$_{SM}$ | #B | TF | TID | MT(18H) | TS | CRC | EM | # OF BYTES |
|---|---|---|---|---|---|---|---|---|
| | 1 | 2 | 4 | 1 | 1 | 2 | | |

| FS | #B | TF | TID | MT(32H) | TS | P#/P | DATA | CRC | EM | # OF BYTES |
|---|---|---|---|---|---|---|---|---|---|---|
| | 1 | 2 | 4 | 1 | 1 | 1 | N | 2 | | |

| FS | #B | TF | TID | MT(32H) | TS | P#/PK | DATA | CRC | EM | # OF BYTES |
|---|---|---|---|---|---|---|---|---|---|---|
| | 1 | 2 | 4 | 1 | 1 | 1 | N | 2 | | |

FIG. 63

| FS | #B | TF | TID | MT(B2H) | TS | CRC | EM | # OF BYTES |
|---|---|---|---|---|---|---|---|---|
| | 1 | 2 | 4 | 1 | 1 | 2 | | |

FIG. 65

| FS | | | | | | | |
|---|---|---|---|---|---|---|---|
| #B | TF | TID | MT(COH) | TS | CRC | EM | # OF BYTES |
| 1 | 2 | 4 | 1 | 1 | 2 | | |

FIG. 67

| FS$_{SM}$ | #B | TF | TID | MT(51H) | TS | CRC | EM |
|---|---|---|---|---|---|---|---|
| | 1 | 2 | 4 | 1 | 1 | 2 | # OF BYTES |

FIG. 68

| FS$_{SM}$ | #B | TF | TID | MT(60H) | TS | CRC | EM |
|---|---|---|---|---|---|---|---|
| | 1 | 2 | 4 | 1 | 1 | 2 | # OF BYTES |

FIG. 69

| FS$_{SM}$ | #B | TF | TID | MT(61H) | TS | CRC | EM |
|---|---|---|---|---|---|---|---|
| | 1 | 2 | 4 | 1 | 1 | 2 | # OF BYTES |

FIG. 70

| FS_SM | #B | TF | TID | MT(2AH) | TS | CRC | EM |
|---|---|---|---|---|---|---|---|
| | 1 | 2 | 4 | 1 | 1 | 2 | # OF BYTES |

FIG. 71

| FS_SM | #B | TF | TID | MT(70H) | TS | CRC | EM |
|---|---|---|---|---|---|---|---|
| | 1 | 2 | 4 | 1 | 1 | 2 | # OF BYTES |

FIG. 72

| FS_SM | #B | TF | TID | MT(72H) | TS | CRC | EM |
|---|---|---|---|---|---|---|---|
| | 1 | 2 | 4 | 1 | 1 | 2 | # OF BYTES |

FIG. 73

| FS_SM | #B | TF | TID | MT(73H) | TS | CRC | EM |
|---|---|---|---|---|---|---|---|
| | 1 | 2 | 4 | 1 | 1 | 2 | # OF BYTES |

FIG. 74

| FS$_{SM}$ | #B | TF | TID | MT(38H) | TS | CRC | EM | # OF BYTES |
|---|---|---|---|---|---|---|---|---|
|  | 1 | 2 | 4 | 1 | 1 | 2 |  |  |

FIG. 75

| FS$_{SM}$ | #B | TF | TID | MT(39H) | TS | CRC | EM | # OF BYTES |
|---|---|---|---|---|---|---|---|---|
|  | 1 | 2 | 4 | 1 | 1 | 2 |  |  |

FIG. 76

| FS$_{SM}$ | #B | TF | TID | MT(76H) | TS | CRC | EM | # OF BYTES |
|---|---|---|---|---|---|---|---|---|
|  | 1 | 2 | 4 | 1 | 1 | 2 |  |  |

FIG. 77

| FS$_{SM}$ | #B | TF | TID | MT(77H) | TS | CRC | EM | # OF BYTES |
|---|---|---|---|---|---|---|---|---|
|  | 1 | 2 | 4 | 1 | 1 | 2 |  |  |

FIG. 78

| FS$_{SM}$ | #B | TF | TID | MT(43H) | TS | CRC | EM | |
|---|---|---|---|---|---|---|---|---|
| | 1 | 2 | 4 | 1 | 1 | 2 | | # OF BYTES |

FIG. 79

| FS$_{SM}$ | #B | TF | TID | MT(41H) | TS | CRC | EM | |
|---|---|---|---|---|---|---|---|---|
| | 1 | 2 | 4 | 1 | 1 | 2 | | # OF BYTES |

FIG. 80

| FS$_{SM}$ | #B | TF | TID | MT(85H) | TS | CRC | EM | |
|---|---|---|---|---|---|---|---|---|
| | 1 | 2 | 4 | 1 | 1 | 2 | | # OF BYTES |

FIG. 81

| FS$_{SM}$ | #B | TF | TID | MT(19H) | TS | CRC | EM | |
|---|---|---|---|---|---|---|---|---|
| | 1 | 2 | 4 | 1 | 1 | 2 | | # OF BYTES |

FIG. 82

| FS_SM | #B | TF | TID | MT(33) | EV# | EVENT CODE | D&T | RES | RND | CHKSUM | EM |
|---|---|---|---|---|---|---|---|---|---|---|---|
| | 1 | 2 | 4 | 1 | 1 | 1 | 4 | 1 | 1 | 1 | | # OF BYTES |

FIG. 83A

| FS_SM | #B | TF | TID | MT(33) | EV# | EVENT CODE | D&T | RES | RND | CHSUM | EM |
|---|---|---|---|---|---|---|---|---|---|---|---|
| | 1 | 2 | 4 | 1 | 1 | 1 | 4 | 1 | 1 | 1 | | # OF BYTES |

FIG. 83B

| FS_SM | #B | TF | TID | MT(33) | EV# | EVENT CODE* | RID | ** | CHSUM | EM |
|---|---|---|---|---|---|---|---|---|---|---|
| | 1 | 2 | 4 | 1 | 1 | 1 | 4 | 2 | 1 | | # OF BYTES |

FIG. 84

| EVENT | EVENT CODE | MSB | LSB |
|---|---|---|---|
| SET | 0X01 | 0 | 0 |
| SOFT SET | 0X07 | 0 | 0 |
| READ | 0X0A | 0 | 0 |
| TIME CHANGED | 0X0B | DELTA | 0 |

APPARATUS AND METHODS FOR CELLULAR COMMUNICATION

REFERENCE TO CO-PENDING APPLICATIONS

Applicants hereby claim priority of U.S. Provisional Patent Application Ser. No. 60/200,646, filed Apr. 28, 2000, entitled "Radio Link Communications Protocol".

REFERENCE TO COMPUTER PROGRAM LISTING APPENDIX

Computer program listing appendices are submitted herewith on one compact disc and one duplicate compact disc. The total number of compact discs including duplicates is two. There are three files on the compact disc which are text files in hexadecimal format and are termed herein Appendices A through C respectively. Their names, dates of creation, directory locations, and sizes in bytes are:

Appendix A: located at reader\avr\exe containing file jmp_1_10.hex of Apr. 12, 2001 and of length 19,486 bytes.

Appendix B: located at reader\mcu\exe containing file Mcu_1_09.S19 of Apr. 12, 2001 and of length 25,924 bytes.

Appendix C: located at seal\exe containing file Main_pr.hex of Apr. 12, 2001 and of length 44,368 bytes.

The material on the compact discs is incorporated by reference herein.

FIELD OF THE INVENTION

The present invention relates to apparatus and methods for cellular communication.

BACKGROUND OF THE INVENTION

Conventional cellular communication systems are described inter alia in the following U.S. Patents: U.S. Pat. Nos. 4,222,115; 4,347,625; 4,399,555; 4,759,051; 4,799,252; 4,802,235; 4,852,048; 4,866,710; 4,866,788; 4,914,651.

The disclosures of all publications mentioned in the specification and of the publications cited therein are hereby incorporated by reference.

SUMMARY OF THE INVENTION

The present invention seeks to provide a communication system such as but not limited to an RF (radio frequency) communication system or other cellular communication system comprising one or more readers or base stations and a plurality of typical mobile units also interchangeably termed herein "subscribers", "tags" or "seals". Communication between each reader and an individual tag or seal is based on a slotted ALOHA approach as shown and described herein. Typically, the communication scheme shown and described herein is implemented by burning appropriate reader software into a chip or chips residing in each the readers and/or burning appropriate tag/seal software into a chip or chips residing in each of the mobile units.

The RF communication system shown and described herein is useful in a broad variety of applications including but not limited to asset tracking, fleet monitoring, cargo security, asset tracking and yard management.

The system of the present invention typically operates in TDMA (time division multiple access) mode, where the readers, operating as base stations, typically interrogate for presence of tags, and the tags respond in a random access mode, such as one which employs slotted ALOHA or alternatively in a fixed assignment access mode.

The tags and seals are typically battery operated devices. In order to save power most of the time the tags and the seals are typically in a sleep mode. Once in a while they wake up and search for presence of a reader in the neighborhood. A tag responds in a random time slot within a random access receiving window.

A fixed assignment mode is a mode where a tag response occurs in a predefined time slot known to the system. In applications where the tags or seals by nature tend to be stationary, a fixed assignment mode of operation is preferred because it generally provides higher system throughput. The reader may be instructed by a controller to work in a fixed assignment mode. Alternatively, an adaptive algorithm built into the base station may generate the decisions for switching back and forth between the a fixed assignment mode and a random access mode.

A communication session is a reader transmission interval followed by a reader-receiving interval.

The system of the present invention preferably uses either a spread spectrum RF link or a narrow band RF link.

In applications where more than one reader is in use, the host computer controlling the readers typically synchronizes the readers to prevent their collision.

Although the invention is described throughout with particular applicability to tags and seals, it is appreciated that the invention may also be applicable more generally, wherein tags and seals are generalized to communication subscribers generally having awake and sleeping modes.

There is thus provided in accordance with a preferred embodiment of the present invention, a tag interrogation system including:

at least one base station; and a plurality of tags, each having an awake mode and a sleeping mode;

wherein each base station is operative to broadcast messages which are received by the plurality of tags and has a receiving window during which it is operative to receive messages sent by individual tags from among the plurality of tags, and wherein at least some of the messages broadcast by at least some of the base stations include an indication of the time at which a future receiving window is due to open, thereby to allow tags to conserve power by remaining in the sleeping mode until the future receiving window opens.

There is additionally provided in accordance with a preferred embodiment of the present invention a tag interrogation system comprising:

at least one base station; and a plurality of tags, wherein each base station has at least two receiving windows during which the base station is operative to receive messages sent by individual tags from among the plurality of tags, the receiving windows including:

a first, fixed assignment, receiving window comprising a plurality of time slots respectively allocated to the plurality of tags; and a second, random access, receiving window during which the base station is operative to receive communications from any of the plurality of tags.

It is appreciated that there the first receiving window may precede or follow the second receiving window.

BRIEF DESCRIPTION OF THE DRAWINGS AND APPENDICES

The present invention will be understood and appreciated from the following detailed description, taken in conjunction with the drawings and appendices in which:

FIG. 2 is an illustration of a known Manchester code useful in the present invention;

FIG. 3 is a simplified illustration of a synchronization stream employed in accordance with a preferred embodiment of the present invention;

FIG. 4 is a simplified illustration of a synchronization stream employed in accordance with a preferred embodiment of the present invention;

FIG. 5 is a table illustrating various combinations of synchronization streams employed in accordance with a preferred embodiment of the present invention;

FIGS. 13–15 are simplified illustrations of various commands transmitted by a reader following transmission of the string illustrated in FIG. 12;

FIG. 16 is a simplified illustration of a response transmitted by a seal in response to the transmission of FIG. 12 and a transmission of one of FIGS. 13–15;

FIGS. 18A–18F are together a table of commands transmitted by the reader in the course of a communication session;

FIGS. 19A and 19B are together a table, which summarizes system parameters employed in accordance with a preferred embodiment of the present invention;

FIGS. 20A and 20B are together a table, which summarizes the communication time intervals employed in accordance with a preferred embodiment of the present invention;

FIG. 21 is a simplified illustration of a preferred string transmitted by a reader in order to initiate communications;

FIGS. 22–54 are each an illustration of a string which corresponds to an individual one of the commands transmitted by the reader, which appear in FIGS. 18A–18F;

FIGS. 55A and 55B are together a table, which summarizes various message types employed in seal response communications;

FIG. 56 is a table illustrating various types of events stored in a memory of a seal;

FIG. 57 is a string transmitted by the seal, which indicates the status of the seal;

FIG. 58 illustrates a format for the date and time transmitted by the seal in accordance with a preferred embodiment of the present invention;

FIG. 59 illustrates a format for the Long Status transmitted by the seal;

FIGS. 60A–83B are each an illustration of a string which corresponds to an individual response of the seal to an individual one of the commands which appear in FIGS. 18A–18F; and FIG. 84 is a table listing the values of the ** field of FIG. 83B.

LIST OF APPENDICES

Appendices A through C are computer listings which, taken together, form a preferred software embodiment of the present invention.

DETAILED DESCRIPTION OF PREFERRED EMBODIMENTS

Figure 1:
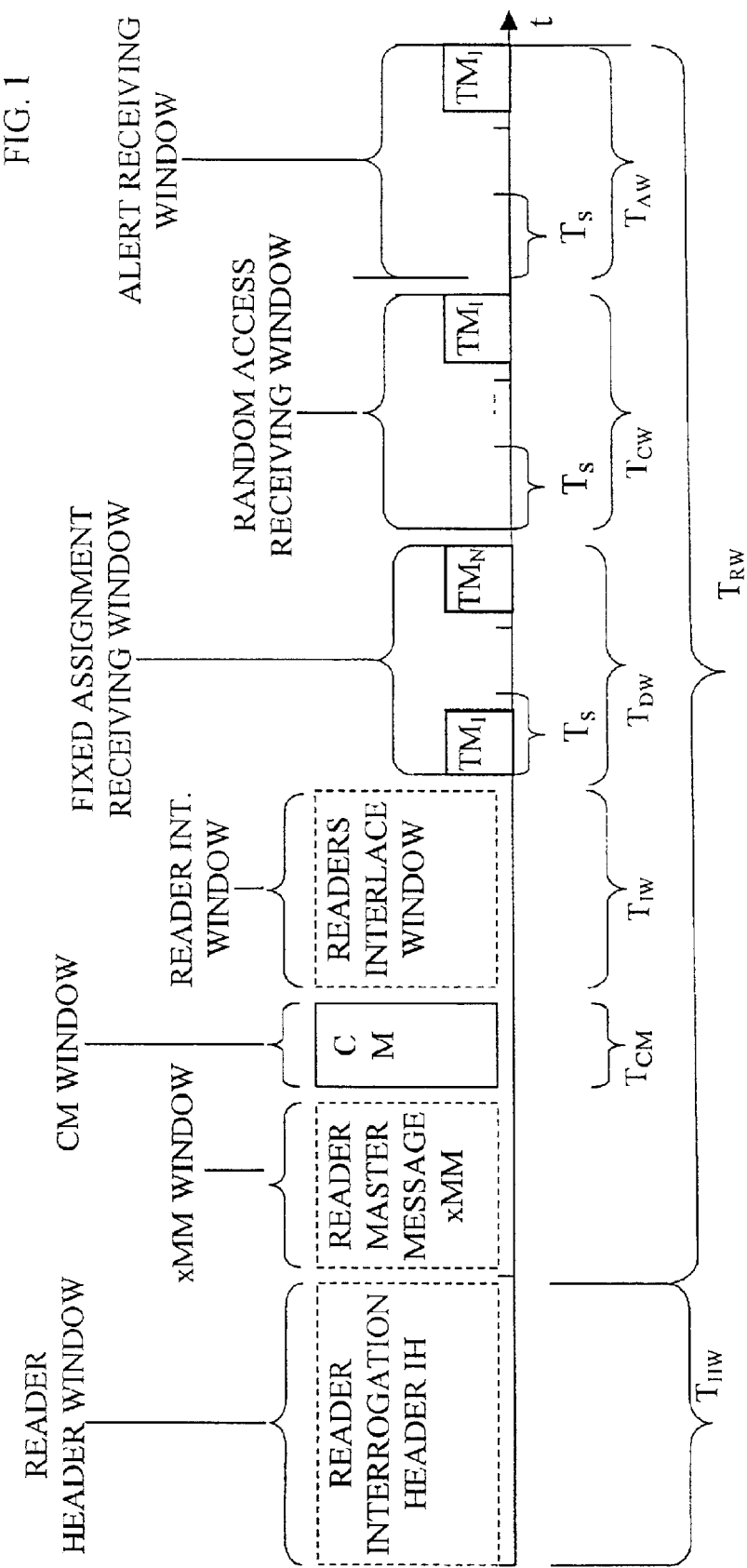
FIG. 1 is a simplified timing diagram illustrating the relationship between the timing of various channels in accordance with a preferred embodiment of the present invention.

As shown in FIG. 1, a complete communication session is typically divided into several windows, whose relative durations are not represented proportionally in the illustration: A Reader Header Window, a Reader Master Message Window also termed herein the "xMM window", a Reader Calibration Message Window also termed herein the "CM window", a Reader Interlace Window, a Fixed Assignment Receiving Window, a Random Access Receiving Window and an Alert Receiving Window.

The Fixed Assignment Receiving Window includes a plurality of $N_r$ time-slots respectively allocated to the $N_r$ mobile units which respond therewithin. The random access Receiving Window may be operative in accordance with conventional Slotted ALOHA procedure.

Each of the windows forming a communication session in accordance with a preferred embodiment of the present invention is now described:

a. Reader Header Window: As mentioned, the tags periodically wake up looking for a reader. The wake up period is slightly shorter than the $T_{HW}$ time interval shown in FIG. 1. When a reader starts a new session, it transmits a header with a duration of $T_{HW}$. This provides the tag with the ability to detect the reader. The header transmitted by the reader contains system and reader information. The tag receives that information and typically conducts an application-specific internal process of header analysis.

In order to save energy at the tag because of the length of the header, the tag may return to sleep after detecting the presence of the reader, and wake up again at the end of the header. Tags may wake with a random phase relative to the reader, or in phase. Waking in phase with the reader is a preferred mode of operation, to minimize power consumption.

Figure 12:
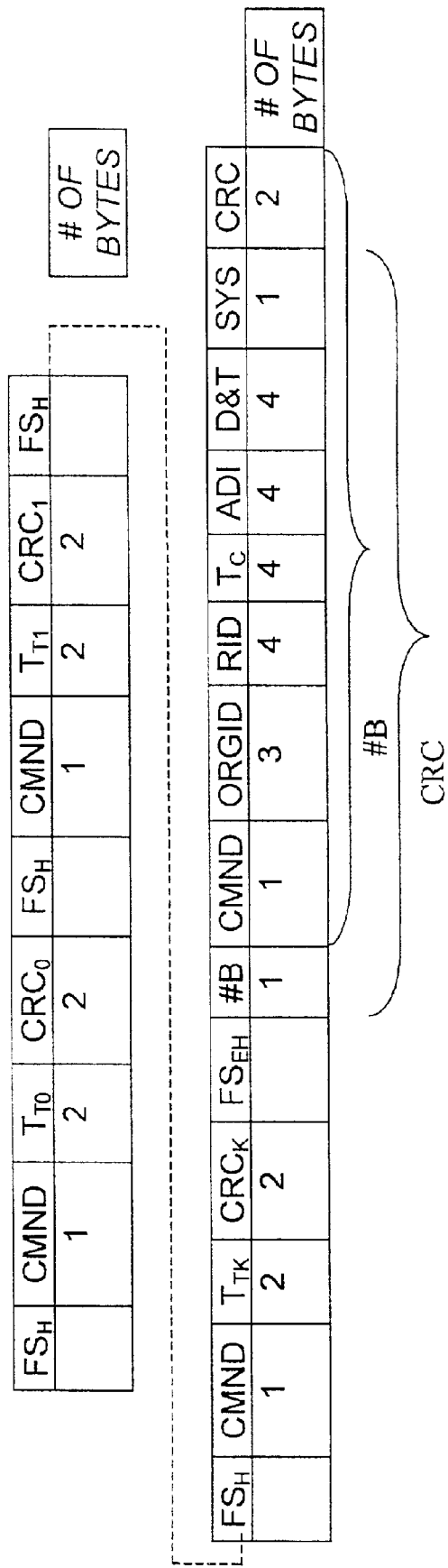
FIG. 12 is a simplified illustration of a preferred string transmitted by a reader in order to initiate communications.

Additionally or alternatively, the tag may employ information such as the $T_{Tl}$ information contained in the string shown in FIG. 12, to indicate the remaining length of the string.

b. Reader Master Message Window: After the header, the reader continues with a broadcast message to all tags that are in the receiving zone. This message provides the tags with important information about the nature of the session. In the case of long master messages, the message is split into packets.

c. Reader Calibration Message Window: This is an optional window for calibration messages.

d. Reader Interlace Window: This optional window allows the system to activate several interlaced readers which, in some applications, increases system throughput. In this mode all readers share the same receiving window.

e. Fixed Assignment Receiving Window: When the system is steady, meaning that the tags or seals are, for the most part, not mobile, Fixed Assignment mode of operation is typically employed. In such cases the tags after switching modes respond in this window in a specific time slot. Each tag is assigned to a different specific time slot. In this window and possibly in other windows, it may be that the responses are long. If this is the case, the responses are split into packets. In a case where a tag is receiving signals from more than one reader, the tag should keep track for each reader individually. In this way the tag responds to each reader in the right time slot.

f. Random Access Receiving Window: When the system is dynamic in the sense that the tags or seals repeatedly pass in and out of the reading zone of the reader, the tags respond in this window. In the random window each tag responds in a random time slot. It is also possible to have more than one responding tag in the same time slot. Having more than one tag in the same time slot generates a collision. It is possible to have more than one transmission from a tag in this window. Retransmissions increase the probability of tag detection and are determined in the Broadcast message. For example, within the random access receiving window, communication may proceed in accordance with a slotted ALOHA procedure.

g. Alert Window: The Alert Window may be employed for high priority communications and is intended to provide priority to seals which contain emergency messages.

Physical links useful in implementing a preferred embodiment of the present invention are now described, including a down-link (also termed herein "forward link") linking the reader to the tags/seals, and an up-link ("return link") linking the tags/seals to the reader.

Down-link (Forward link): The Down-link is the link from the reader to the tags and/or seals. The Modulation is typically ASK (Amplitude shift keying), FSK (Frequency shift keying) or PSK (Phase shift keying). The carrier typically comprises one of the ISM bands approved for short-range devices, 916 or 433.92 Mhz. The Data rate is typically 16 kbps. The Base band coding may be Manchester-based as shown in FIG. 2. The Frame Preamble (FPH) typically comprises a string of 16 bits with the logic value "0". The Frame Synchronization of the down-link may be based on an 8-bit string as shown in FIG. 3. The second and third bits may not comply with the Manchester code rules. Bits 5 and 6 denote the direction of the link. Bits 3 and 4 denote the Down-Link direction. Bits 0, 1 and 2 denote the type of sync. Different syncs are detailed in FIG. 5.

Up-link (Return link): The Up-link is the link from the tags and/or seals to the reader. A suitable Modulation is ASK (Amplitude shift keying), FSK (Frequency shift keying) or PSK (Phase shift keying). A suitable carrier is typically one of the ISM bands approved for short-range devices, 916 or 433.92 Mhz. A suitable Data rate may be 20 kbps. The Base band coding may be Manchester. The Frame Preamble (FPH) may be a string of 16 bits with the logic value "0". A suitable Frame synchronization is based on a string of 8 bits interval, as shown in FIG. 4. The second and third bits do not comply with the Manchester code rules. Bits 5 and 6 denote the direction of the link. Bits 3 and 4 denote the Up-Link direction. Bits 0, 1 and 2 denote the type of the sync. Different syncs are detailed in FIG. 5.

Communication sessions within the system shown and described herein are typically master-slave interactions, where the reader is the master. In some special cases, the tags rather than the reader may start a session. Sessions may or may not be synchronized, where "synchronized" means that readers periodically generate communication sessions with the tags or seals. The period may be long or short. "Unsynchronized" sessions are sessions where tags communicate in sessions which are not initiated by a reader. When the readers synchronously transmit commands into the air, tags typically monitor the nature of the received strings, since each string may or may not relate to the tag. In the case where the string is related to the tag, the tag should act accordingly. Otherwise, i.e. if the string is not related to the tag, the tag skips the ongoing session cycle and looks for the next one.

In some applications, it may be preferable to combine the master/slave embodiment with the alternate embodiment described above in which tags and seals are allowed to generate spurious sessions by themselves. If the two embodiments are combined, the system leaves room for that to happen by providing relieved master/slave cycles.

Typically, there are several types or modes of communication sessions such as the following session types: general-mode communication sessions, sessions involving transmission of packets to and from the reader, sessions involving transmission of tracking messages to and from the reader, reader sessions with or without packets and without tag transmissions; addressed sessions involving packet transmissions to and from the reader and the tag; and unsynchronized sessions. Each of the above session types is described herein in detail:

a. General Mode: In the general mode, the reader transmits the IH and the BMM strings. It may be that several readers are interlaced together tag messages (TMs, described in detail below) can come in the various windows.

b. Sessions involving transmission of packets to and from the reader: The reader transmits the IH and the BMM strings. If there are several BMM strings they are in the form of packets. Tag messages (TMs, described in detail below) come in the assigned window. In case of an alarm, the tags can burst in the alarm window. Long TMs come in the form of packets.

c. Sessions involving transmission of Tracking messages to the tags: The reader transmits the IH, BMM and the TMM strings. The tags receive the message, during which the power continuously decreases, and report back the final portion of the message which it succeeded in receiving, thereby indicating to the reader the minimal level of power which that tag requires in order to receive. This mechanism is particularly useful for asset tracking applications.

d. Reader sessions with or without packets and without TAG transmissions: The reader transmits the IH and the BMM strings. Because of the nature of these BMMs they are in form of packets.

e. Addressed sessions involving packet transmissions to and from the reader and the tag: These sessions are very similar to the above-described packet transmission sessions, but here packets are addressed to one specific tag.

f. Unsynchronized Sessions: All the previous session modes obeyed conventional Master-Slave rules, however in this mode, readers, tags, and seals are at the same level. All sessions in this mode are random sessions.

Figure 6:
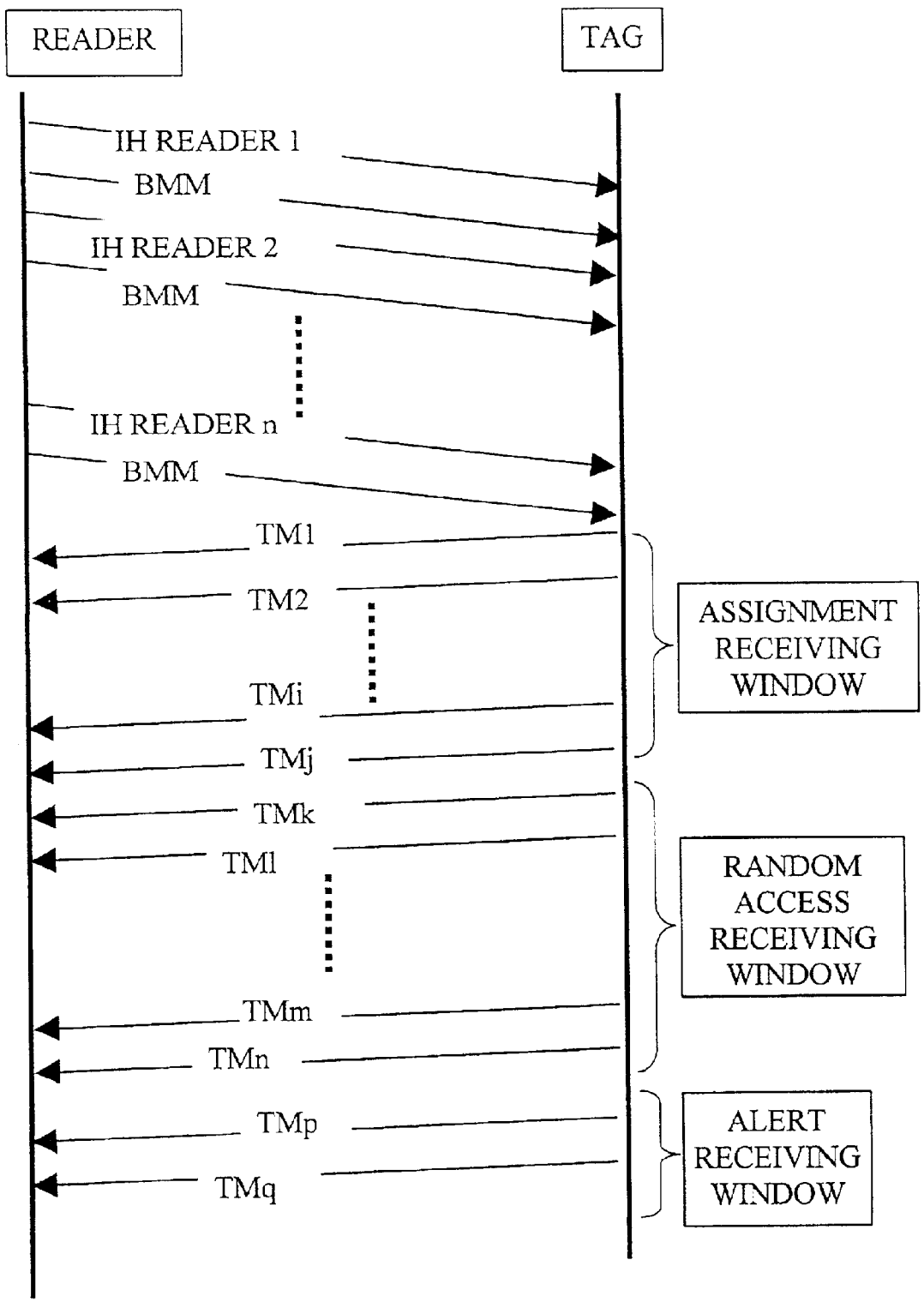
FIGS. 6–11 are simplified illustrations of message flows in various modes of operation in accordance with a preferred embodiment of the present invention.

FIG. 6 illustrates the various reader transmission windows of FIG. 1 and responses from the tags associated therewith.

Figure 7:
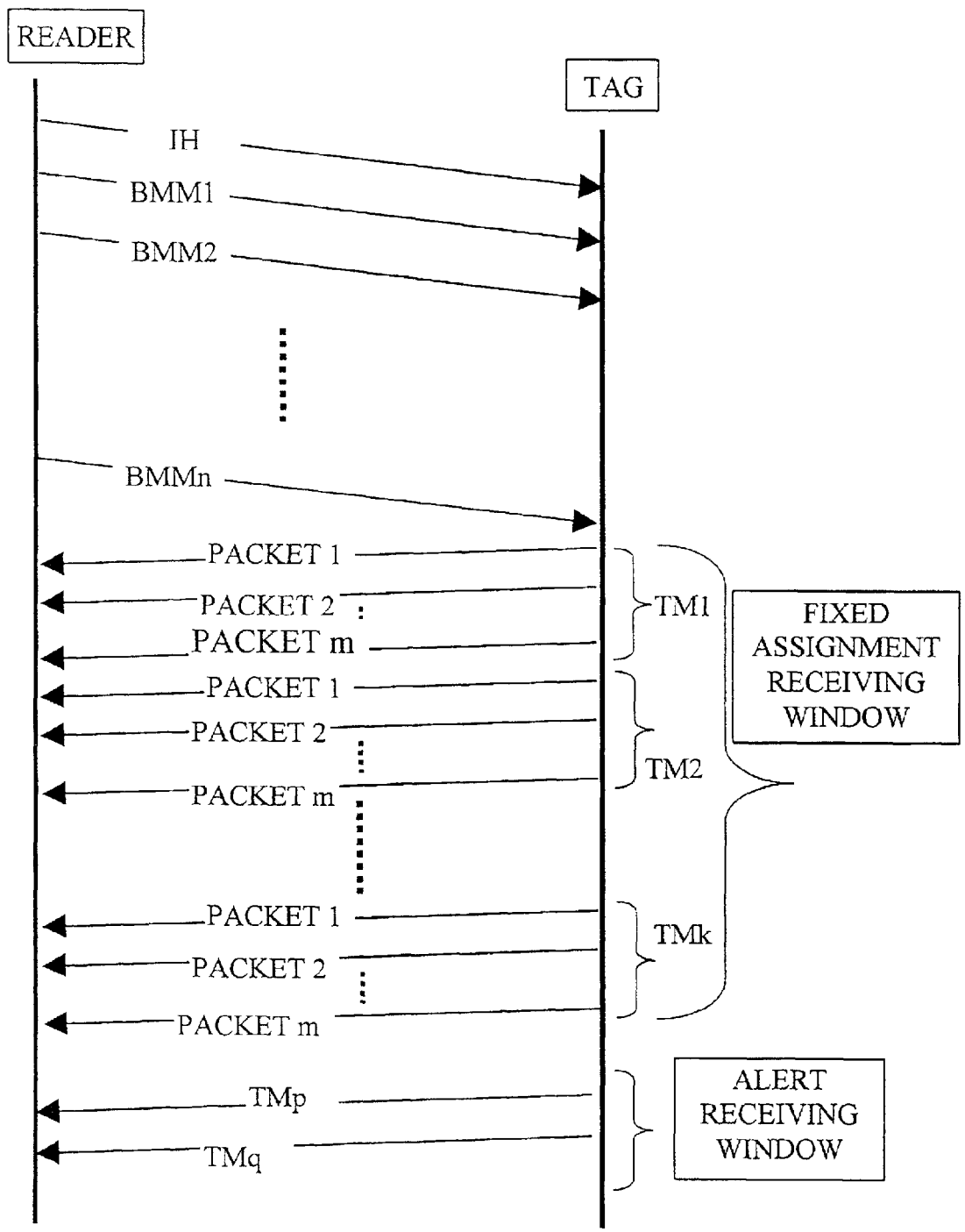

FIG. 7 illustrates reader transmission and tag responses involving packets in the fixed assignment receiving window of FIG. 1 and seal messages in the alert receiving window of FIG. 1.

Figure 8:
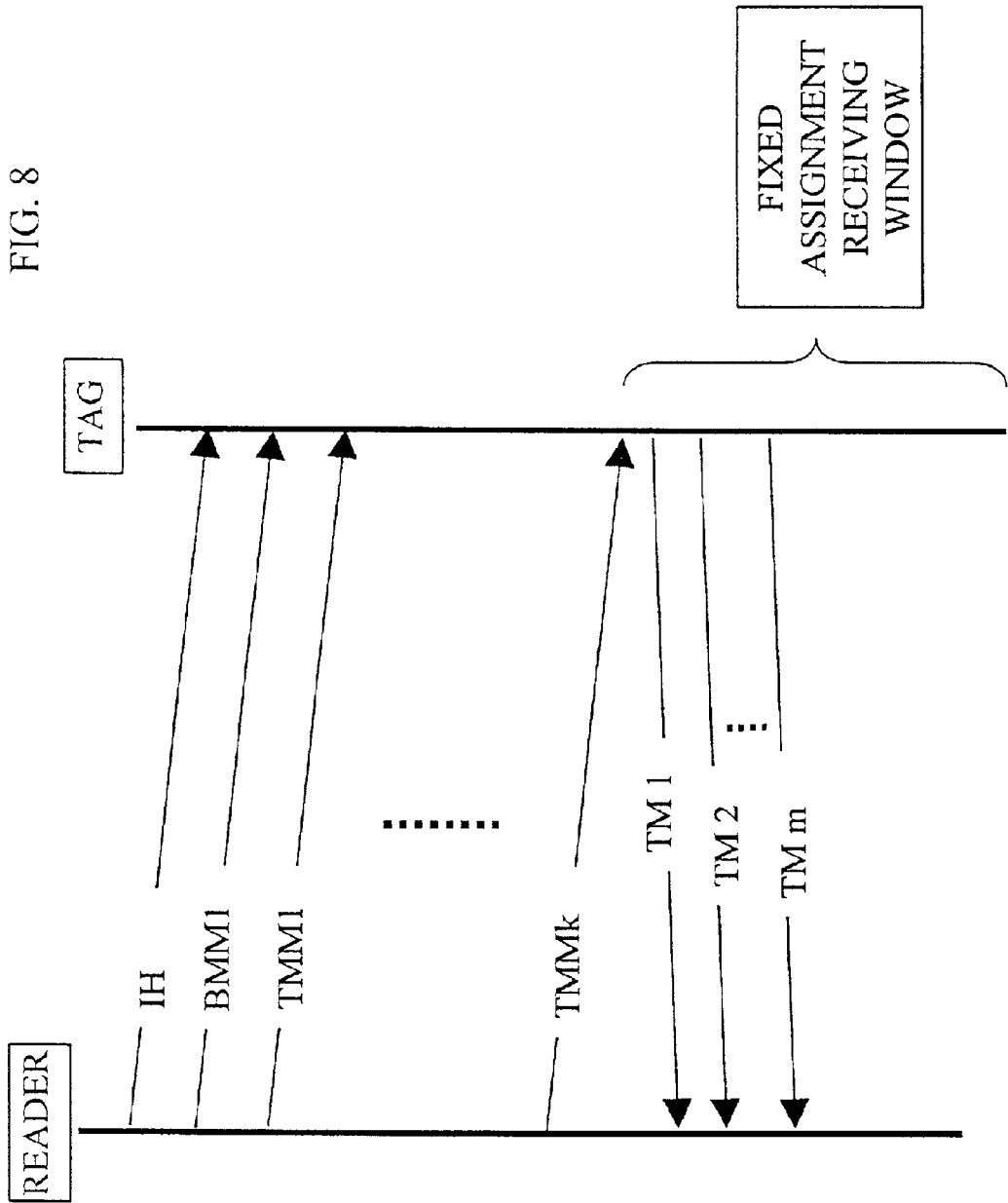

FIG. 8 illustrates reader transmission using track messages and tag responses in the fixed assignment receiving window of FIG. 1.

Figure 9:
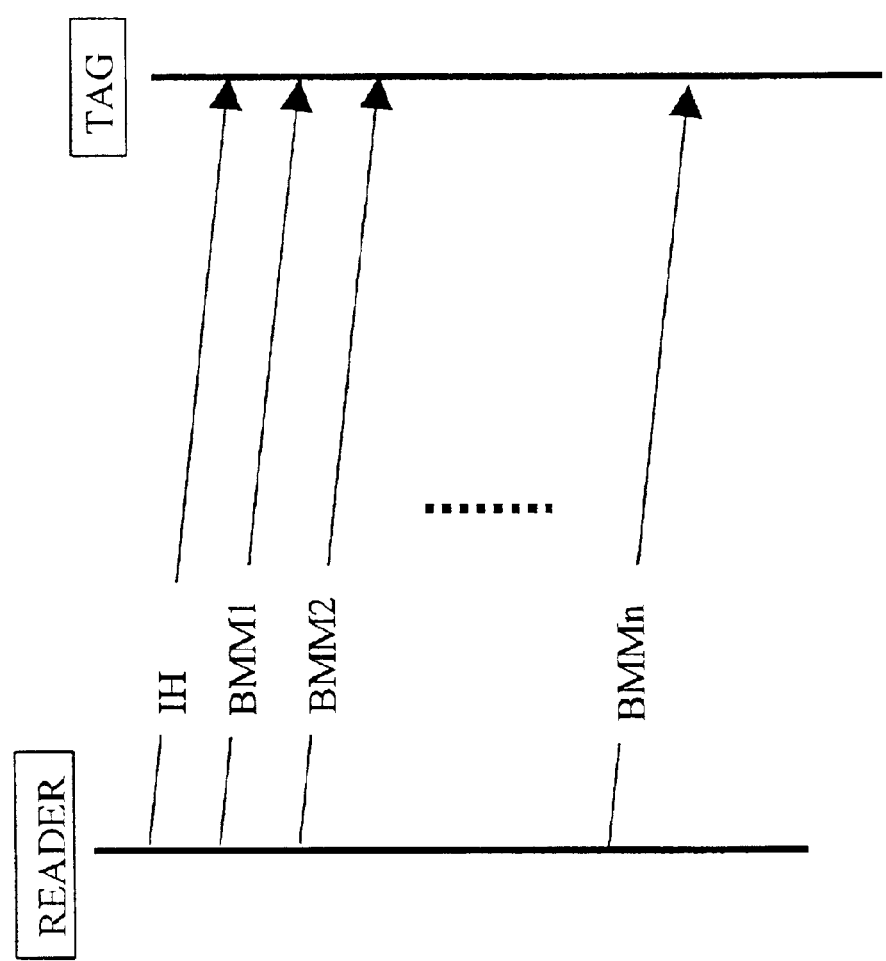

FIG. 9 illustrates reader transmission using packets, for BMM messages.

Figure 10:
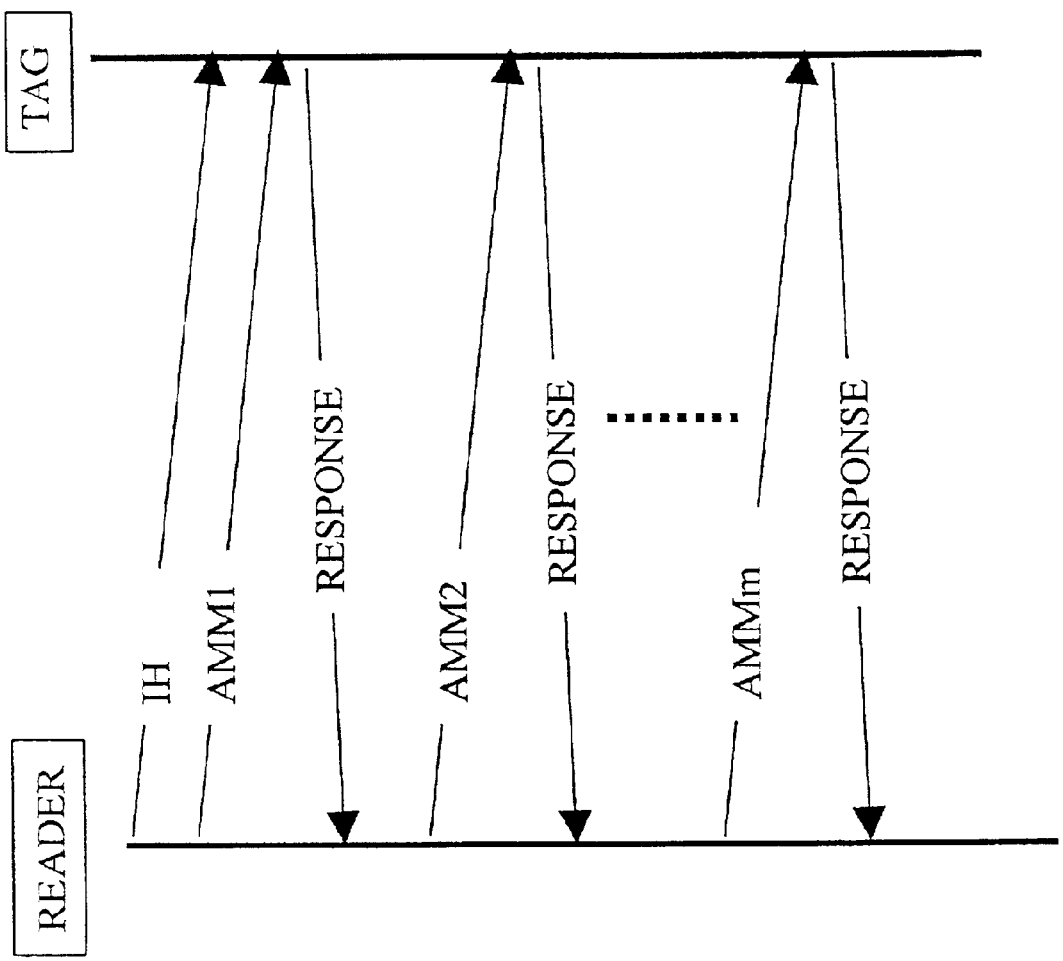

FIG. 10 illustrates reader transmission using packets, for AMM messages.

Figure 11:
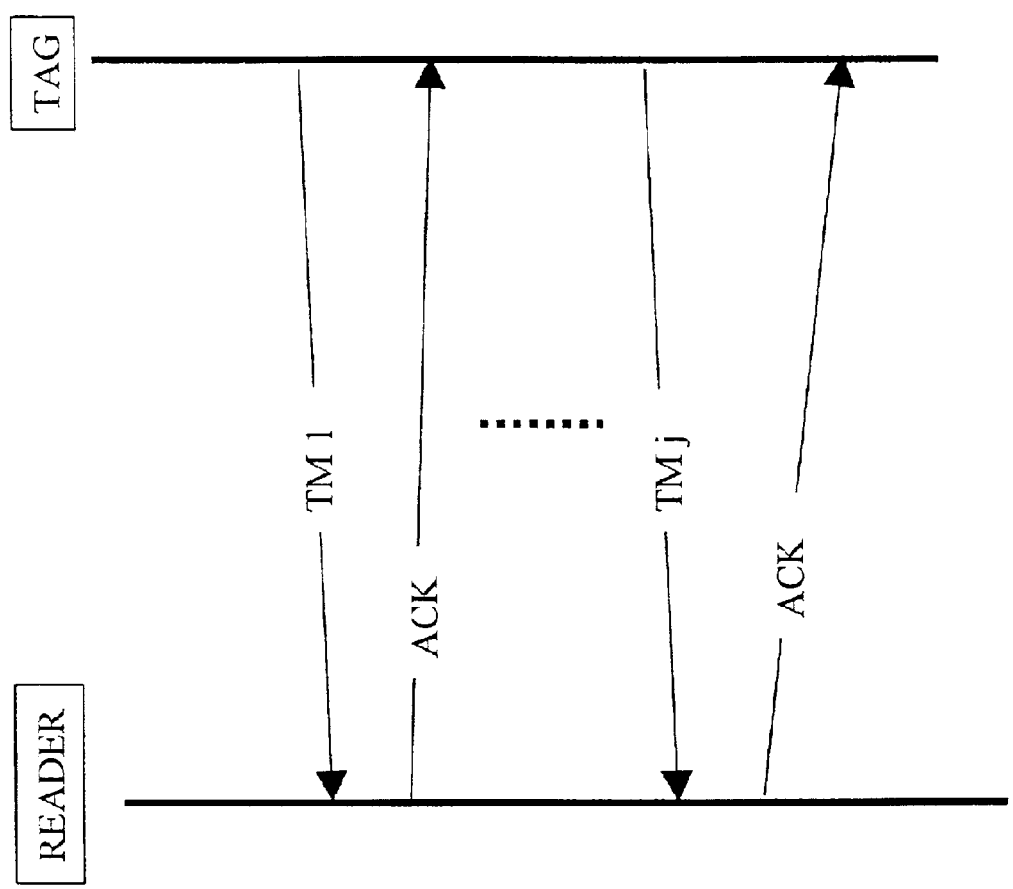

FIG. 11 illustrates an unsynchronized mode of communication.

FIG. 12 is a diagram of a preferred format for an interrogation header (IH) string transmitted by a reader as it initiates a communication session. Each reader IH string typically lasts for $T_{HW}$ seconds and has a resolution of 1.024 msec. This time duration is synchronized with the tags. The tags wake up in a period slightly shorter than $T_{HW}$. The default value for $T_{HW}$ typically is approximately 3000 ms.

The notation employed in FIG. 12 is as follows:

$F_{SH}$ & $F_{SEH}$: Frame syncs. A frame sync typically lasts for 512 microsec.

B: The number of bytes up and including the last CRC byte.

CMND: General command for this session.

$T_{Ti}$ (i=0,1... K): Time which will elapse until broadcast of the ORGID field, with some safety margins and a resolution of e.g. 1.024 msec, in order to allow tags to sleep until such time has elapsed.

$CRC_1$ (i=0,1 . . . K): Cyclic redundancy checks for the CMND and $T_{Ti}$ fields.

ORGID: A unique ID of the user. Typically this is a prefix to the tag ID, which is common to all tags of a given user.

RID: ID of the reader.

$T_c$: The cycle time to the next Interrogation Header (IH), if any.

ADI: A 4-byte identifier for group access. ADI=0 signifies a broadcast message to all tags.

D&T: This is the current date and time of the reader in conventional GMT notation, as described in detail below.

SYS: A system qualifier which the reader uses to indicate characteristics of the entire system of readers and tags e.g. whether or not the system is capable of authenticating its messages.

CRC: cyclic redundancy check for fields #B to SYS inclusive.

The last CMND (command) field in the string of FIG. 12 is for the tags, allowing them to jump through and to detect an expected value. The last CMND field also allows tags to skip the wakeup during the IH string based on the prior knowledge of the system timings, and to jump directly to the last CMND field.

Tags that successfully detect, once, the presence of a reader automatically use the possibility to wakeup synchronously. If the wakeup is unsuccessful, these tags go back to the default mode with default value of waking up every $T_{HW}$ in a random phase.

CRC computations may be based on the following CCITT polynomial which has a 2-byte result:

$$X^{16}+X^{12}+X^5+1$$

where X is the bit string of the message.

Figure 13:
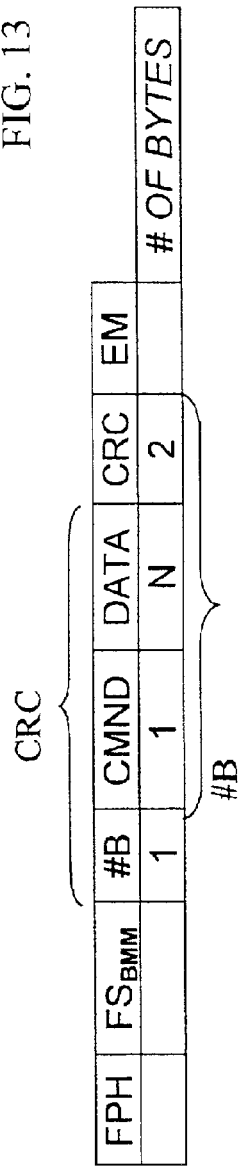

FIG. 13 is a diagram of a preferred format for a reader broadcast master message (BMM) string which is typically transmitted by a reader after it transmits the interrogation header (IH) string of FIG. 12. The BMM string of FIG. 13 details the nature of the command and provides the information required to execute the command.

The notation employed in FIG. 13 is as follows:

FPH: Preamble of the string.

$FS_{BMM}$: The frame syncs for the BMM. A frame sync typically lasts for 512 microsec.

B: Length of the substring including the CMND, the DATA field, and the CRC.

CMND: The command for this session.

DATA: Data relevant to execution of the command.

CRC: Cyclic redundancy check for the #B, CMND and DATA fields.

EM: END of MESSAGE, typically including one stop bit with the value "0", and a 448 microsec break.

FIG. 14 is a diagram of a preferred format for a reader Tracking Master Message (TMM) string. The TMM string of FIG. 14 details the nature of the track command and provides the information required to execute the command.

The notation employed in FIG. 14 is as follows:

$FS_{BMM}$: Frame syncs for the BMM string of FIG. 13. A frame sync typically lasts for 512 microsec.

B: Length of the substring including the CMND, DATA and CRC fields.

k=1 . . . K. k: Index of the Tracking message

K is the total number of Tracking messages.

CRC: Cyclic redundancy check for the #B, CMND, and DATA fields.

EM: End of message, typically comprising a stop bit with the value "0", and a 448 microsec break.

FIG. 15 is a diagram of a preferred format for an addressed master message (AMM) string which is typically transmitted by a reader to indicate a specific tag ID, as it approaches a specific tag. Typically, the addressed master message is transmitted after the reader transmits the interrogation header (IH) string of FIG. 12. The string of FIG. 15 includes information required to execute a command, e.g. a command whose nature is described in a BMM message or in a TMM message, together with the tag ID of the tag which is to execute the command. Typical reader-to-seal commands are listed in the table of FIGS. 18A–18E.

It is appreciated that following transmission of the string of FIG. 12, one of the strings of FIGS. 13–15 is transmitted.

The notation employed in FIG. 15 is as follows:

$FS_{AMM}$: Frame syncs for the AMM. A frame sync typically lasts for 512 microsec.

TF: Tag family's code. This indicates the type of tag that is being used.

TID: Tag's ID code.

FIG. 16 is a diagram of a preferred format for a tag Message (TM) string which is typically transmitted by a tag upon receipt of an Addressed Master Message string (FIG. 15) from a reader. If a tag Message string is long, it is split into packets. Packet indexing typically appears at the beginning of the DATA field.

Figure 17:
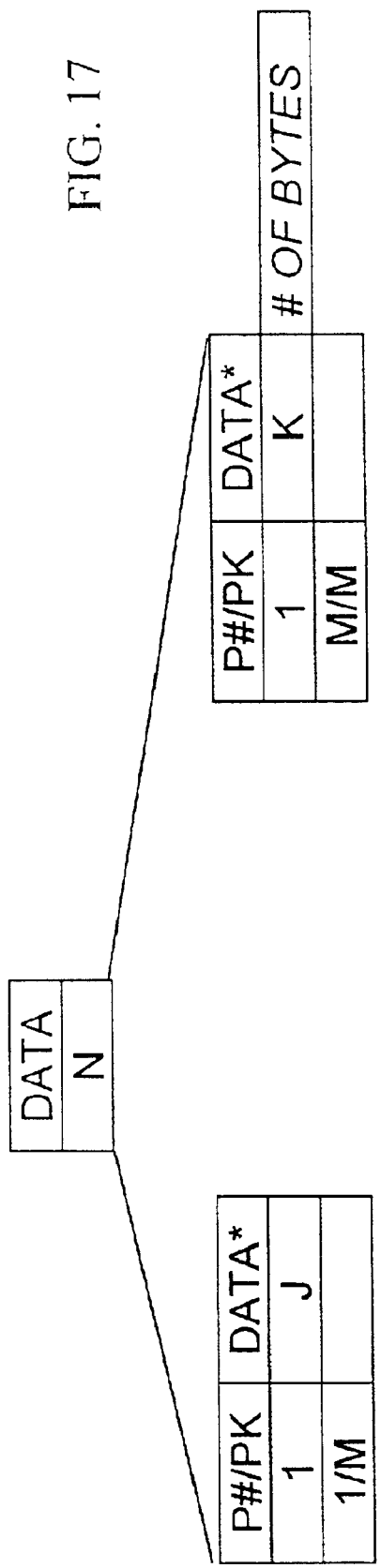
FIG. 17 is a simplified illustration of division of a data stream into separate packets in accordance with a preferred embodiment of the present invention.

The notation employed in FIG. 16 is as follows:

$FS_{SM}$: Frame syncs for the tag Message string of FIG. 16. A frame sync typically lasts for 512 microsec MT: Message Type response code, corresponding to the command code of the command received FIG. 17 is an illustration of division of the data field into packets.

FIGS. 19A–19B, taken together, form a table of external parameters which typically reside in the memory of each seal and are accessible from the outside for system adjustments. Part of them are read only and cannot be modified.

Suitable definitions for each of the parameters in the table of FIGS. 19A–19B are as follows:

Table of FIG. 19A, Row 1: Tag or Seal Status, 1 byte long. A suitable bit assignment is illustrated in FIG. 57, in which the bits may be as follows:

Bit 7: Set/Tamper flag. If the bit 7 value is 0, the status is Set. A successful SET command resets this bit. If bit 7 value is 1, the status is the Tamper status. Any tamper event sets this bit to "1".

Bit 6: Low Battery flag. When the tag detects a low power level, this flag is set to "1". This flag is latched. If power is recovered the RESET STATUS command may be used to reset the Low Battery flag.

Bit 5: $Input_0$. This flag signals according to the signal level on Input0. This flag is not a latch flag.

Bit 4: Sus_Set flag indicating the Suspended Set mode of operation.

Bits 2 and 3: Mode flags indicate the tags' mode of operation, e.g. as follows:

"00"—Active Mode. This is the regular mode of operation when everything is OK.

"01"—New Tag Mode. This is a production mode. After the first SET command execution, this command cannot be recovered any more.

"10"—Non Fatal Hardware Error. When a hardware error occurs in the tag which does not totally disable the tag, this flag is set.

"11"—Fatal Hardware Error. When a hardware error occurs in the tag which does totally disable the tag, this flag is set.

Bits 0 and 1: Mode Code flags indicating a subtype of the tags' Mode of operation as stored in bits 2 and 3. In each mode there can be several different statuses, e.g. different errors. Only one code at a time can be displayed. Priority of codes' display: 1. Fatal hardware errors; 2. Nonfatal hardware errors; 3. Low battery indication; and 4. Normal mode indications.

Table of FIG. 19A, Row 2: Tag or Seal Date & Time (D&T). The Date and Time parameter is a counter of 4 bytes with a resolution of 1 minute. The zero value starts from the following date and time: 01.01.1990 00:00:00, respectively. The date and time are represented in a GMT time reference. In production the current GMT value is stored under unlock mode.

Bits and Bytes assignment: as shown in FIG. 58, where the Minutes range is : 0–59, Hours range is: 0–23, Days range is: 1–31, Months range is: 1–12, Years range is: -99.

Table of FIG. 19A, Row 3: Tag or Seal Resistance (RES). Seal or Tag Resistance is the resistance value measured off the Seal wire of the seal or off the resistive sticker of the tag. This is a 1-byte read-only value.

Table of FIG. 19A, Row 4: Tag or Seal number of Events (#EV). A tag or seal can store in its memory several events. Each event has its own serial number. #EV is the total number of events in memory. This parameter is a read only value.

Table of FIG. 19A Row 5: Tag or seal Life Counter (LFC). A tag or seal can control its life cycle, and Life counter counts the total events detected by the tag throughout its lifetime. When a tag or seal reaches its Life Counter limit, the tag stops functioning in its normal mode of operation. Each event decreases this value by one.

Table of FIG.; 19A, Row 6: Tag or Seal Random value (RND) is the value computed by the seal for security manipulations. This is a 1-byte read only value.

Table of FIG. 19A, Row 7: Tag or Seal Firmware Version (VER) is the version of the firmware burned in the tag or seal. This is a read only parameter. The version typically comprises 2 parts: Version Number & Edition Number.

Table of FIG. 19A, Row 8: Tag or Seal Long STATUS-LTS; the Status is 2 bytes long. Bit 7 typically comprises a Set/Tamper flag. If the bit 7 value is 0, the status is the SET status.

Table of FIG. 19A, Row 9: Tag or Seal received signal strength (RSSI). This is the amplitude of the received signal from the READER. This value is to indicate to the TAG, and the system about the property of the link, and a factor related to the distance between them.

Table of FIG. 19A, Row 10: reader IH length ($T_{HW}$). This is the reader's IH string length. This parameter is with a default value for maximum system throughput. For special applications it is possible to override it with higher values to save energy.

Table of FIG. 19A, Row 11: reader ID (RID).

Table of FIG. 19B, Row 12: Group Access Identifier (ADI) which allows the reader to access groups that conform to this value.

Table of FIG. 19B, Row 13: Organization identifier (ORGID) identifying the customer using this equipment. It may also be as a subgroup identifier in the same application.

Table of FIG. 19B, Row 14: Assign mode time out (TA). When using the Assign mode, the tag needs to have a timeout in order not to be deadlocked. For that the tag uses a time out criteria of Ta sec.

Table of FIG. 19B, Row 15: Deep Sleep Wakeup Cycle (TP). To save power, in deep sleep, the wakeup cycle is longer than usual. Resolution is typically 1 sec.

Table of FIG. 19B, Row 16: Tag Family. This indicates the code of the product type.

Table of FIG. 19B, Row 17: Tag ID. This indicates the unique ID of the tag.

FIGS. 20A–20B, taken together, form a System Time Intervals Definition Table.

FIG. 21 is a simplified illustration of a preferred string transmitted by a reader in order to initiate communications. The reader Commands in FIG. 21 are described further below with reference to FIGS. 22–54.

FIG. 22 is an illustration of an example of the Verify command (Command No. 1 in the reader to seal Command Table of FIGS. 18A–18F). This is the normal interrogation cycle to read short messages from tags and seals. Tags may wake up in a random phase using the $T_{HW}$ (FIG. 19A, Row 10). Tags may try to synchronize with the system based on an internal algorithm taking in consideration repetitions of the reader's message strings with constant $T_{HW}$ and $T_{RW}$ ($T_{RW}$ being shown in FIG. 20A)

Upon successful detection of the reader, tags may continue to respond synchronously. This is true for random access, and for assigned access. If tags detect that they missed, they may return to default values of Thw and wake up randomly.

The notation used in FIG. 22 is as follows:

$T_{CM}$: The duration of the Calibration Message window. When $T_{CM}$ equals zero, this means that there is no calibration message window.

$T_{IW}$: The duration of the reader Interlace window. Resolution is in units of 1 msec. When $T_{IW}$ equals zero, this means that there is no readers' interlace window.

$T_S$: The duration of a slot for receiving responses from a tag or a seal. Resolution is in units of 1.024 msec.

$N_A$: The number of slots in the Fixed Assignment Receiving Window.

$N_R$: The number of slots in the Random Access Receiving Window.

$N_T$: The number of slots in the Alert Receiving Window.

$\#R_R$: The number of random retransmissions from a tag in the Random Access Receiving Window.

$\#R_T$: The number of random retransmissions from a tag in the Alert Receiving Window.

ASID: A random unique ID assigned to a specific assignment. This ID is provided in order to resolve ambiguities which could otherwise arise when plural tags are located in a region in which they could communicate with plural readers.

PARAMETERS MASK: A bit mask of parameters which the tags and seal respond with.

Figure 23:
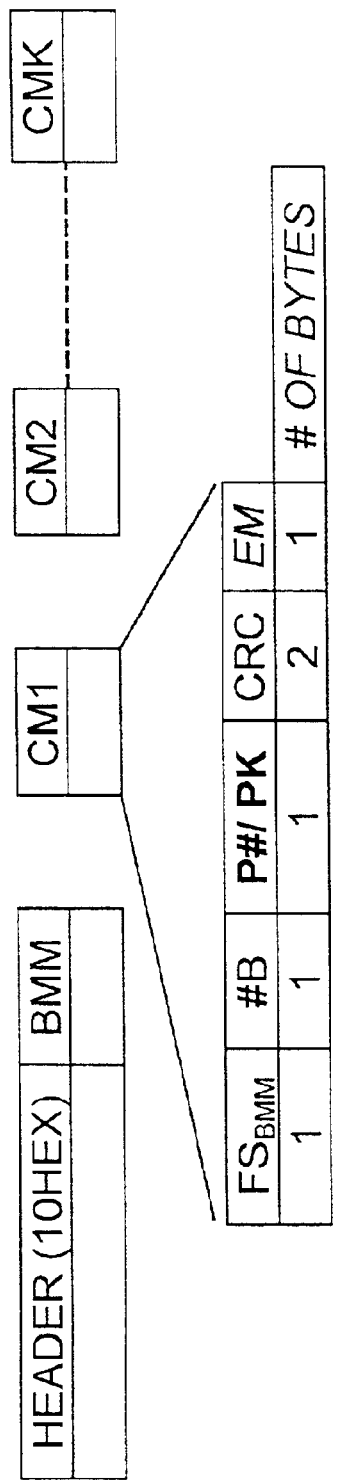

When the $T_{CM}$ is not zero the calibration messages illustrated in FIG. 23 are transmitted after the broadcast master message (BMM). In FIG. 23, P# is the high 4 bits which store the message's serial number and PK is the low 4 bits which store the number of calibration messages transmitted.

FIG. 24A is an illustration of an example of the Verify command (Command No. 1 in the reader to seal Command Table of FIGS. 18A–18F).

FIG. 24B is an illustration of an example of the VERIFY response. After a wakeup header and a wakeup broadcast master message (BMM), the tags respond as requested by the reader. Type and timing of the response are according to the parameters defined in the command string (FIG. 24A). The same response can be returned in the fixed assignment receiving window, and the random access receiving window.

"PARAMETERS MASK" is the list of parameters in a bit mask form. The list is designated as a bit mask according to the Parameters Table shown in FIGS. 19A and 19B. A "1" indicates the parameter that should be sent. A "0" indicates the parameter that should not be sent. "DATA*" stores the parameter return values.

In FIG. 19A, the first parameter is masked with the MSB of the highest byte, the second parameter in the table is masked with bit 6, and so on. If the table is extended, there are more bytes on the right. The mask bits are accordingly without any modifications to the command and the protocol. The order of the parameters is typically in accordance with the order set forth in the External Seal Parameters table of FIGS. 19A–19B.

Reference is now made to FIGS. 25–28B, which illustrate examples of Mask Bits assignments:

FIG. 25 illustrates the order of the bit mask pertaining to FIGS. 19A–19B, for the Verify command in FIG. 18A, line 1.

FIG. 26A is a list of the following parameters from among the external seal parameters in the table of FIGS. 19A–19B: TS; D&T; RES; #EV; LFC; RND; and VER. FIG. 26B is the DATA* RESPONSE for the list of parameters of FIG. 26A.

FIG. 27A is a list of the following parameters from among the external seal parameters in the table of FIGS. 19A–19B: TS; D&T; and VER. FIG. 27B is the DATA* RESPONSE for the list of parameters of FIG. 27A.

FIG. 28A is a list of the following parameters from among the external seal parameters in the table of FIGS. 19A–19B: TS; VER; and RSSI. FIG. 28B is the DATA* RESPONSE for the list of parameters of FIG. 28A.

The Tamper command (FIG. 18A, Line 2) is a command to interrogate tampered seals only. The command is identical to Verify except for the opcode 11h. In this command only seals that have detected tamper status respond. This command is to provide high priority to the tampered seals in a crowded environment of seals.

Figure 29:
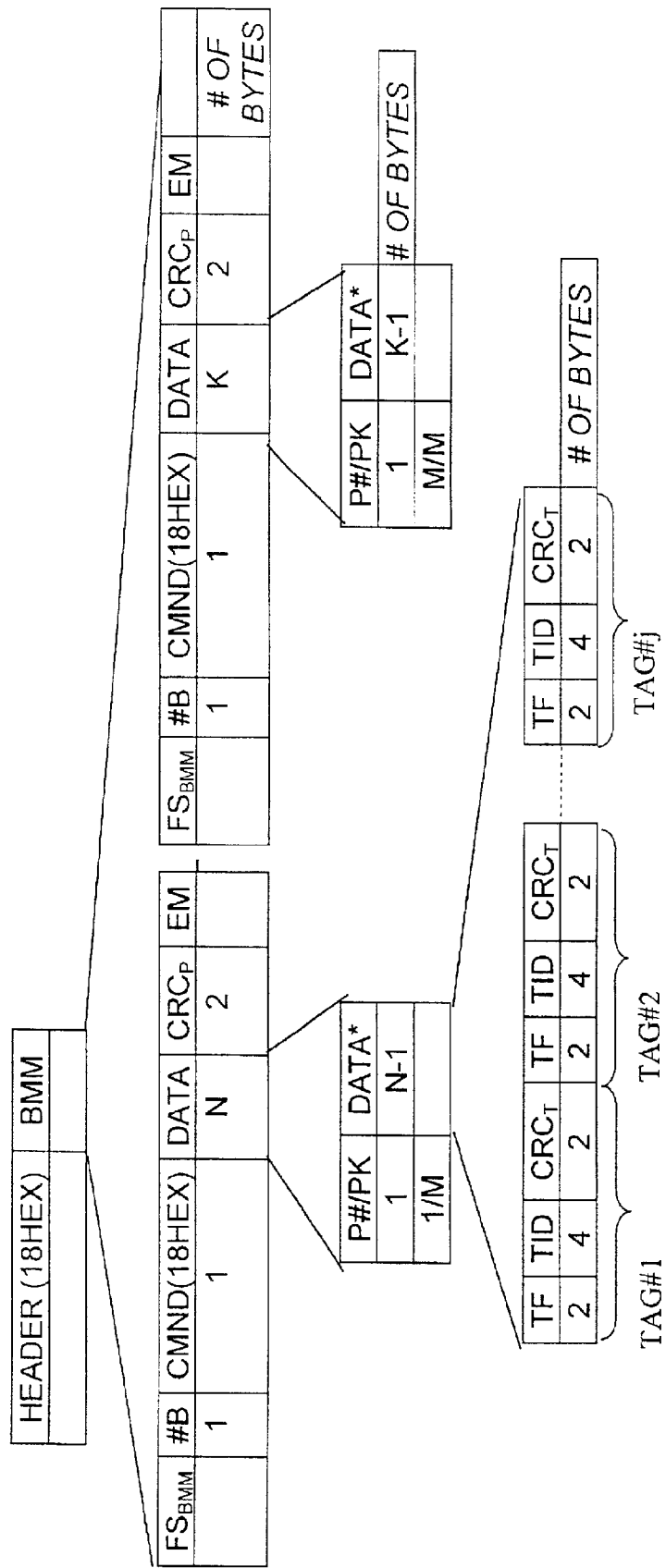

FIG. 29 is an illustration of an example of the Set command (Command No. 3 in the reader to Seal Command Table of FIGS. 18A–18E). The Set command (FIG. 29) can approach a large number of tags or seals. If the string turns out to be too large, it is split into packets. Each packet includes information for up to 6 tags or seals. This command is important because it uses internal CRC for each tag data.

The notation in FIG. 29 is as follows:

P#: The high 4 bits of the first byte is the packet serial number.

PK: The low 4 bits of the first byte are the total number of packets in the broadcast master message (BMM) string.

$CRC_p$: The CRC of the packet.

$CRC_t$: The CRC of the tag or seal TF & TID fields.

Figure 30:
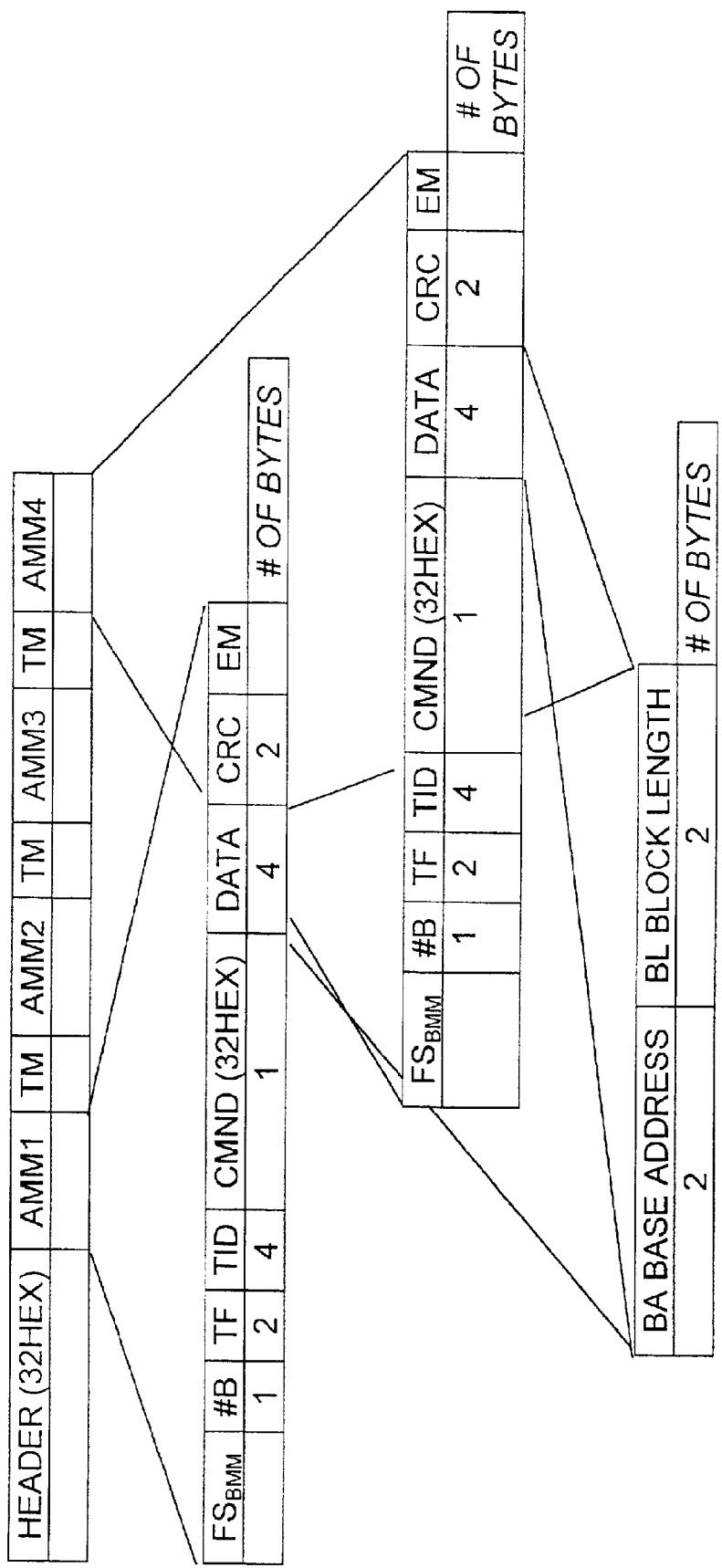

FIG. 30 is an illustration of an example of the Read DATA command (Command No. 6 in the reader to Seal Command Table of FIGS. 18A–18E). The READ Data command (FIG. 30) is for reading a block of data from a specific tag or seal. This command involves packets transmitted from the tag.

In FIG. 30, BA is the base address in the memory of the block of data and BL is the data block length. A reader approaches a tag with the AMMi instructing the tag which block to send. By using this command the reader may ask to send consecutive blocks or retransmit a block. All the information useful for execution of the command to by the tag is in the AMM.

Figure 31:
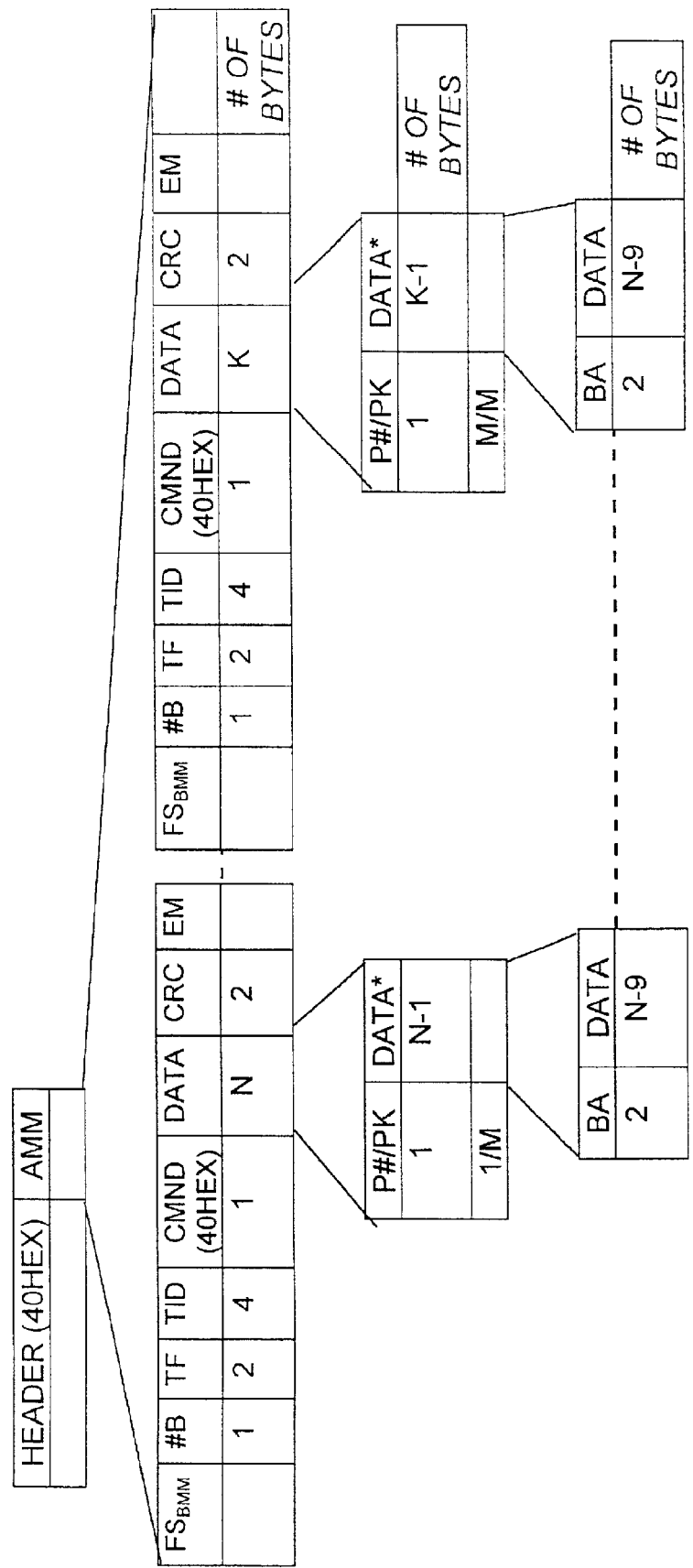

FIG. 31 is an illustration of an example of the WriteDATA command (Command No. 7 in the reader to Seal Command Table of FIGS. 18A–18E). The WRITE Data command (FIG. 31) is for writing a block of data to a specific tag or seal memory. In FIG. 31, the P#/PK byte is the packet's serial number (P#) within the total number of packets (PK). All the TF and TID are the same in all packets.

Byte assignment: Each block of data is not more than 32 bytes, the maximum number of packets is 15, and the packets are spaced to allow an acknowledge response from the tags.

Figure 32:
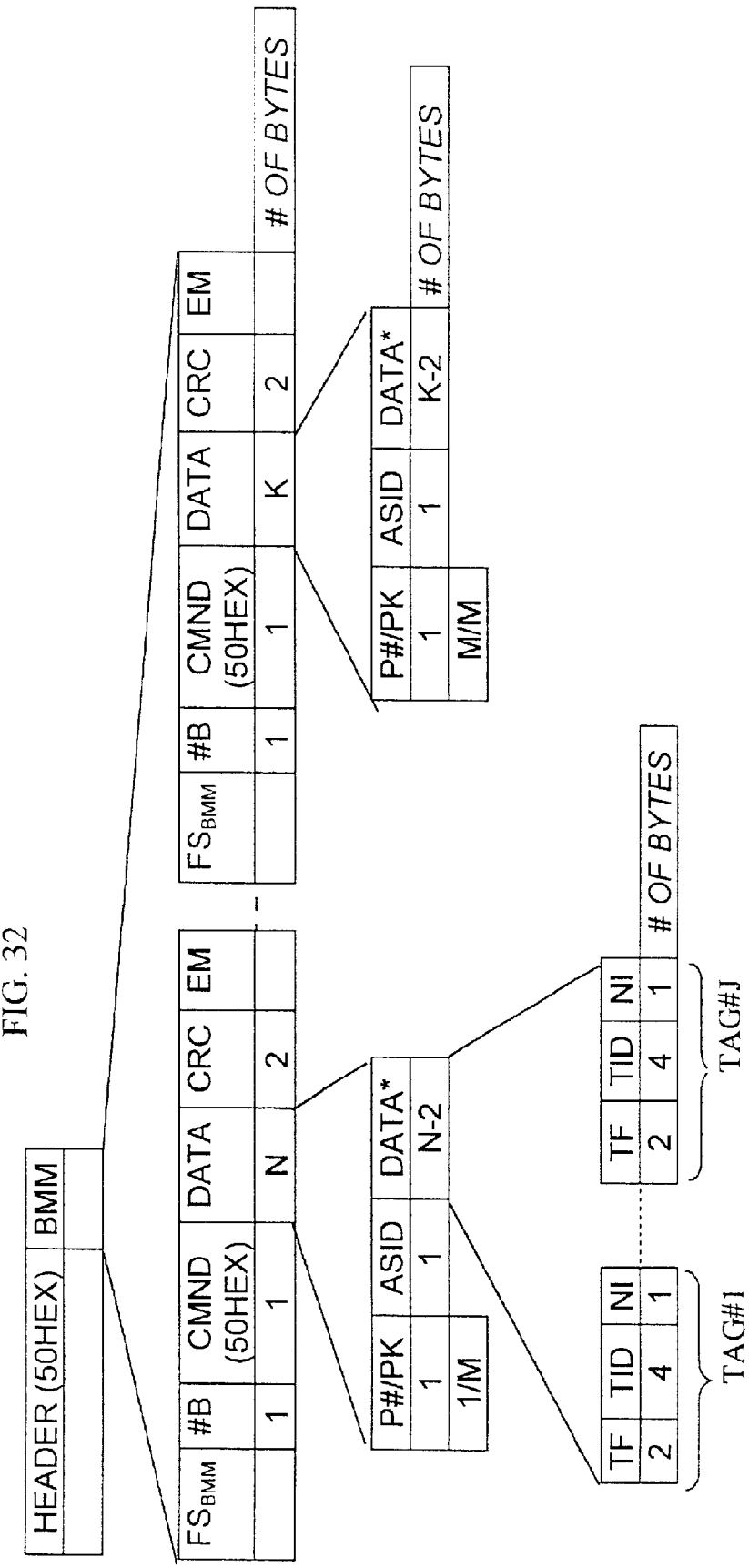

FIG. 32 is an illustration of an example of the Assign Slots command (Command No. 8 in the reader to Seal Command Table of FIGS. 18A–18E). The Assign Slots command (FIG. 32) is without acknowledge. Acknowledge is provided with complementary commands such as VERIFY (Command No. 1 in the Command Table of FIGS. 18A–18F). The system identifies if tags have been responding as expected. This command can be executed again in case that a tag failed to receive the command.

Only tags that identify themselves in this command switch to this mode. Ending this mode is by a Clear Assignment Command (Line 9 in FIG. 18A) or by a time out. $T_{to}$ is a time out duration where, if a tag is not approached within this time period, the tag returns back to the random access default mode.

ASID is a random unique ID that is assigned to a specific assignment. The reader sends the same ID in the appropriate wakeup command. Thereby, a tag is able to identify if it is synchronized with the system, or not. This allows the tag to switch out if it finds a mismatch. $N_1$ is the serial number of the tag's time slot.

Figure 33:
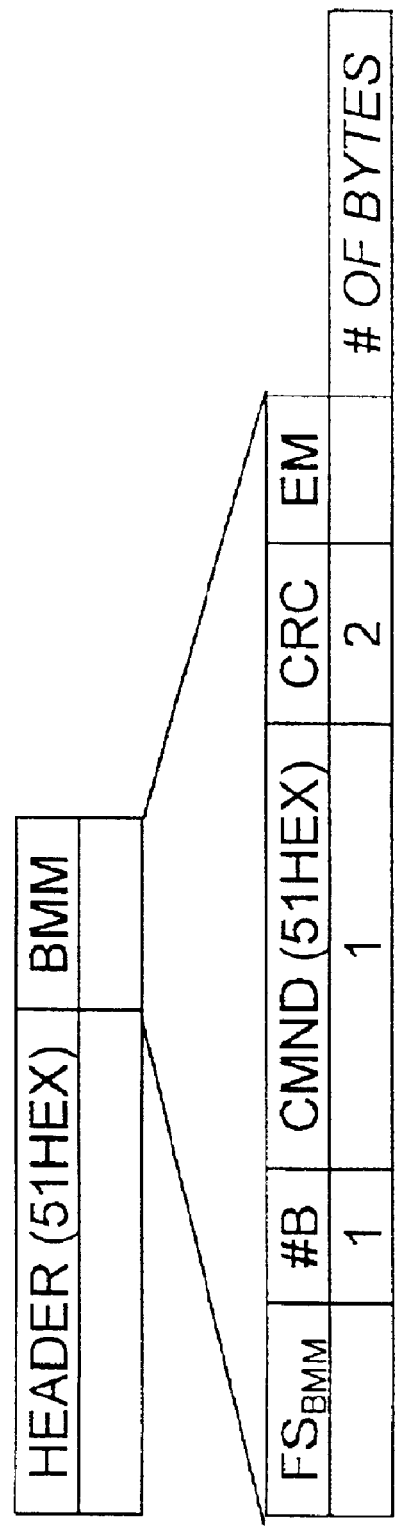

FIG. 33 is an illustration of an example of the Clear Assignment command (Command No. 9 in the reader to Seal Command Table of FIGS. 18A–18E). The Clear Assignment command (FIG. 33) switches off tags that are in the assigned mode of operation.

Figure 34:
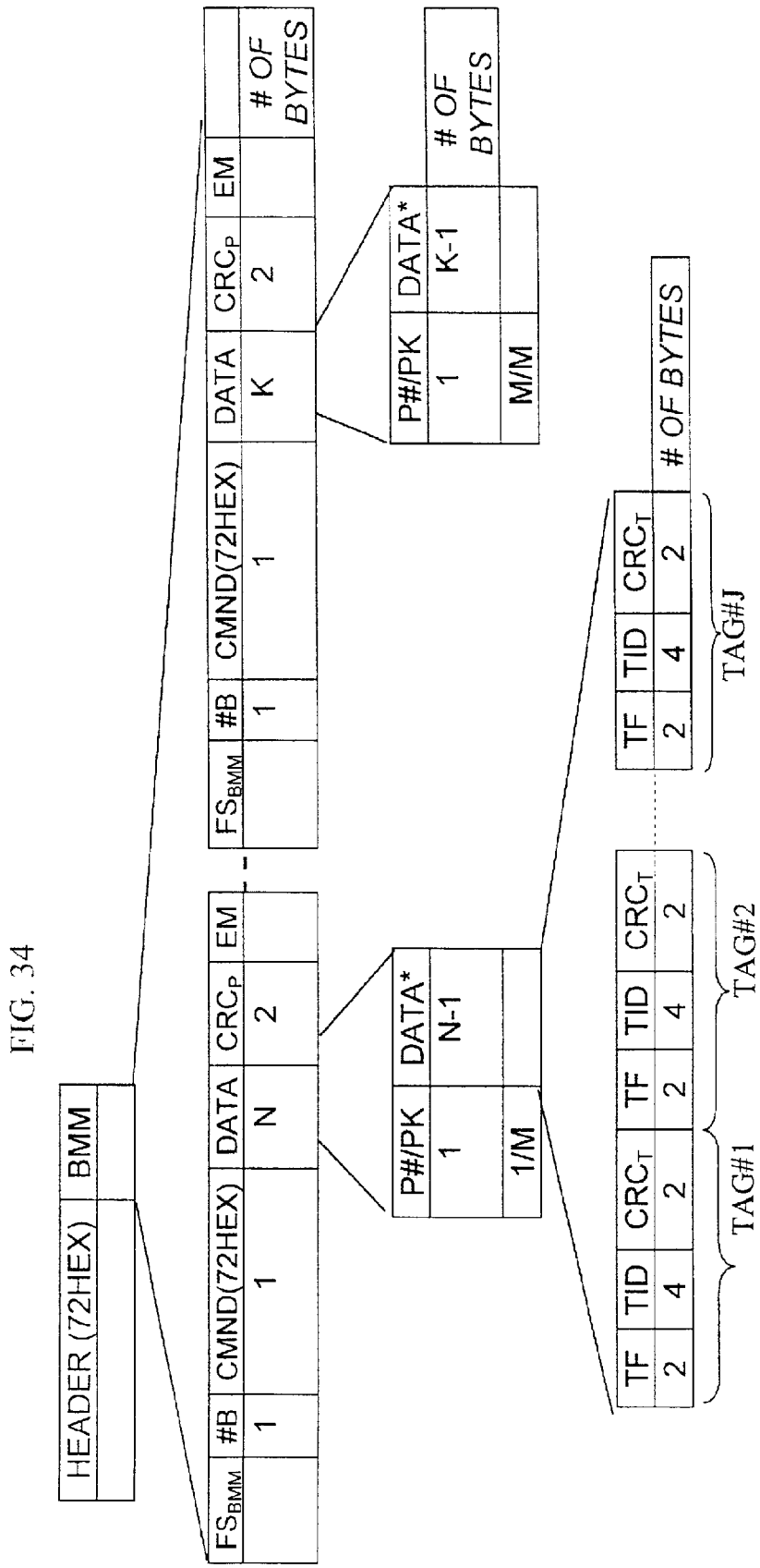

FIG. 34 is an illustration of an example of the "clear specific tags" command. (FIG. 18A, line 9).

Figure 35:
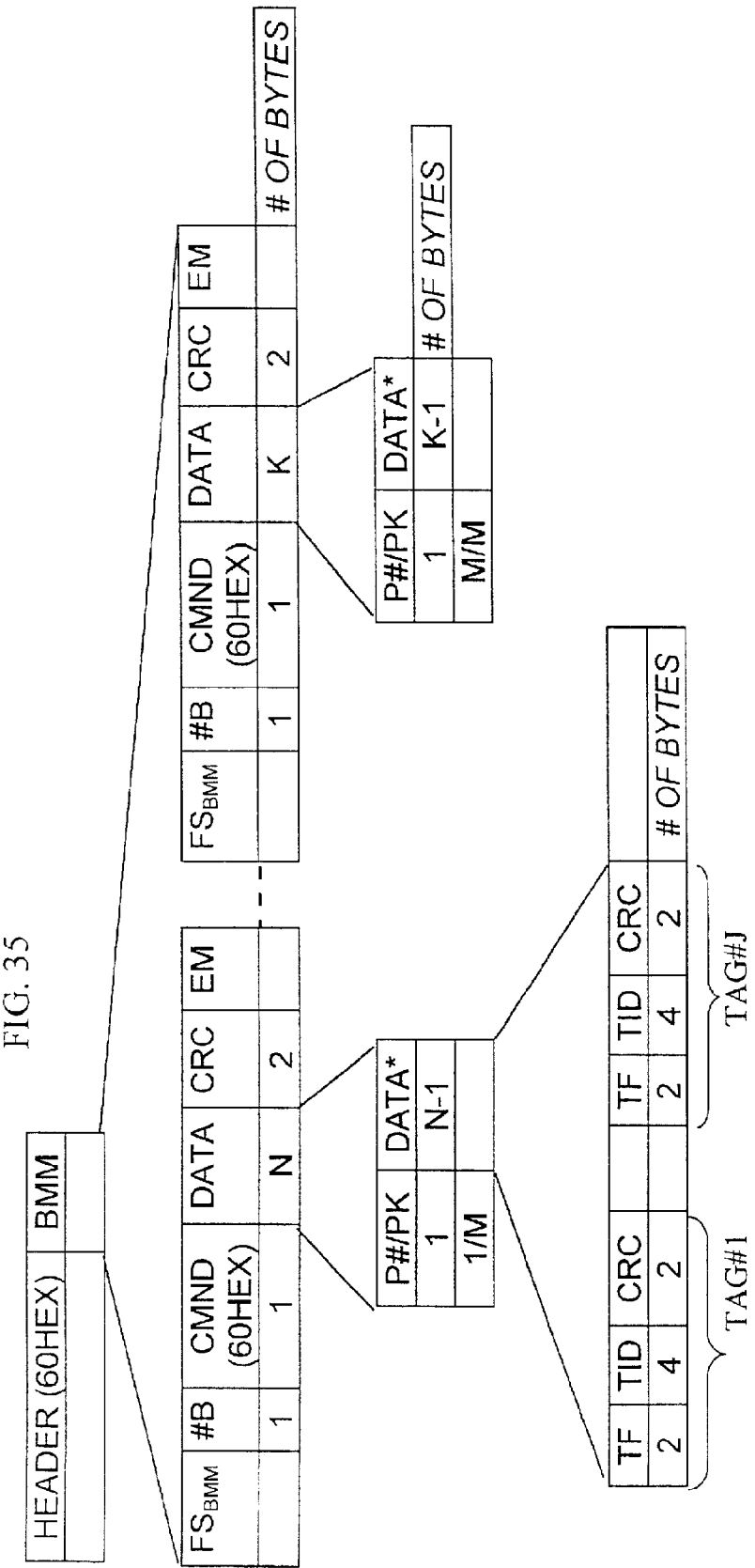

FIG. 35 is an illustration of an example of the "deep sleep" command (Command No. 10 in the table of FIGS. 18A–18E).

In applications where tags or seals may be in reserve or standby for later usage, the tags and seals are typically deactivated to prevent their interference with the operating tags on site. In this mode the tags are in receive mode only. In this mode the wakeup cycle is 4 sec, longer than the usual. "CRC" is the CRC computation for the TF & ID, whereby the tag positively identifies itself.

Figure 36:
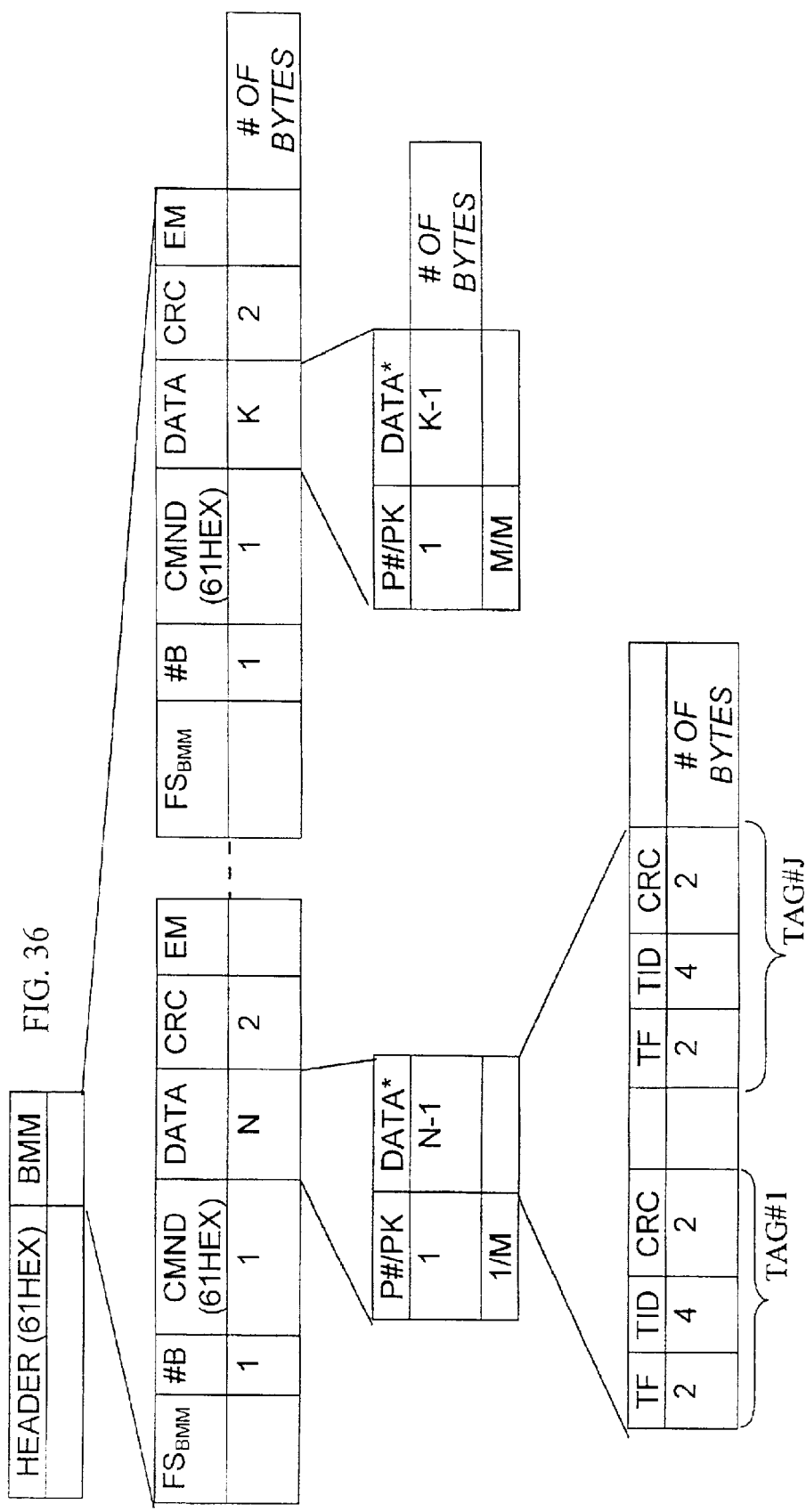

FIG. 36 is an illustration of an example of the Hard Wakeup command (Command No. 11 in the reader to Seal Command Table of FIGS. 18A–18E). The Hard Wakeup command wakes up tags that are in deep sleep mode. Tags look for this command only.

Figure 37:
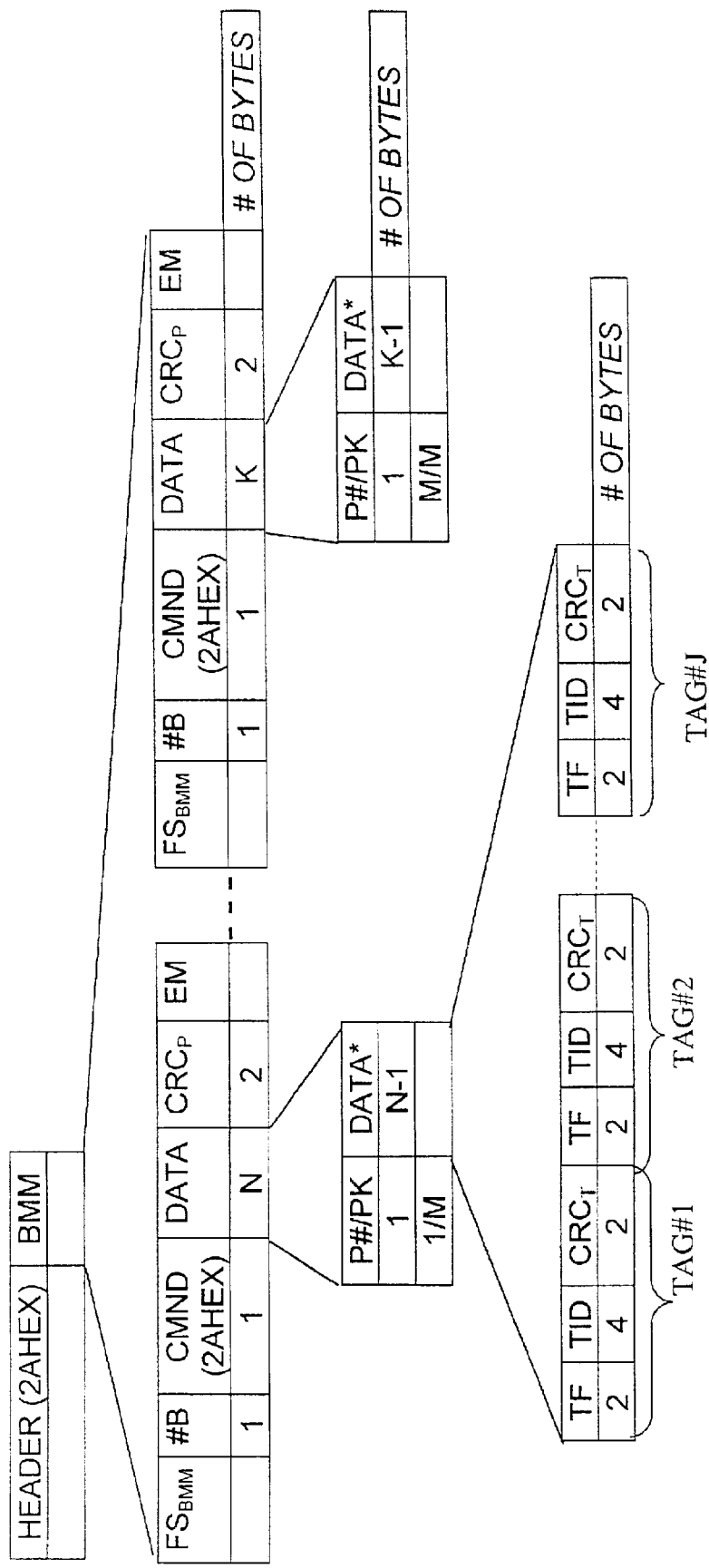

FIG. 37 is an illustration of an example of the Reset Data Block command (Command No. 12 in the reader to Seal Command Table of FIGS. 18A–18E). This is the command to reset the data in the tag's memory data block to zero.

Figure 38:
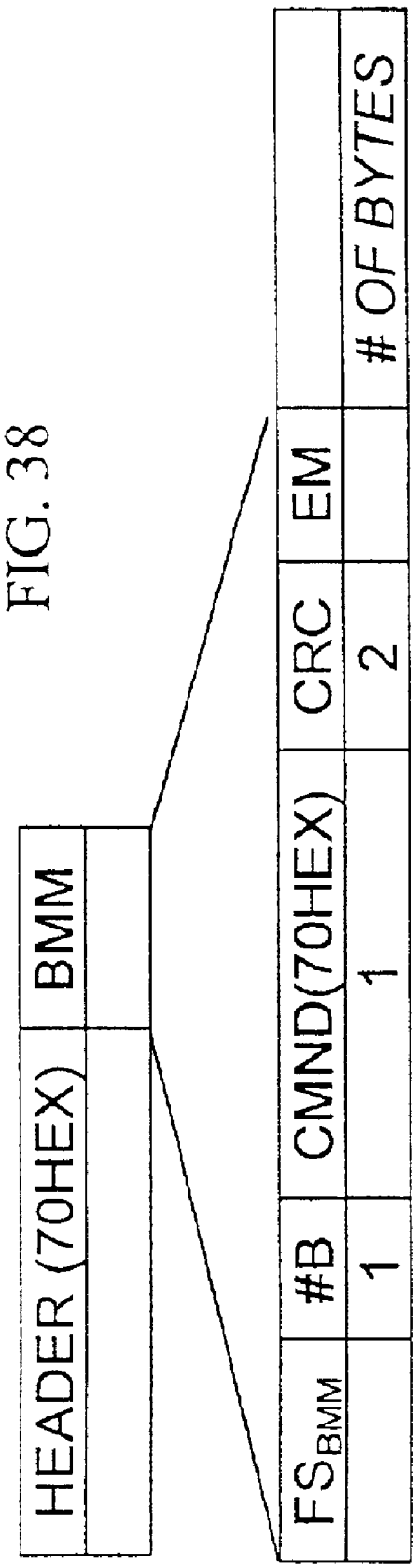

FIG. 38 is an illustration of an example of the Start Alert Burst Mode command (Command No. 13 in the reader to Seal Command Table of FIGS. 18A–18E). Tags may burst into the ALERT channel in case of an alert situation. This is not the default mode. In order to activate this option, the Start Alert Burst command is employed.

Figure 39A:
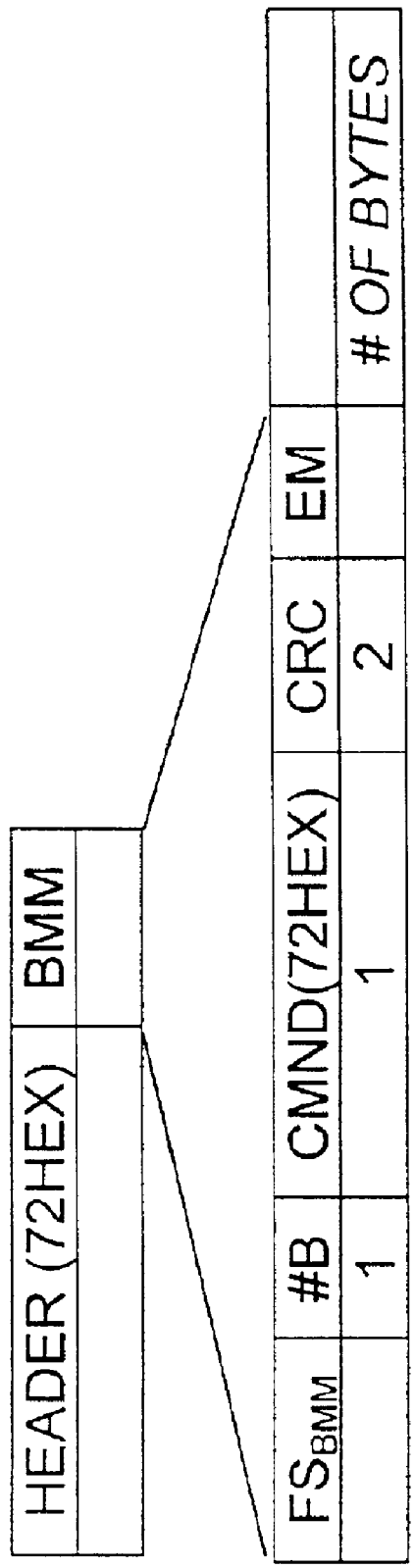

FIG. 39A is an illustration of an example of the Stop Alert Burst Mode command (Command No. 14 in the reader to Seal Command Table of FIGS. 18A–18E). This command is the complementary command to the Start Alert Burst command. When used as a broadcast to all the tags, this is a general command. When used with a specific tag ID it is an acknowledgement to the tag saying that its alert message was received, and it can stop bursting. In this way the tag does not occupy the channel too much.

Figure 39B:
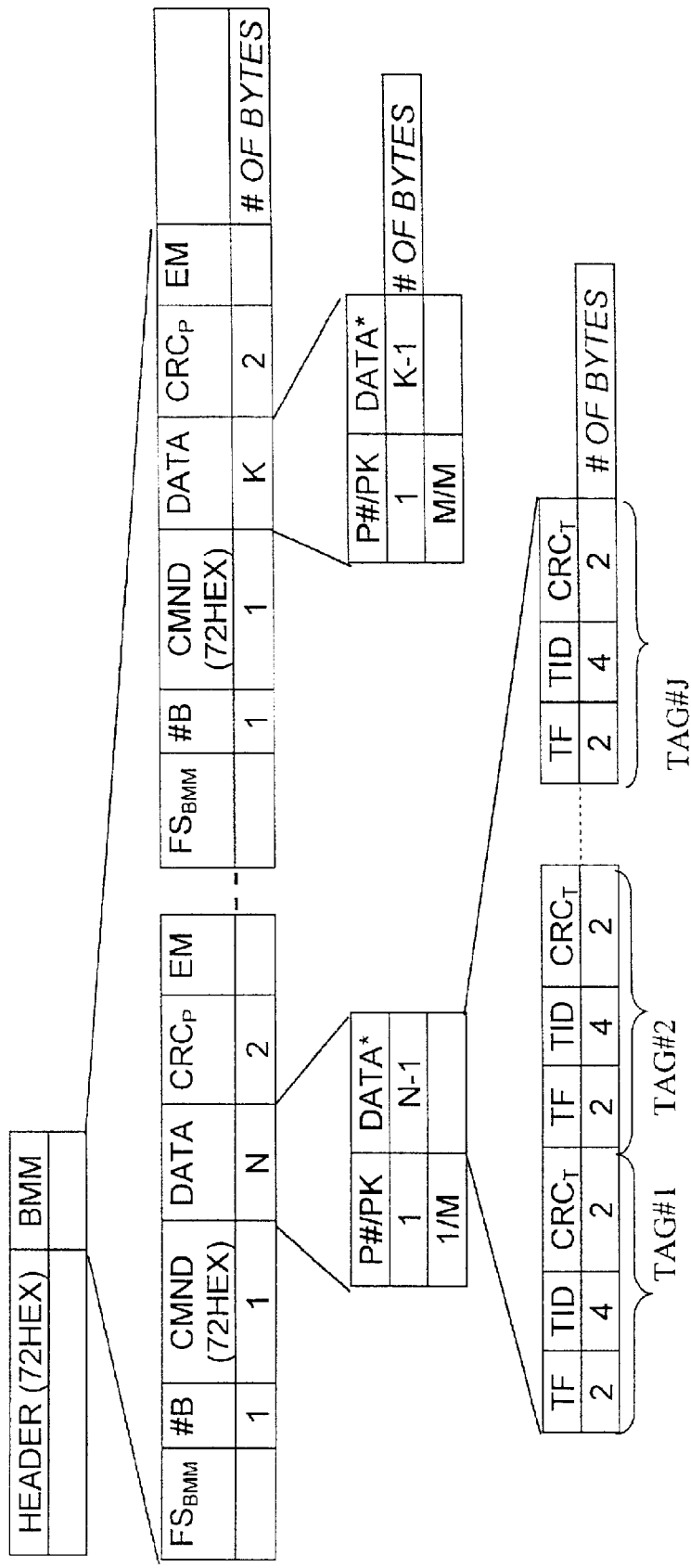

FIG. 39B is an illustration of an example of a Stop Alert Burst Mode Command for specific tags. This command is employed for stopping specific tags only.

Figure 40:
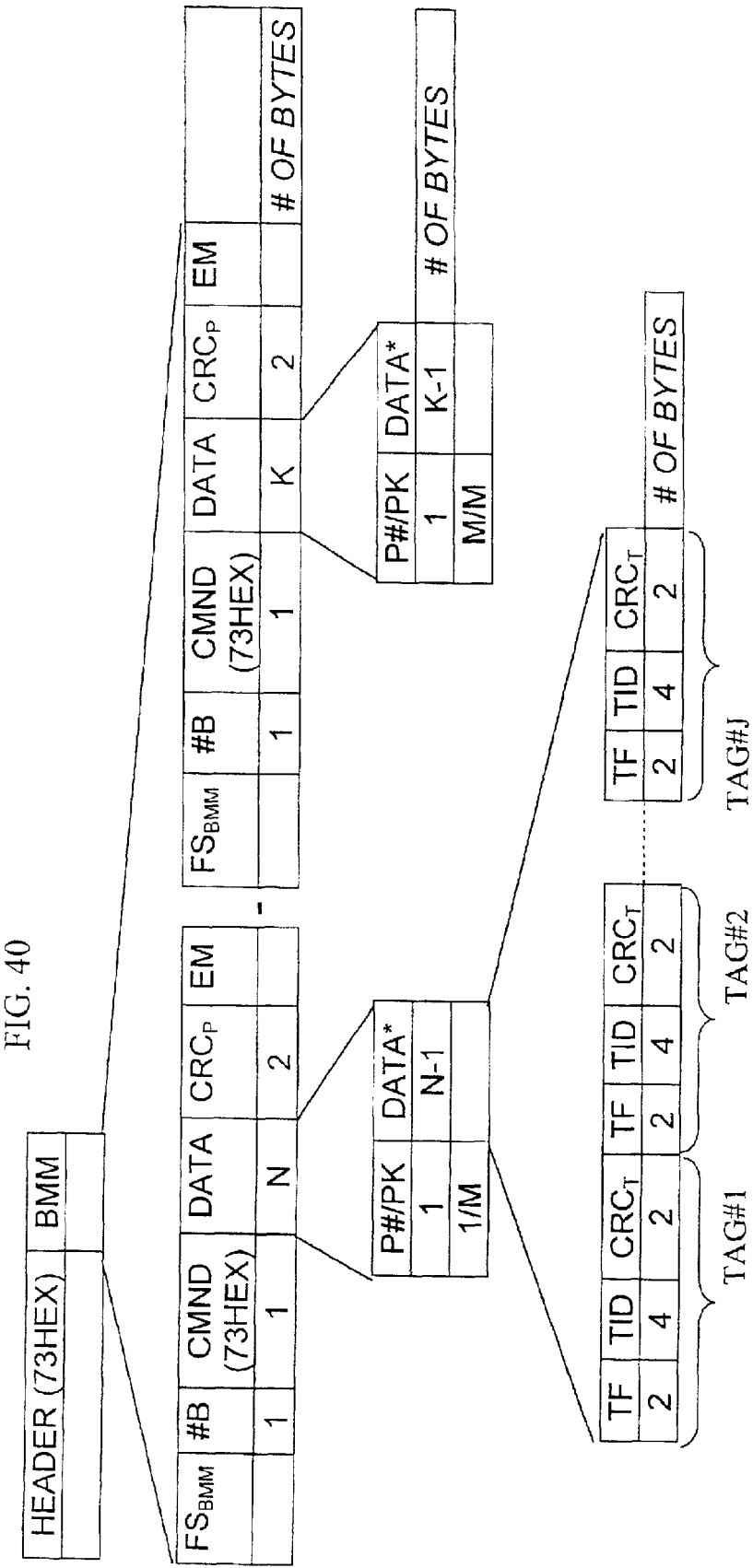

FIG. 40 is an illustration of an example of the Acknowledge—Alert Message command (Command No.

15 in the reader to Seal Command Table of FIGS. 18A–18E). This is to acknowledge a specific tag or tags whose alert message were received, to inform them that they may stop bursting until a new alert is detected. The difference between this and the previous command is that the previous command stops the Alert Burst mode which this command does not.

FIG. 41 is an illustration of an example of the "Start alert burst mode unsynchronized" command (Command No. 16 in the reader to Seal Command Table of FIGS. 18A–18E). In applications where the reader does not poll the tags or seals frequently, it makes sense to ask the tags to burst in case of an alert without waiting for a wakeup signal from the reader. Otherwise the response of the system is too slow. Because this command does not comply to the Master/Slave rules, the tag typically take care not to transmit all the time. Tags should monitor the channel before bursting into the air. Only after monitoring the air to verify that it is free for TBD sec, the tag bursts its message. This command includes execution parameters for the tags e.g. the number of iterations to be performed.

FIG. 42A is an illustration of an example of the "Stop alert burst mode unsynchronized" command (Command No. 17 in the reader to Seal Command Table of FIGS. 18A–18E). This command is the complementary command to the "Start Alert Burst unsynchronized" command of FIG. 41.

Figure 42B:
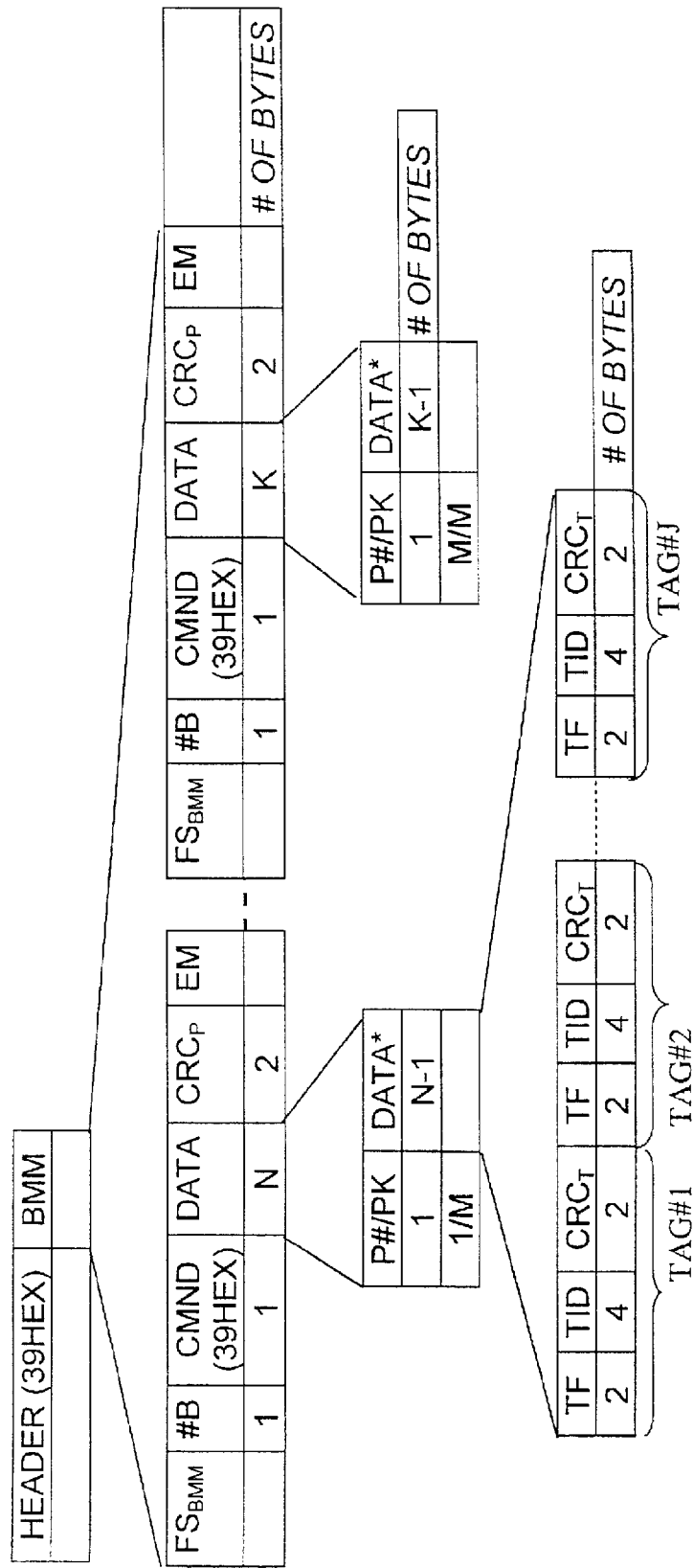

FIG. 42B is an illustration of an example of the "Stop alert burst mode unsynchronized" command (Command No. 17in the reader to Seal Command Table of FIGS. 18A–18E) when used in the case of "Stopping specific tags only". When used with specific tag IDs it serves as an acknowledgement to the tags that their alert messages have been received, so that they may stop bursting. This prevents the tags from occupying the channel too much.

Figure 43:
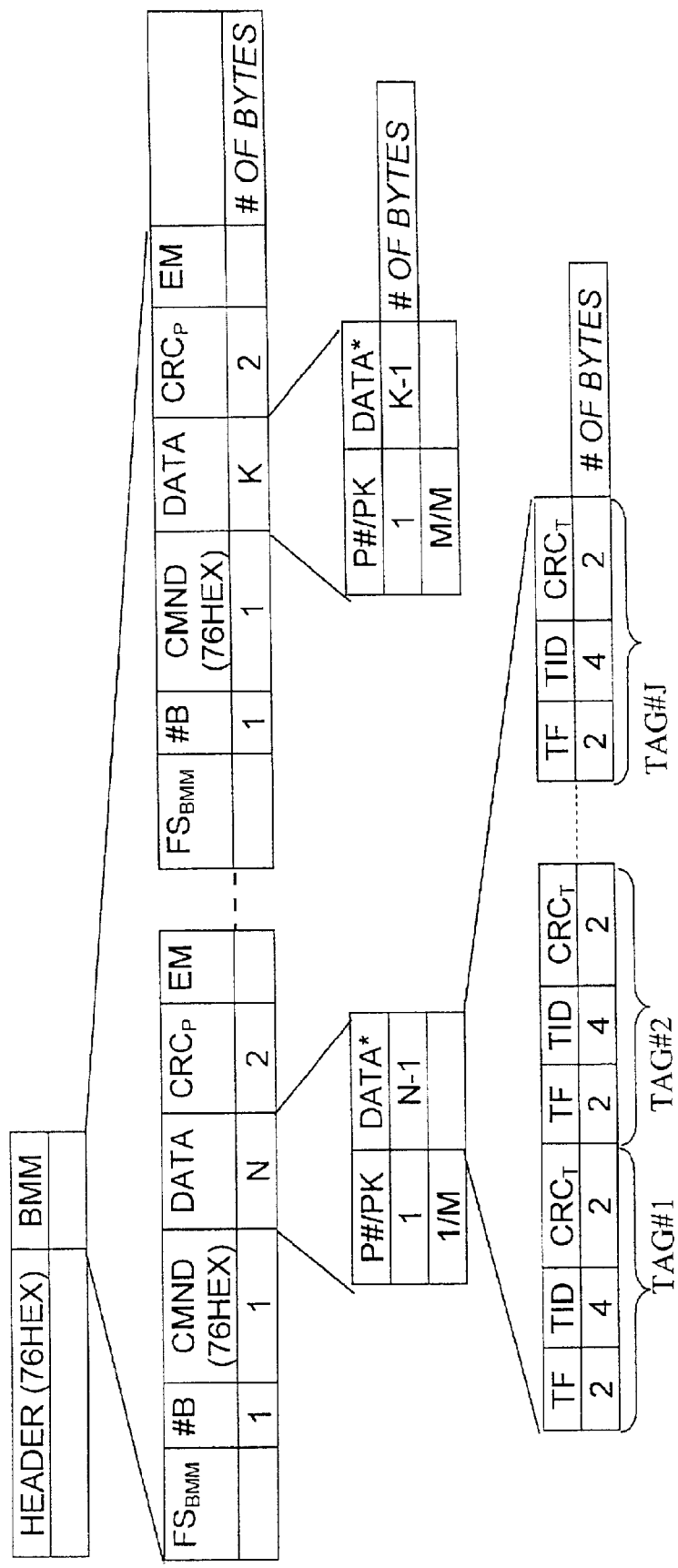

FIG. 43 is an illustration of an example of the "Acknowledge unsynchronized alert message" command (Command No. 18 in the reader to Seal Command Table of FIG. 18). This command is also termed herein the "Acknowledge Alert Burst mode unsynchronized" command. The command acknowledges to a specific tag or tags that their alert message has been received, and they may stop bursting until a new alert is detected. The difference between this and the command of FIGS. 42A–42B is that the above command stops the Alert Burst unsynchronized mode.

FIG. 44 is an illustration of an example of the Reset Status command (Command No. 19 in the reader to Seal Command Table of FIGS. 18A–18E). Some of the status bits can be reset. The Bit mask points to the status bits to be reset. 0 value indicates "don't modify" whereas a value of 1 indicates "reset value to zero". Each bit corresponds to the appropriate bit in the TS.

FIG. 45 is an illustration of an example of the LONG VERIFY command (Command No. 20 in the reader to Seal Command Table of FIGS. 18A–18E). This is the interrogation cycle to read short messages from tags and seals, analogously to the Verify command of FIG. 22. The difference is the time scale for the sessions. This command is for very long time periods. In this command the value of $T_{rw}$ indicates a time interval of more than one hour. The resolution of $T_{rw}$ under this command is 0.1 sec. The command is suitable for applications where the system rate is very slow. Because of the long interval, Tags may lose accuracy for waking. Tags typically take this potential problem into consideration and wake up with sufficient safety margins to detect the reader in time.

This is true for random access, and for assigned access. If tags detect that they have missed a message broadcast to them, they may return to default values of Thw, with random waking.

The LONG VERIFY command of FIG. 45, given to an individual reader, typically cannot be interlaced with other readers.

Figure 46:
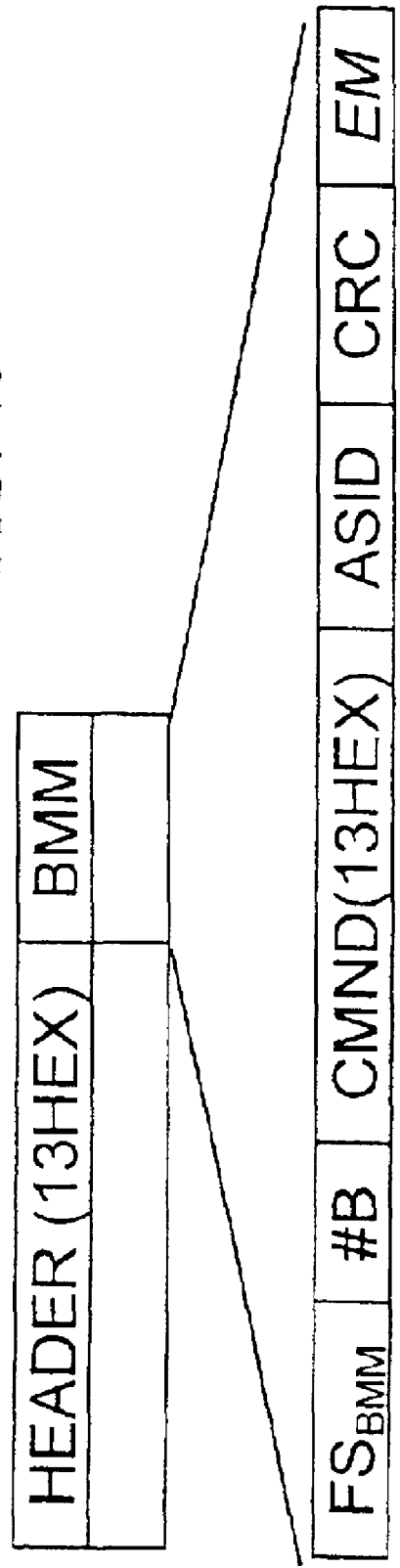

FIG. 46 is an illustration of an example of the SYNC VERIFY command (Command No. 21 in the reader to Seal Command Table of FIGS. 18A–18E). There is typically an interrogation cycle for reading short status information from Assigned seals. The SYNC VERIFY command of FIG. 46 uses the previous settings of system timings. This broadcast master message (BMM) becomes very short allowing tags to jump directly to the broadcast master message (BMM) and to skip the IH string to save energy. Tags are not limited to the response length. Response length is typically determined in previous sessions, for example by using Verify commands. The tags compute their time slot position at the end of the broadcast master message (BMM).

Figure 47:
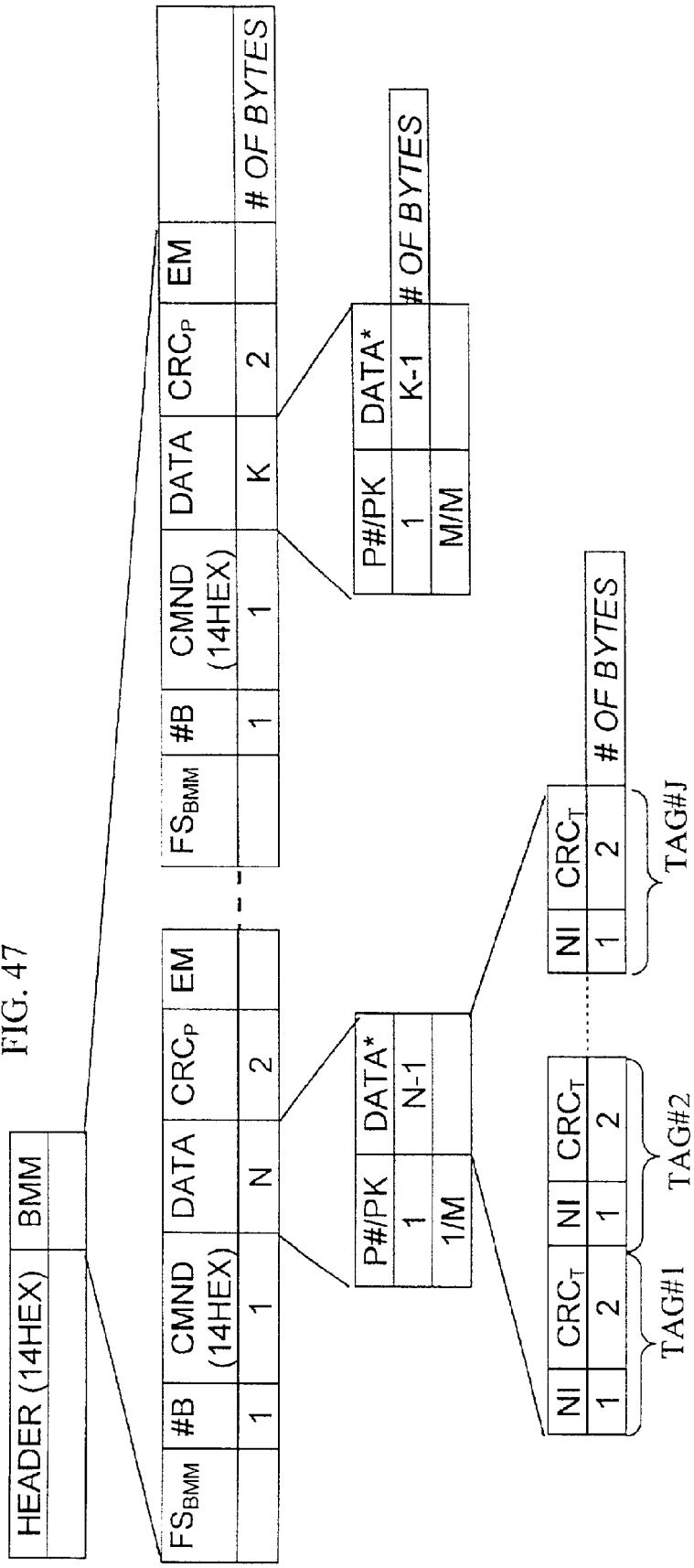

FIG. 47 is an illustration of an example of the Filter or "Wakeup4" command (Command No. 22 in the reader to Seal Command Table of FIGS. 18A–18E). When the Random Access window is used, the tags may be asked to retransmit their messages due to potential collisions. The reader may use this command to acknowledge to specific tags that their messages were received OK. This allows the system to reduce the number of tags that retransmit their messages. This is a command that increases throughput of the system in massive random access. The command uses the parameters from the last wakeup command. The feedback to each tag is $CRC_r$, the CRC received by the reader in the tag's most recent response, and the slot number $N_i$ of the response. These two bytes indicate to the tag, with a high level of confidence, that his message was received successfully.

Figure 48:
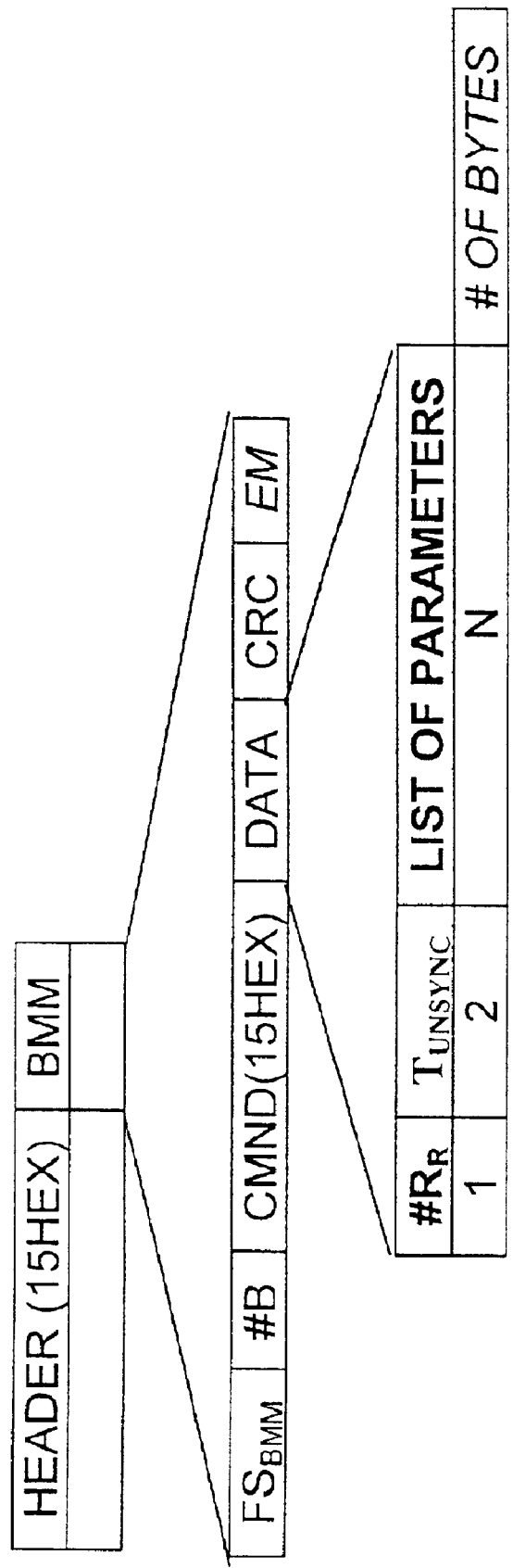

FIG. 48 is an illustration of an example of the Start Burst Mode or "Wakeup 5" command (Command No. 23 in the reader to Seal Command Table of FIGS. 18A–18E). There are applications where frequent reader interrogations are not used, but an independent frequent tag or seal report is preferred. The Start Burst Mode command is used to start such a mode of operation. Under this command, and according to the parameters in the broadcast master message (BMM), the tag or seal wakes up and reports as asked. After this command the system is not in a master/slave mode of operation. When a reader receives a TM under this mode, reader acknowledges such a tag transmission.

In FIG. 48, #$R_R$ is the number of retransmissions from a tag in the Tunsync cycle. A Tunsync cycle is one complete cycle for the tag. tags transmit their messages periodically every Tunsync sec. In each cycle the tag retransmits messages in a random way according to the value in the #$R_R$ field. A suitable resolution is 0.1 sec. In FIG. 48, "List of parameters" is the list of parameter codes with which the tags or seals respond.

The Hard Verify or "Wakeup6" command is Command No. 24 in the reader to Seal Command Table of FIGS. 18A–18E). When tags are in deep sleep they do not respond to an ordinary Wakeup command. To allow the system to know the IDs of the tags that are in this mode, a special command is used, which the tags respond to. The Hard Wakeup command is typically the same as the Verify command only with a different code. Tags in deep sleep respond to the Hard Wakeup command in generally the same manner as they respond to an ordinary Verify command. After this command the tags remain in deep sleep mode.

Figure 49:
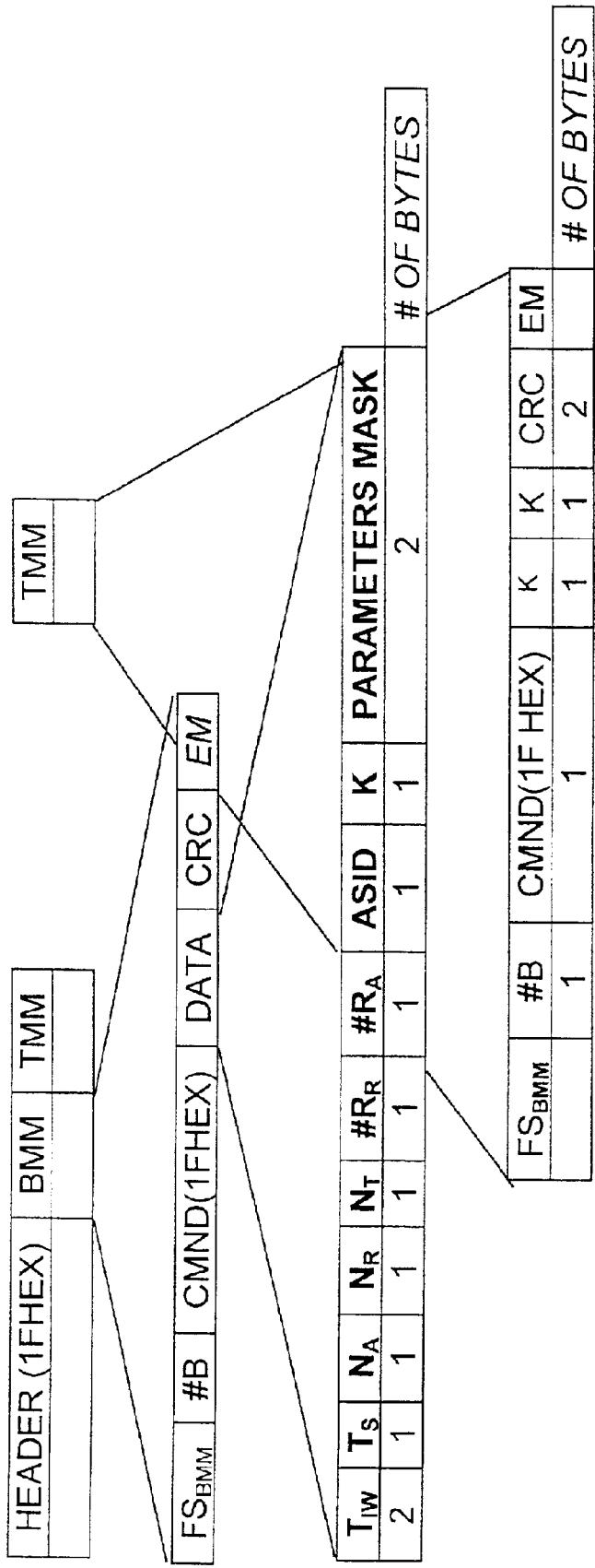

FIG. 49 is an illustration of an example of the Track command (Command No. 25 in the reader to Seal Command Table of FIGS. 18A–18E). In FIG. 49:

$T_{IW}$ is the duration of the readers interlace window, resolution being in units of 1 msec.

$T_S$ is the duration of a slot for receiving responses from a tag or a seal, resolution being in units of 1000/4096 msec.

$N_A$ is the number of slots in the Fixed Assignment Receiving Window.

$N_R$ is the number of slots in the Random Access Receiving Window.

$N_T$ is the number of slots in the Alert Receiving Window.

$\#R_R$ is the number of random retransmissions from a tag in the Random Access Receiving Window.

$\#R_A$ is the number of random retransmissions from a tag in the Alert Receiving Window.

ASID is a random unique ID that is assigned to a specific assignment. Details of the ASID may be found in the Assign commands described hereinabove with reference to FIG. 32.

K is the number of TRACKING messages (TMMs) to follow.

"PARAMETERS MASK" is the bit mask of parameters which the tags and seal respond with.

$FS_{BMM}$ is the frame syncs for the broadcast master message (BMM). A frame sync typically lasts for 512 microsec.

B is the string length, the string containing the CMND, the DATA field, and the CRC.

k is the serial number of the Tracking message.

K is the total number of Tracking messages.

CRC is the cyclic redundancy check for the #B, CMND, and DATA fields.

EM is the END of MESSAGE. End of message typically comprises a one stop bit with the value "0", and a break of 448 microsec.

The Track command of FIG. 49 provides the interrogation cycle to read short messages from tags and seals. Tags may wake up in a random phase using the Thw. Tags may try to synchronize with the system based on an internal algorithm taking into consideration repetitions of HI strings with constant Thw and Trw. Upon successful detection of the reader, tags may continue to respond synchronously. This is typically the case for random access, and for assigned access. If tags detect that they have missed, they may return to default values of Thw and to random waking.

The Track command of FIG. 49 is used in Tracking applications, in conjunction with TMM messages. The number of TMMs is defined in the broadcast master message (BMM) under the K field. A tag, upon receiving the BMM and the TMM's, responds with the information that defines which of the TMM's has been received. This is typically in addition to the regular response as per the Verify Command of FIG. 22.

Figure 50:
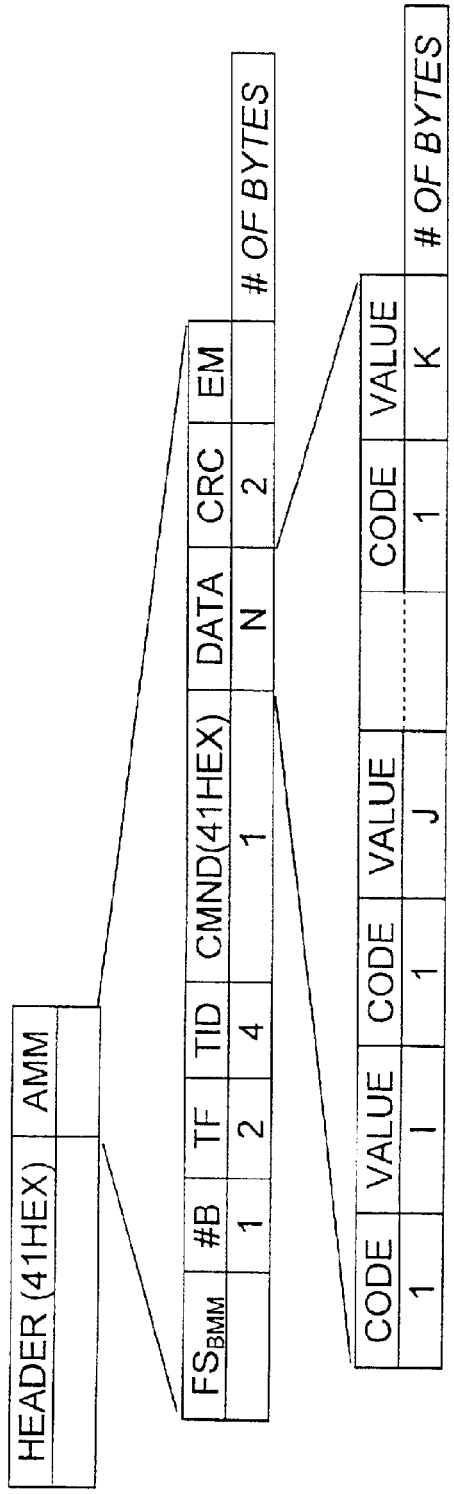

FIG. 50 is an illustration of an example of the Write Parameters command (Command No. 26 in the reader to Seal Command Table of FIGS. 18A–18E). The system through the reader may want to modify a tag's default parameters value. This can be done via the Write Parameters command. Not all the parameters are accessible after executing the LOCK command in production. The parameters listed in the table of FIGS. 19A–19B are valid for the Write Parameters command. TF=00 and TID=00 for a broadcast command.

Figure 51:
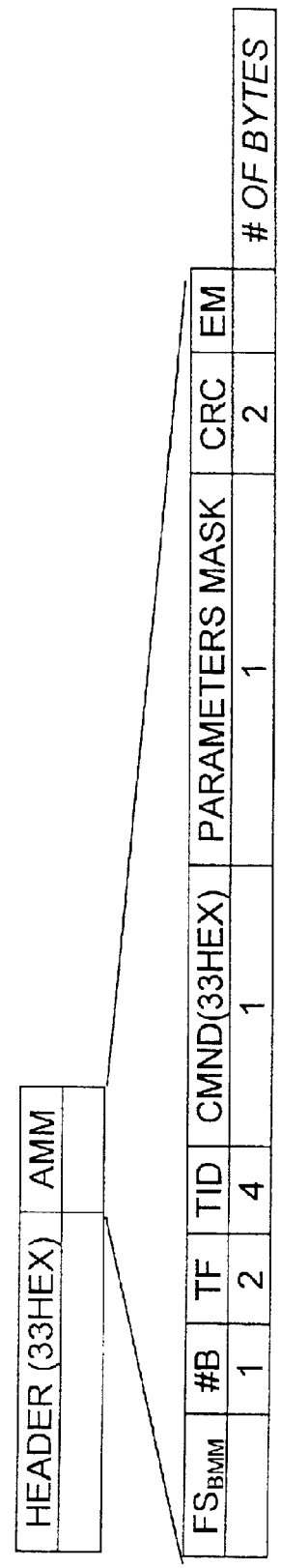

FIG. 51 is an illustration of an example of the Read Parameters command (Command No. 27 in the reader to Seal Command Table of FIGS. 18A–18E). This command is the complementary command to the Write Parameters command of FIG. 50. The parameter mask corresponds to the parameter table of FIGS. 19A–19B.

The Sync command is Command 28 in the table of FIGS. 18A–18E). In long polling cycles, the tags may loose clock accuracy, or synchronization. In order to keep timing and synchronization without consuming too much power from the tags, the reader sends this Sync command. The Sync command is used to maintain synchronization in the system.

The Lock command (Command No. 29 in the table of FIGS. 18A–18E) locks the ability to modify parameters that are not in the parameter table of FIGS. 19A–19B.

The Suspended Set command (Command No. 30 in the table of FIGS. 18A–18E) is a command that can approach a large number of tags or seals. This command typically behaves the same way as the SET command of FIG. 29. The only difference is typically that unlike the SET command that takes place immediately, the Suspended SET is effected automatically by the seal after the seal wire is plugged in the seal.

FIG. 52 illustrates the Lock command (FIG. 18E, line 29).

FIG. 53 is an illustration of an example of the Addressed Verify command (Command No. 31 in the reader to Seal Command Table of FIGS. 18A–18E). This command is the same as the Verify command of FIG. 22 with the difference that this command approaches a specific seal that is specified in the broadcast master message (BMM). The response of the seal is random according to the parameters defined in the command. The following parameters are typically not applicable in this command: $N_A$, $N_T$ and $R_T$.

Figure 54:
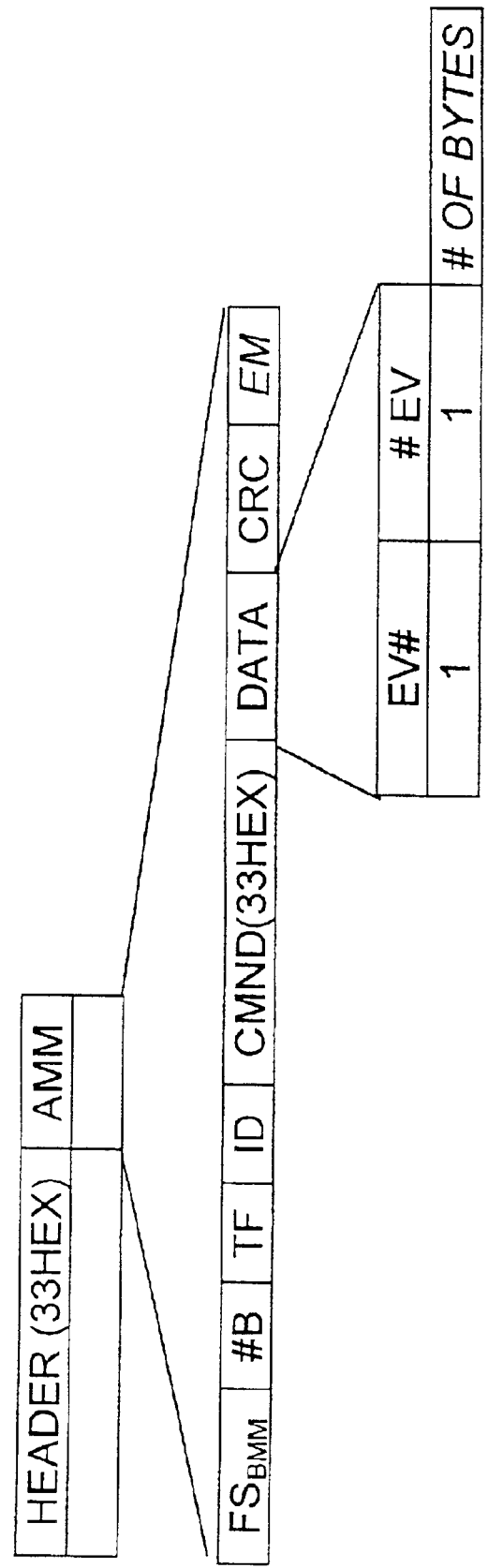

FIG. 54 is an illustration of an example of the "Addressed Read Events" command (Command No. 32 in the reader to Seal Command Table of FIGS. 18A–18E). This command reads events from a specific seal. The command specifies the first event to be read and the number of events to follow. If the request is larger than what the seal can send, the response is shorter than requested. Another cycle is typically performed. In FIG. 54, EV# is the Event serial number and #EV is the total number of events in memory.

The Soft SET command (line 33 in the table of FIGS. 18A–18E) has the same structure as the SET command. The difference is at the seal level. In this command the seal marks this command as an event, but does not reset the event's memory. The opcode for this command is 1AH.

A suitable set of seal to reader Messages is now described, with reference to FIGS. 55A and 55B which illustrates a plurality of seal-to-reader message types each having a response opcode MSGT. As seen in FIGS. 55A and 55B, in case of a faulty response, the MT is the same as the correct response but the msb (most significant bit) is set to "1".

FIG. 56 is a table assigning an Event Code to each of a plurality of events.

Some of the seal-to-reader message types of FIGS. 55A and 55B are now described in detail.

Set response (Message Type No. 18H) in the table of FIGS. 55A and 55B): After a wakeup header and a wakeup broadcast master message (BMM), the tags respond in a time slot, in the same order that they appear in the BMM. The same response can be returned in the fixed assignment receiving window, and the random access receiving window. If the response is negative the MT code should be accordingly.

Read Data response (Message Type No. 32H) in the table of FIGS. 55A and 55B): This response returns a block of data from the tag's memory. The tag executes the same procedure as before. Each tag monitors the AMM to determine whether its own TID is there. The Read Data Response command approaches only one tag. After the AMM the tag responds immediately without going to sleep. All the other tags that do not need to respond go to sleep based on the knowledge of the receiving window timings. Tag Message response in composed of packets.

FIG. 59 is an illustration describing typical bits for the Long Status parameter of FIG. 19A (line 8).

Figure 60A:
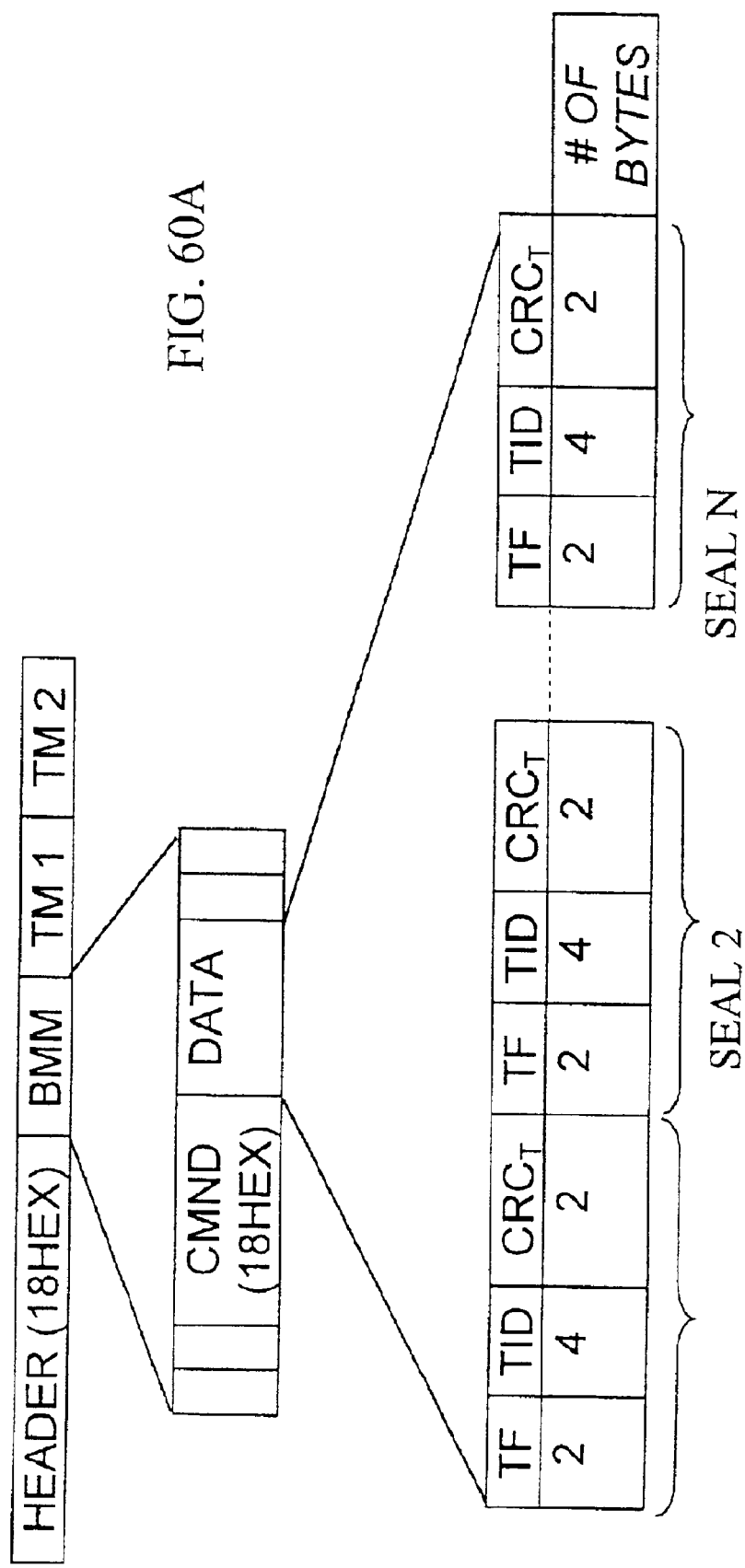

FIG. 60A is an illustration of the Set command (line 3 in FIG. 18B).

FIG. 60B is an illustration of the response of a tag to a reader which has transmitted the Set command of FIG. 60A.

Figure 61A:
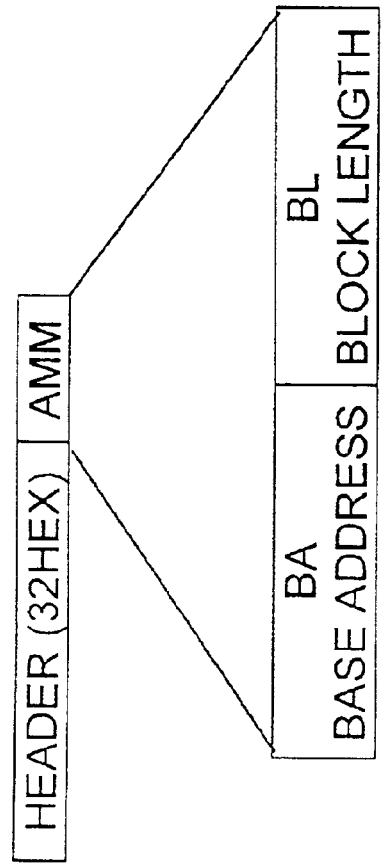

FIG. 61A is an illustration of the Read Data command (line 6 of FIG. 18A).

Figure 61B:
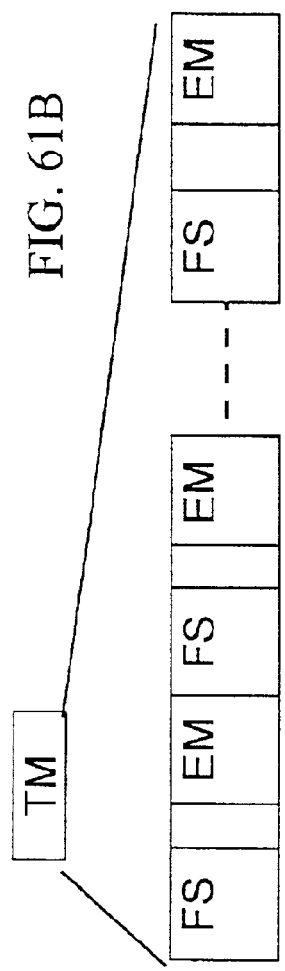

FIG. 61B is an illustration of the response of a tag to a reader which has transmitted the Read Data command of FIG. 61A.

The TM packet format for the Read Data Response message type is typically as illustrated in FIG. 62. In FIG. 62, the P#/P byte is the packet's serial number (P#) from total number of packets (PK). Each packet is prompted by the reader. The response instructs the tag how to proceed with the next packet. A suitable bit assignment is four high bits for P# and 4 low bits for PK. Each block of data is not more than 64 bytes. A suitable maximum number of packets is 15. In case of an error with the memory data integrity, and the data is corrupted, a suitable response is sent e.g. as illustrated in FIG. 63.

Figure 64A:
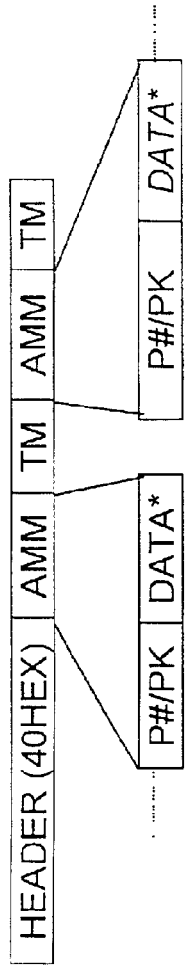
Figure 64B:
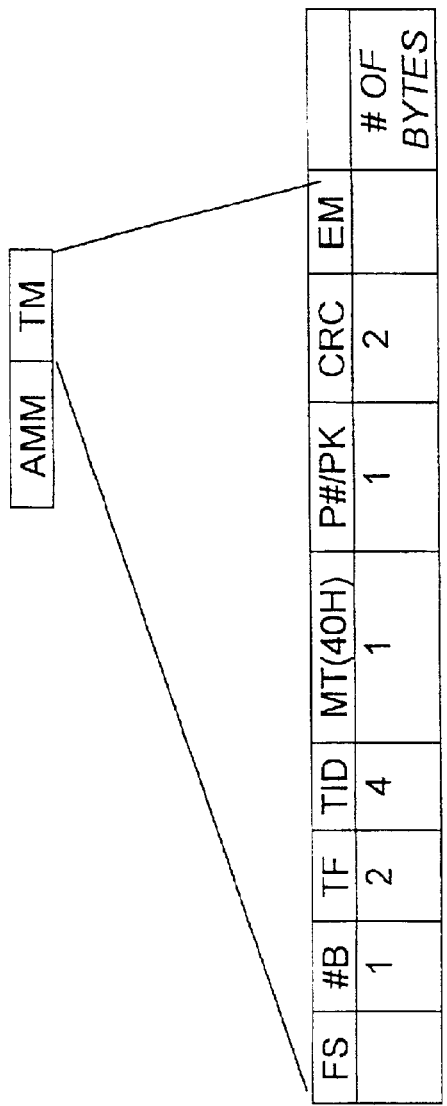
Figure 65:
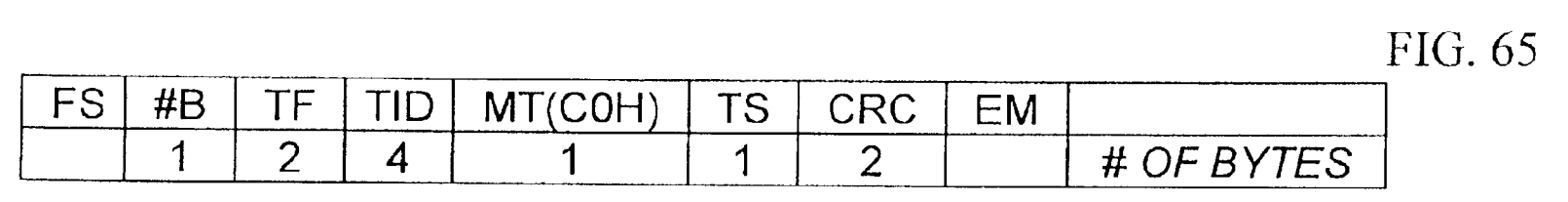

Write Data response (Message Type No. 40H) in the table of FIGS. 55A and 55B): A suitable format for a Write Data Response is shown in FIG. 64B. After the specific tag identifies its TID in the AMM, it collects the data block to write it in its memory. All the other tags go to sleep according to the timing data provided in the header of FIG. 64A. A suitable format of the TM field of FIG. 64A is as shown in FIG. 64B. After each packet the tag responds with the above TM, if the data arrived successfully. If not then a suitable response, e.g. as illustrated in FIG. 65, is returned. Typically, there are not retransmissions in case of errors. The reader retransmits the corrupted packet or packets in a new session, in order to keep the timing the system.

Figure 66A:
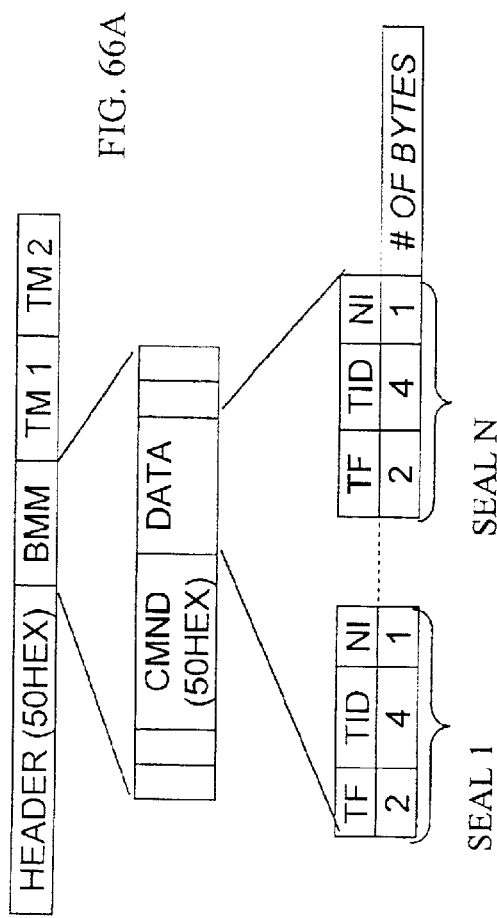
Figure 66B:
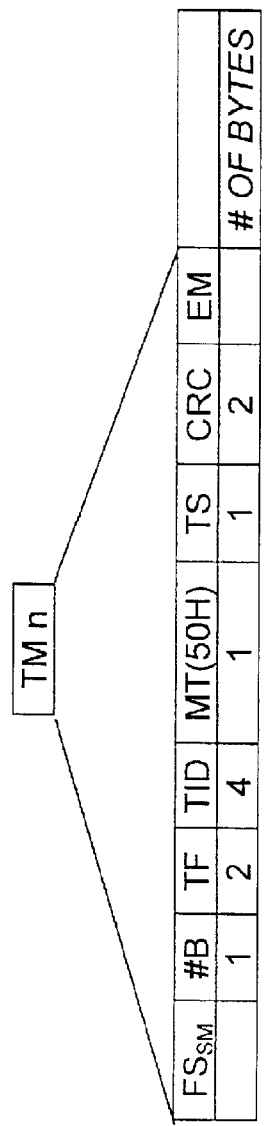

Assign slots response (Message Type No. 50H) in the table of FIGS. 55A and 55B. A suitable Assign Slots Response message is shown in FIG. 66B. After a wakeup header and a wakeup broadcast master message (BMM) as shown in FIG. 66A, the tags respond in a time slot in the same order that they appear in the BMM. An acknowledgement is within the response TM for each tag. The system identifies whether tags were responding as expected. This command can be executed again if that tag failed to receive the command. Only tags that identify themselves during this command switch to the Assign slots mode. Ending this mode is by Stop Command (line 9 in FIG. 18A) or time out. When this mode ends, the tag returns to the random access default mode. The reader typically retains, in this command, the same time frame for $T_{dw}$ as the cycle before. This is to allow tags which have not received this command and which are in the same mode as the previous cycle, not to override adjacent tags that may have shorter messages.

Clear Assignment response (Message Type No. 51H in the table of FIGS. 55A and 55B): Each tag, after receiving the Clear Assignment command of line 9 of the Table in FIG. 18A) responds with an appropriate MT in the same time slot as before. A suitable acknowledge for this command is illustrated in FIG. 67. Tags that respond with another MT code, or did not respond at all, are marked as those that did not receive the command.

Deep Sleep response (Message Type No. 60H) in the table of FIGS. 55A and 55B): Each tag after receiving the Deep Sleep command of line 10 of the Table in FIG. 18A), responds with an appropriate MT in the same time slot as before. A suitable acknowledge to this command is illustrated in FIG. 68. Tags that respond with another MT code, or do not respond at all, are marked as those that did not receive the command.

Hard Wakeup response (Message Type No. 61H) in the table of FIGS. 55A and 55B): Each tag after receiving the Hard Wakeup command of line 11 in the Table of FIG. 18B responds with an appropriate MT in the same time slot as before. A suitable acknowledge to this command is illustrated in FIG. 69. Tags that respond with another MT code, or do not respond at all, are marked as those that did not receive the command.

Reset Data Block response (Message Type No. 2AH) in the table of FIGS. 55A and 55B): Each tag after receiving the Reset Data Block command of line 12 in the Table of FIG. 18B responds with an appropriate MT in the same time slot as before. A suitable acknowledge to this command is illustrated in FIG. 70. Tags that respond with another MT code, or do not respond at all, are marked as those that did not receive the command.

Start Alert Burst response (Message Type No. 70H) in the table of FIGS. 55A and 55B): Each tag after receiving the Start Alert Burst command of line 13 in the Table of FIG. 18B responds with an appropriate MT in the same time slot as before. A suitable acknowledge to this command is illustrated in FIG. 71. Tags that respond with another MT code, or do not respond at all, are marked as those that did not receive the command.

FIG. 72 is an illustration of a tag's response to a Stop Alert Burst Mode command (FIG. 18B, line 14) transmitted by a reader.

Stop Alert Burst response (Message Type No. 72H in the table of FIGS. 55A and 55B): Each tag after receiving the Stop Alert Burst command of line 14 in the Table of FIG. 18B responds with an appropriate MT in the same time slot as before. Following is the acknowledge to this command. Tags that respond with another MT code, or did not respond at all, are marked as those that did not receive the command.

Acknowledge Alert response (Message Type No. 73H in the table of FIGS. 55A and 55B): Each tag after receiving the Acknowledge Alert command of line 15 in the Table of FIG. 18B responds with an appropriate MT in the same time slot as before. A suitable acknowledge to this command is illustrated in FIG. 73. Tags that respond with another MT code, or do not respond at all, are marked as those that did not receive the command.

Start Alert Unsynchronized Burst response (Message Type No. 38H) in the table of FIGS. 55A and 55B): Each tag after receiving the Start Alert Unsynchronized Burst command of line 16 in the Table of FIG. 18C responds with an appropriate MT in the same time slot as before. A suitable acknowledge to this command is illustrated in FIG. 74. Tags that respond with another MT code, or do not respond at all, are marked as those that did not receive the command.

Stop Alert Unsynchronized Burst response (Message Type No. 39H in the table of FIGS. 55A and 55B): Each tag after receiving the Stop Alert Unsynchronized Burst command of line 17 in the Table of FIG. 18C responds with an appropriate MT in the same time slot as before. A suitable acknowledge for this command is illustrated in FIG. 75. Tags that respond with another MT code, or do not respond at all, are marked as those that did not receive the command.

Acknowledge Unsynchronized Alert response (Message Type No. 76H) in the table of FIGS. 55A and 55B): Each tag after receiving the Acknowledge Unsynchronized Alert command of line 18 in the Table of FIG. 18C responds with an appropriate MT in the same time slot as before. A suitable acknowledge for this command is illustrated in FIG. 76. Tags that respond with another MT code, or do not respond at all, are marked as those that did not receive the command.

Unsynchronized Alert Message (Message Type No. 77H in the table of FIGS. 55A and 55B): This message, as shown in FIG. 77, is a burst that a tag sends out, unsynchronized, to the reader's cycle.

Reset Status response (Message Type No. 43H in the table of FIGS. 55A and 55B): Each tag after receiving the Reset Status command of line 19 in the Table of FIG. 18C responds with an appropriate MT in the same time slot as before. A suitable acknowledge for this command is illustrated in FIG. 78. Tags that respond with another MT code, or do not respond at all, are marked as those that did not receive the command.

Write Parameters Response (Message Type No. 41H in the table of FIGS. 55A and 55B): Each tag after receiving the Write Parameters command of line 26 in the Table of FIG. 18E responds with an appropriate MT in the same time slot as before. A suitable acknowledge for this command is illustrated in FIG. 79. Tags that respond with another MT code, or do not respond at all, are marked as those that did not receive the command.

Lock Response (Message Type No. 85H in the table of FIGS. 55A and 55B): Each tag after receiving the Lock command of line 29 in the Table of FIG. 18E responds with an appropriate MT in the same time slot as before. A suitable acknowledge for this command is illustrated in FIG. 80. Tags that respond with another MT code, or do not respond at all, are marked as those that did not receive the command.

Suspended SET Response (Message Type No. 19H) in the table of FIGS. 55A and 55B): Each tag after receiving the Suspended SET command of line 30 in the Table of FIG. 18F responds with an appropriate MT in the same time slot as before. A suitable acknowledge for this command is illustrated in FIG. 81. Tags that respond with another MT code, or do not respond at all, are marked as those that did not receive the command.

Addressed Read Events Response (Message Type No. 33H) in the table of FIG. 55): As shown in FIG. 82, which depicts a suitable 8-byte EVENT message format, the events are split into 2 groups, the first group having an 8 byte length, and the second group having 16 byte length. The difference is specified in the EVENT CODE field which may take any of the values listed in FIG. 56. FIG. 56 illustrates a set of suitable values for the Event Code field in the message format of FIG. 82.

FIGS. 83A and 83B are a suitable 16 byte EVENT message format. The Event Code field in FIGS. 83A–83B assumes the value 33H. The ** field of FIG. 83B may assume any of the values tabled in FIG. 84.

A CD-ROM is appended herewith, which stores a software implementation of one embodiment of the present invention including some of the features shown and described hereinabove.

The reader in the embodiment of Appendices A through C, comprises two microcontrollers: the first is an "MC68HC812 (MCU)" available from Motorola and the second is an "AT90LS8535 (AVR)" available from ATMEL. Also provided, in the embodiment of Appendices A through C is a data seal comprising a "PIC16F876 (PIC)" microcontroller available from Microchip. Each of the three microcontrollers has its own respective software and its own respective process for loading the software, as described below.

THE AVR BURN-IN PROCESS (APPENDIX A)

1. Provide an EEPROM/FLASH Programmer and software for EEPROM/FLASH burn-in named "ATMEL AVR ISP V2.65" available from "ATMEL".

1.1 Connect the flash-programmer cable from LPT-1 to the test installation Connector Jx.

1.2 Burn-in program.

1.2.1 Put on the 12v power supply.

1.2.2. Activate the burn-in software ( by double clicking on "ATMEL AVR ISP").

1.2.3 Activate in the "Project" menu the menu "New Project".

1.2.4 A window will appear by the name of. "Devices Supported" choose the component which appears in the list as "AT90S/LS8535" and click on "OK" to confirm.

1.2.5. In the file "Manager" code in a short text in the windows for "Title" and "Project ID."

1.2.6 Go over to the file "Security and Fuses" and mark "V" next to the option "FSTR".

1.2.7. Go over to the window "Program Memory", and choose the sub-menu "Load" from the menu "File." Choose the file "jmp_1_10.hex" (Appendix A) stored in the appended CD-ROM and press OK to confirm.

1.2.8. A message will appear on the screen "File load was a success!" and press "OK" for confirmation.

1.2.9. Choose the sub-menu "Auto-Program Options" from the "Program" menu.

1.2.10. A window will appear "Auto-Program Options"- choose the following options:

.Reload Files

.Erase Device

.Program Device

.Verify Device

Do not mark the other options (if there is a mark next to them, it should be removed) and then press "OK" to confirm.

1.3  Choose the sub-menu "Auto-Program" from the menu "Program" (Or press on F5).

THE MCU BURN-IN PROCESS (APPENDIX B)

1. Provide an EEPROM/FLASH Programmer and software for EEPROM/FLASH burn-in named "Prog17z programmer" available from "P&E Microcomputer Systems."

1.1 Connect the flash programmer to the parallel outlet of the PC (LPT1).

1.2 Connect to the 12 V DC circuit.

1.3 Connect the Jumper to the connectors JP3 and J6.

1.4 Connect the flash programmer to the JP1 connect such that the red wire is directed towards the processor.

1.5 Run the burn-in software "Prog12Z.EXE" supplied by P&E Microcomputer Systems from the desktop.

1.6 Now a window will be opened entitled Specify Programming Algorithm. Mark the file "Am400trw.12p" supplied by P&E Microcomputer Systems and press on the "Open" key.

1.7 Choose the option "EM – Erase Module" and double click on it.

1.8 Verify that the line "Erasing – Module could not be erased" appears in the window "Status Window."

1.9 Choose the option "Show Module –SM and double click on it.

1.10 Choose the address C000, verify that all the cells are erased (value FF), likewise verify that address FFFE are erased (value FF).

1.11 Close the window "Memory Window 1."

1.12 Choose the option SS – Specify S Record" and double click on it and choose the file "Mcu_1_09.S19" (Appendix B) in the appended CD-ROM and press on the "Open" key.

1.13 Choose the Option "Program Module – PM" and double click on it.

1.14 At the end of the burn-in, choose the option "VM – Verify Module" and double click on it.

1.15 Choose the option "SM – Show Module" and double click on it.

1.16 Check the content of the cells in the address C000, and confirm that the following sequence "C000: CF 09 50 16" appears.

1.17 Check the contents of the cells at the address FFFE and verify that the following sequence "FFFE: C0 00" appears.

1.18 Disconnect the voltage - power supply from the circuit.

1.19 Disconnect the jumpers J6, JP3 and the connector JP1.

1.20 Connect the two-colored LED to the JA1 connector to pins 1 and 2.

THE DATA SEAL BURN-IN PROCESS (APPENDIX C)

1.0 Provide an EEPROM/FLASH Programmer and software for EEPROM/FLASH burn-in named "ICP-01" available from "Soft Log"

1.1 Verify that the flash programmer "ICP-01" is connected to the Hi-G-Tek test installation available from Hi-G-Tek via the PC connector.

1.11 Switch on the Hi-G-Tek test installation.

1.2 Activate the software "ICP.exe" available from Soft Log.

1.3 Load up the software "Main_pr.hex" (Appendix C) stored in the appended CD-ROM.

1.4 Confirm the following parameters setup.

1.4.1 OSC:   HS 1.4.2 WDT:   ON 1.4.3 PWRT: ON 1.4.4 BOD:   OFF 1.4.5 CP:    All 1.4.6 DEB:   OFF 1.4.7 WRT:   ON 1.4.8 CPD:   OFF 1.4.9 LVR:   OFF 1.5 Press on the command "RUN" in the tools toolbar.

1.6 Press on the key "Program".

1.7 Verify that at the end of the burn-in you receive the message "SUCCESS".

Press any key...

1.8 If the message in Section 1.7 does not appear, repeat sections 1.5-1.7.

It is appreciated that the software components of the present invention may, if desired, be implemented in ROM (read-only memory) form. The software components may, generally, be implemented in hardware, if desired, using conventional techniques.

It is appreciated that the particular embodiment implemented by the Appendix is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

What is claimed is:

1. A tag interrogation system comprising:
   at least one base station; and
   a plurality of tags,
   wherein each base station has at least two receiving windows during which the base station is operative to receive messages sent by individual tags from among the plurality of tags,
   the receiving windows including:
      a first, fixed assignment, receiving window comprising a plurality of time slots respectively allocated to the plurality of tags; and
      a second, random access, receiving window during which the base station is operative to receive communications from any of the plurality of tags.

2. A system according to claim 1 wherein each tag comprises a mobile tag.

3. A system according to claim 1 wherein communication between base units and tags comprises wireless communication.

4. A system according to claim 1, and wherein at least some of said plurality of tags is operative to transmit an emergency message outside of a receiving window.

5. A system according to claim 1 and wherein communication between said at least one base station and said plurality of tags employs synchronization signals based on at least one of the following bit strings:

0, 0, 0, 1, 1, 0, 0, 0

1, 0, 0, 1, 1, 0, 0, 0

0, 1, 0, 1, 1, 0, 0, 0

1, 1, 0, 1, 1, 0, 0, 0

0, 0, 0, 1, 1, 1, 1, 0.

6. An asset monitoring system comprising:
   at least one base station; and
   a plurality of asset monitoring tags;
   wherein the plurality of asset monitoring tags and at least one base stations have defined between them at least one routine communications receiving window in which at least one base station is operative to receive communications sent by individual asset monitoring tags from among the plurality of asset monitoring tags;
   and wherein the plurality of asset monitoring tags and at least one base station also have defined between them at least one emergency communications receiving window in which only those asset monitoring tags which have identified themselves as meeting a predetermined emergency criterion, are eligible to utilize, whereby said emergency communications receiving window is statistically less crowded than said routine communications receiving window.

7. An asset monitoring system according to claim 6 wherein the plurality of asset monitoring tags comprises a plurality of asset tracking tags.

8. An asset monitoring system according to claim 6 wherein the plurality of asset monitoring tags comprises a plurality of security monitoring tags each providing security within an area of coverage.

9. A system according to claim 6 wherein each tag comprises a mobile tag.

10. A system according to claim 6 wherein communication between base units and tags comprises wireless communication.

11. A system according to claim 6 and wherein at least some of said plurality of tags is operative to transmit an emergency message outside of a receiving window.

12. A system according to claim 6 and wherein communication between said at least one base station and said plurality of tags employs synchronization signals based on at least one of the following bit strings:

0, 0, 0, 1, 1, 0, 0, 0

1, 0, 0, 1, 1, 0, 0, 0

0, 1, 0, 1, 1, 0, 0, 0

1, 1, 0, 1, 1, 0, 0, 0

0, 0, 0, 1, 1, 1, 1, 0.

13. A tag interrogation system comprising:
   at least one base station; and
   a plurality of tags;
   wherein each base station has a random access receiving window including at least one non-allocated time slot during which the base station is operative to receive a message from an individual tag from among the plurality of tags,
   and wherein each base station is operative to provide an acknowledge message following receipt of the message from the individual tag, wherein the acknowledge message comprises a dynamic identifier of the individual tag characterizing the current communication status of the individual tag.

14. A system according to claim 13 wherein said dynamic identifier characterizing the individual tag's current communication status comprises an identification of the slot within which the individual tag most recently transmitted.

15. A system according to claim 13, wherein said dynamic identifier characterizing the individual tag's current communication status comprises a digital signature of the most recent message transmitted by the individual tag.

16. A system according to claim 13, and wherein at least some of said plurality of tags is operative to transmit an emergency message outside of a receiving window.

17. A system according to claim 13, and wherein communication between said at least one base station and said plurality of tags employs synchronization signals based on at least one of the following bit strings:

0, 0, 0, 1, 1, 0, 0, 0

1, 0, 0, 1, 1, 0, 0, 0

0, 1, 0, 1, 1, 0, 0, 0

1, 1, 0, 1, 1, 0, 0, 0

0, 0, 0, 1, 1, 1, 1, 0.

18. A wireless tag communication system comprising:
   a first plurality of base stations serving a first plurality of overlapping regions respectively; and
   a second plurality of tags;
   wherein the first plurality of base stations have a cycle of operation including:
      a first plurality of generally non-overlapping broadcasting windows during which the first plurality of base stations, respectively, broadcast; and
      a common receiving window during which substantially all of the first plurality of base stations are operative simultaneously to listen for and receive messages from the second plurality of tags, wherein at least some of said plurality of tags is operative to transmit an emergency message outside of a receiving window.

19. A tag interrogation system comprising:

at least one base station; and a plurality of tags, each having a unique tag identification code, said unique tag identification code including a common portion which is common to a plurality of tags of a predetermined user and a tag specific portion which is unique to each individual tag, wherein each base station is operative to broadcast messages which are received by the plurality of tags and said plurality of tags are operative to respond to said broadcast messages, wherein at least some of said plurality of tags is operative to transmit an emergency message outside of a receiving window.

20. A seal interrogation system comprising:

at least one base station; and a plurality of seals, each having a unique seal identification code, said unique seal identification code including a common portion which is common to a plurality of seals of a predetermined user and a seal specific portion which is unique to each individual seal;

wherein each base station is operative to broadcast messages which are received by the plurality of seals and said plurality of seals are operative to respond to said broadcast messages, wherein at least some of said plurality of seals is operative to transmit an emergency message outside of a receiving window.

21. A tag interrogation system comprising:

at least one base station; and a plurality of tags, wherein each base station is operative to broadcast messages which are received by the plurality of tags and only ones of said plurality of tags which have been tampered with are operative to respond to said broadcast messages, wherein at least some of said plurality of tags is operative to transmit an emergency message outside of a receiving window.

22. A tag interrogation system comprising:

at least one base station; and a plurality of tags, which are operative for sensing tampering thereof once actuated, said tags being selectably actuable in response to wireless actuation messages, wherein each base station is operative to broadcast actuation messages which are received by the plurality of tags and are operative to actuate said tags, wherein at least some of said plurality of tags is operative to transmit an emergency message outside of a receiving window.

23. A tag interrogation system comprising:

at least one base station; and a plurality of tags, each having an awake mode and a sleeping mode;

wherein each base station is operative to broadcast messages which are received by said plurality of tags and has a receiving window during which it is operative to receive messages sent by individual tags from among the plurality of tags, and wherein at least some of the messages broadcast by at least some of the base stations include an indication of the time at which a future receiving window is due to open, thereby to allow tags to conserve power by remaining in said sleeping mode until said future receiving window opens, and wherein communication between said at least one base station and said plurality of tags employs synchronization signals based on at least one of the following bit strings:

0, 0, 0, 1, 1, 0, 0, 0

1, 0, 0, 1, 1, 0, 0, 0

0, 1, 0, 1, 1, 0, 0, 0

1, 1, 0, 1, 1, 0, 0, 0

0, 0, 0, 1, 1, 1, 1, 0.

24. A system according to and claim 23 and wherein at least some of said plurality of tags is operative to transmit an emergency message outside of a receiving window.

25. A wireless tag communication system comprising:

a first plurality of base stations serving a first plurality of overlapping regions respectively; and a second plurality of tags;

wherein the first plurality of base stations have a cycle of operation including:

a first plurality of generally non-overlapping broadcasting windows during which the first plurality of base stations, respectively, broadcast; and a common receiving window during which substantially all of the first plurality of base stations are operative simultaneously to listen for and receive message from the second plurality of tags, wherein communication between said at least one base station and said plurality of tags employs synchronization signals based on at least one of the following bit strings:

0, 0, 0, 1, 1, 0, 0, 0

1, 0, 0, 1, 1, 0, 0, 0

0, 1, 0, 1, 1, 0, 0, 0

1, 1, 0, 1, 1, 0, 0, 0

0, 0, 0, 1, 1, 1, 1, 0.

26. A tag interrogation system comprising:

at least one base station; and a plurality of tags, each having a unique tag identification code, said unique tag identification code including a common portion which is common to a plurality of tags of a predetermined user and a tag specific portion which is unique to each individual tag, wherein each base station is operative to broadcast messages which are received by the plurality of tags and said plurality of tags are operative to respond to said broadcast messages, wherein communication between said at least one base station and said plurality of tags employs synchronization signals based on at least one of the following bit strings:

0, 0, 0, 1, 1, 0, 0, 0

1, 0, 0, 1, 1, 0, 0, 0

0, 1, 0, 1, 1, 0, 0, 0

1, 1, 0, 1, 1, 0, 0, 0

0, 0, 0, 1, 1, 1, 1, 0.

27. A seal interrogation system comprising:

at least one base station; and a plurality of seals, each having a unique seal identification code, said unique seal identification code including a common portion which is common to a plurality of seals of a predetermined user and a seal specific portion which is unique to each individual seal;

wherein each base station is operative to broadcast messages which are received by the plurality of seals and said plurality of seals are operative to respond to said broadcast messages, wherein communication between said at least one base station and said plurality of seals employs synchronization signals based on at least one of the following bit strings:

0, 0, 0, 1, 1, 0, 0, 0

1, 0, 0, 1, 1, 0, 0, 0

0, 1, 0, 1, 1, 0, 0, 0

1, 1, 0, 1, 1, 0, 0, 0

0, 0, 0, 1, 1, 1, 1, 0.

28. A tag interrogation system comprising:

at least one base station; and a plurality of tags, wherein each base station is operative to broadcast messages which are received by the plurality of tags and only ones of said plurality of tags which have been tampered with are operative to respond to said broadcast messages, wherein communication between said at least one base station and said plurality of tags employs synchronization signals based on at least one of the following bit strings:

0, 0, 0, 1, 1, 0, 0, 0

1, 0, 0, 1, 1, 0, 0, 0

0, 1, 0, 1, 1, 0, 0, 0

1, 1, 0, 1, 1, 0, 0, 0

0, 0, 0, 1, 1, 1, 1, 0.

29. A tag interrogation system comprising:

at least one base station; and a plurality of tags, which are operative for sensing tampering thereof one actuated, said tags being selectably actuable in response to wireless actuation messages, wherein each base station is operative to broadcast actuation messages which are received by the plurality of tags and are operative to actuate said tags, wherein communication between said at least one base station and said plurality of tags employs synchronization signals based on at least one of the following bit strings:

0, 0, 0, 1, 1, 0, 0, 0

1, 0, 0, 1, 1, 0, 0, 0

0, 1, 0, 1, 1, 0, 0, 0

1, 1, 0, 1, 1, 0, 0, 0

0, 0, 0, 1, 1, 1, 1, 0.

30. A tag interrogation system comprising:

at least one base station; and a plurality of tags, wherein each base station is operative to broadcast messages which are received by the plurality of tags, said messages including tracking messages at transmission power levels which monotonically decrease over time and said plurality of tags each respond to the base station indicating which tracking message was received, thereby indicating the level of transmission power which each tag requires in order to receive the message and thus indicating its distance from a given base station, wherein communication between said at least one base station and said plurality of tags employs synchronization signals based on at least one of the following bit strings:

0, 0, 0, 1, 1, 0, 0, 0

1, 0, 0, 1, 1, 0, 0, 0

0, 1, 0, 1, 1, 0, 0, 0

1, 1, 0, 1, 1, 0, 0, 0

0, 0, 0, 1, 1, 1, 1, 0.

31. A tag interrogation system comprising:

at least one base station; and a plurality of tags, which are operative for sensing tampering thereof once actuated and activated, said tags being selectably actuable in response to wireless actuation message, wherein each base station is operative to broadcast actuation messages which are received by the plurality of tags and are operative to actuate said tags, wherein communication between said at least one base station and said plurality of tags employs synchronization signals based on at least one of the following bit strings:

0, 0, 0, 1, 1, 0, 0, 0

1, 0, 0, 1, 1, 0, 0, 0

0, 1, 0, 1, 1, 0, 0, 0

1, 1, 0, 1, 1, 0, 0, 0

0, 0, 0, 1, 1, 1, 1, 0.

* * * * *